(12) United States Patent
Srikrishna

(10) Patent No.: US 12,728,301 B2
(45) **Date of Patent: *Sep. 8, 2026**

(54) MASKLESS RESPIRATORY, SKIN, AND EYE PROTECTION DEVICE FOR AEROSOLS AND VAPORS INCLUDING CHEMICAL, BIOLOGICAL, RADIOLOGICAL, NUCLEAR, AND EXPLOSIVE (CBRNE) CONTAMINANTS

(71) Applicant: Patient Knowhow, Inc., San Mateo, CA (US)

(72) Inventor: Devabhaktuni Srikrishna, San Francisco, CA (US)

(73) Assignee: Patient Knowhow, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/389,317

(22) Filed: Nov. 14, 2025

(65) Prior Publication Data

US 2026/0102638 A1 Apr. 16, 2026

Related U.S. Application Data

(60) Continuation of application No. 19/194,120, filed on Apr. 30, 2025, now Pat. No. 12,496,474, which is a (Continued)

(51) Int. Cl.

*A62B 23/02* (2006.01)
*A62B 7/10* (2006.01)
(Continued)

(52) U.S. Cl.

CPC .............. *A62B 23/02* (2013.01); *A62B 9/006* (2013.01); *A62B 18/003* (2013.01); (Continued)

(58) Field of Classification Search

CPC ....... A62B 23/00–02; A62B 7/00; A62B 7/10; A62B 9/00; A62B 9/006; A62B 9/04; (Continued)

(56) References Cited

U.S. PATENT DOCUMENTS

| | | | |
|---|---|---|---|
| 4,074,282 | A | 2/1978 | Balas, Jr. et al. |
| 6,463,746 | B1 | 10/2002 | Bethuy |

(Continued)

FOREIGN PATENT DOCUMENTS

| | | | |
|---|---|---|---|
| EP | 4074282 | A1 | 10/2022 |
| EP | 4160100 | A1 | 4/2023 |

(Continued)

OTHER PUBLICATIONS

Fan Hat-Men's Women's Novelty Hat-Hat with Built in Solar-Unisex USB Charging 3-Speed Fun Baseball Cap (US, Alpha, 3X-Small, 4X-Large, Black). Datasheet [online]. Amazon.com, Inc., 2024 [retrieved on Nov. 24, 2024]. Retrieved from the Internet: <URL: https://www.amazon.com/Hat-Mens-Solar-Unisex-Charging-Riding-Mountaineering-Travel-Anti-UV/dp/B0B9BVP8MB/>.

(Continued)

*Primary Examiner* — Rachel T Sippel
(74) *Attorney, Agent, or Firm* — Mughal Gaudry & Franklin PC

(57) ABSTRACT

A respiratory and eye protection device having at least one filter and at least one axial fan. The least one filter is configured to achieve an aerosolized particle contamination filtration efficiency of 50% or greater for particles having a size of about 0.3 μm and configured to achieve a vapor contamination filtration efficiency of 50% or greater for one (Continued)

or more of Novichok nerve agent (A232), thickened venomous nerve agent (TVX), sulfur mustard agent (HD), thickened sulfur mustard agent (THD), soman nerve agent (GD), and sarin nerve agent (GB). During the operation and monitoring of the respiratory and eye protection device, at least one fan is activated when concentrations of select aerosolized chemical, biological, radiological, and nuclear (CBRN) agents are detected.

30 Claims, 18 Drawing Sheets

Related U.S. Application Data division of application No. 18/913,327, filed on Oct. 11, 2024, now Pat. No. 12,343,573.

(51) Int. Cl.

| | |
|---|---|
| ***A62B 9/00*** | (2006.01) |
| ***A62B 18/00*** | (2006.01) |
| ***A62B 31/00*** | (2006.01) |
| ***B01D 46/00*** | (2022.01) |
| ***B01D 46/44*** | (2006.01) |
| ***B01D 46/46*** | (2006.01) |
| ***B01D 46/52*** | (2006.01) |
| ***B01D 53/02*** | (2006.01) |

(52) U.S. Cl.

CPC ....... *B01D 46/0047* (2013.01); *B01D 46/442* (2013.01); *B01D 46/46* (2013.01); *B01D 53/02* (2013.01); *A62B 7/10* (2013.01); *A62B 31/00* (2013.01); *B01D 46/521* (2013.01); *B01D 2253/102* (2013.01); *B01D 2257/30* (2013.01); *B01D 2257/93* (2013.01); *B01D 2273/30* (2013.01)

(58) Field of Classification Search

CPC .................. A62B 17/00; A62B 17/006; A62B 18/00–006; A62B 18/08–082; A62B 18/088; A62B 19/00; A42B 3/28; A42B 3/286; A42B 1/242; A42B 1/008; A42C 5/04

See application file for complete search history.

(56) References Cited

U.S. PATENT DOCUMENTS

| | | | |
|---|---|---|---|
| 8,128,358 | B2 | 3/2012 | McLennan |
| 8,152,484 | B2 | 4/2012 | Bilodeau et al. |
| 8,491,685 | B2 | 7/2013 | Witter et al. |
| 8,567,403 | B1 | 10/2013 | Lu et al. |
| 8,754,740 | B2 | 6/2014 | Pinto et al. |
| 9,551,504 | B2 | 1/2017 | Arensmeier et al. |
| 10,197,296 | B2 | 2/2019 | Su et al. |
| 10,774,846 | B2 | 9/2020 | Hur et al. |
| 11,134,729 | B1 | 10/2021 | Schwartz et al. |
| 11,166,497 | B1 | 11/2021 | Wilson et al. |
| 11,525,589 | B2 | 12/2022 | Son et al. |
| 11,717,782 | B2 | 8/2023 | Oh et al. |
| 12,090,492 | B2 | 9/2024 | Bibby |
| 2009/0243527 | A1 | 10/2009 | Kakiuchi |
| 2011/0308524 | A1 | 12/2011 | Brey |
| 2013/0118506 | A1 | 5/2013 | Osipov et al. |
| 2015/0280617 | A1 | 10/2015 | Kondou |
| 2017/0189727 | A1 | 7/2017 | Hunter et al. |
| 2018/0311515 | A1 | 11/2018 | Wilson et al. |
| 2019/0275359 | A1 | 9/2019 | Shen et al. |
| 2021/0177084 | A1 | 6/2021 | Conaway, Sr. |
| 2021/0289854 | A1 | 9/2021 | Popa-Simil et al. |
| 2022/0011009 | A1 | 1/2022 | Lee et al. |
| 2022/0032224 | A1 | 2/2022 | An et al. |
| 2022/0040508 | A1 | 2/2022 | Srebric et al. |
| 2022/0095736 | A1 | 3/2022 | Henshaw |
| 2022/0126126 | A1 | 4/2022 | Clack |
| 2022/0233739 | A1 | 7/2022 | Wade |
| 2022/0330630 | A1 | 10/2022 | Vandendorpe et al. |
| 2022/0331619 | A1 | 10/2022 | Joseph et al. |
| 2022/0354270 | A1 | 11/2022 | Dymmel et al. |
| 2022/0387829 | A1 | 12/2022 | Mattila |
| 2023/0109493 | A1 | 4/2023 | de Jong |
| 2023/0256270 | A1 | 8/2023 | Shoham et al. |
| 2023/0338603 | A1 | 10/2023 | Blum et al. |
| 2024/0183555 | A1 | 6/2024 | Srikrishna |

FOREIGN PATENT DOCUMENTS

| | | | |
|---|---|---|---|
| GB | 2625562 | A | 6/2024 |
| JP | 2011226655 | A | 11/2011 |
| KR | 20170039344 | A | 4/2017 |
| KR | 102306995 | B1 | 10/2021 |
| WO | 2020251372 | A1 | 12/2020 |
| WO | 2023081506 | A1 | 5/2023 |

OTHER PUBLICATIONS

X post entitled “Introducing the LaminAir. * Safer indoor dining. Safer working in the office.* At least double-digit exposure reduction factors, while breathing 12 inches away from the device.” 1 page, posted Dec. 21, 2023 by user @eddericu. Retrieved from Internet: <URL: https://x.com/eddericu/status/1738041192049266939>.

Air Shield Pro. Datasheet [online]. Trend Tool Technology Inc. [retrieved on Nov. 24, 2024]. Retrieved from the Internet: <URL: https://www.trend-usa.com/airpro>.

Srikrishna, Devabhaktuni. “Pentagon Found Daily, Metagenomic Detection of Novel Bioaerosol Threats to Be Cost-Prohibitive: Can Virtualization and AI Make It Cost-Effective?.” Health security 22.2 (Apr. 16, 2024): 108-129.

Lynch, Jim,. An invisible mask? Wearable air curtain, treated to kill viruses, blocks 99.8% of aerosols [serialonline], Jul. 8, 2024, [retrieved on Nov. 14, 2024]. Retrieved from the Internet <https://news.engin.umich.edu/2024/07/an-invisible-mask-wearable-air-curtain-treated-to-kill-viruses-blocks-99-8-of-aerosols/>.

Screen captures from YouTube video clip entitled “An invisible, virus-killing mask,” 3 pages, uploaded on Jul. 8, 2024 by user “Michan Engineering”. Retrieved from Internet: <https://www.youtube.com/watch?v=iGMXfB-g0bY>.

Department of The Air Force, Instruction 10-2503, Chemical, Biological, Radiological, Nuclear, (CBRN) Defense Program, Oct. 6, 2023.

Axial fans in series or parallel operation. Datasheet [online]. Noctura. [retrieved on Nov. 24, 2024]. Retrieved from the Internet: <URL: https://noctua.at/en/axial-fans-in-series-or-parallel-operation>.

X post entitled “The Warp Core Family.” 1 page, posted Jan. 1, 2024 by user “@TheFandelier”. Retrieved from Internet: <URL: https://x.com/TheFandelier/status/1742667052652036240>.

X post entitled “I love stacking!” 1 page, posted Jan. 2, 2024 by user “@TheFandelier”. Retrieved from Internet: <URL: https://x.com/TheFandelier/status/1742324759495639207>.

X post entitled “Sorry I was talking about stacking CYLINDERS.” 1 page, posted Jan. 2, 2024 by user “@TheFandelier”. Retrieved from Internet: <URL: https://x.com/TheFandelier/status/1742360502326730909>.

Fox, Joey,. Intro To Activated Carbon Filters. It’s Airborne, [serialonline], [retrieved on Nov. 24, 2024]. Retrieved from the Internet <URL: https://itsairborne.com/intro-to-activated-carbon-filters-06d7750eb92a>.

Military, Industrial Use Impregnated Activated Carbon. Datasheet [online]. Xiamen All Carbon Corporation, 2024 [retrieved on Nov. 24, 2024]. Retrieved from the Internet: <URL: https://www.allcarbon.net/military-industrial-use-impregnated-activated-carbon/>.

ASZM-TEDA. Datasheet [online]. CalgonCarbon, 2012 [retrieved on Nov. 24, 2024]. Retrieved from the Internet: <URL: https://www.calgoncarbon.com/app/uploads/4_ASZM_TEDA_1pg_0917.pdf>.

(56) References Cited

OTHER PUBLICATIONS

Capacity Index for Gases, Vapors and Fumes Removed by Austin Healthmate™ Products. Datasheet [online]. Austin Air Systems [retrieved on Nov. 24, 2024]. Retrieved from the Internet: <URL: https://austinair.com/wp-content/uploads/2015/01/usersguide-2.pdf>.
The Austin Air HealthMate® Plus removes the widest range of chemicals, gases and VOCs in your home. Datasheet [online]. Austin Air Systems, 2024 [retrieved on Nov. 24, 2024]. Retrieved from the Internet: <URL: https://austinair.com/air-concerns/chemicals-gases-vocs/>.
Filter Evaluation. Datasheet [online]. DEVCOM Chemical Biological Center, 2024 [retrieved on Nov. 24, 2024]. Retrieved from the Internet: <URL: https://www.cbc.devcom.army.mil/engineering/test/test-reliability-evaluation-branch/filter-evaluation/>.
HealthMate Plus. Datasheet [online]. Austin Air Systems, 2022 [retrieved on Nov. 24, 2024]. Retrieved from the Internet: <URL: https://austinair.com/shop/healthmate-plus/>.
Austin Air Systems. Datasheet [online]. Better Living with Air & More, 2024 [retrieved on Nov. 24, 2024]. Retrieved from the Internet: <URL: https://www.airnmore.com/austin-air/>.
CBRN/ColPro Filters. Datasheet [online]. HDT Global, 2024 [retrieved on Nov. 24, 2024]. Retrieved from the Internet: <URL: https://www.hdtglobal.com/series/cbrncolpro-filters/>.
LCD 4. Datasheet [online]. Smiths Detection, 2024 [retrieved on Nov. 24, 2024]. Retrieved from the Internet: <URL: https://www.smithsdetection.com/products/lcd-4/>.
Filtrete 12×24×1 AC Furnace Air Filter, MERV 13, MPR 1900, Premium Allergen, Bacteria & Virus Filter, 3-Month Pleated 1-Inch Electrostatic Air Cleaning Filter, 2-Pack. Datasheet [online]. Amazon.com, Inc., 2024 [retrieved on Nov. 24, 2024]. Retrieved from the Internet: <URL: https://www.amazon.com/gp/product/B00TUDHMGS/?th=1>.
Nordic Pure 12×24×4 (11_½×23_⅜×3_⅝) Pleated MERV 13 Air Filters 2 Pack. Datasheet [online]. Amazon.com, Inc., 2024 [retrieved on Nov. 24, 2024]. Retrieved from the Internet: <URL: https://www.amazon.com/gp/product/B005ESOGZ8/?th=1>.
Filtrete 20×20x1 AC Furnace Air Filter, MERV 13, MPR 1900, Premium Allergen, Bacteria & Virus Filter, 3-Month Pleated 1-Inch Electrostatic Air Cleaning Filter, 4-Pack. Datasheet [online]. Amazon.com, Inc., 2024 [retrieved on Nov. 24, 2024]. Retrieved from the Internet: <URL: https://www.amazon.com/gp/product/B005GZ8IG2/?th=1>.
Team Wendy® EXFIL®/ EPIC® Counterweight Kit. Datasheet [online]. Team Wendy [retrieved on Nov. 24, 2024]. Retrieved from the Internet: <URL: https://www.teamwendy.com/products/helmets-accessories/parts-accessories/exfil-counterweight-kit>.
AirTulip Sleep. Datasheet [online]. AirTulip, 2024 [retrieved on Nov. 24, 2024]. Retrieved from the Internet: <https://airtulip.co/products/sleep-air-purifier-headboard>.
Cortellessa, Gino, et al. “Effectiveness of a portable personal air cleaner in reducing the airborne transmission of respiratory pathogens.” Building and Environment 235 (May 1, 2023): 110222.
Engineering Controls To Reduce Airborne, Droplet and Contact Exposures During Epidemic/Pandemic Response. National Institute for Occupational Safety and Health [serialonline], Apr. 2, 2020, [retrieved on Nov. 24, 2024]. Retrieved from the Internet <URL: https://www.cdc.gov/niosh/topics/pandemic/headboards.html#print>.
Eod’s Streamlined “Leak, Seal and Pack” Solution. Datasheet [online]. AirTulip, 2015 [retrieved on Nov. 24, 2024]. Retrieved from the Internet: <URL: https://www.adsinc.com/news/eods-streamlined-leak-seal-pack-solution>.
Corsi—Rosenthal Box. Wikipedia, The Free Encyclopedia, Wikimedia Foundation, [serialonline], [retrieved on Nov. 24, 2024]. Retrieved from the Internet <URL: https://en.wikipedia.org/wiki/Corsi%E2%80%93Rosenthal_Box>.
Srikrishna, Devabhaktuni. “Can 10x cheaper, lower-efficiency particulate air filters and box fans complement High-Efficiency Particulate Air (HEPA) purifiers to help control the COVID-19 pandemic?. ” Science of The Total Environment 838 (Sep. 10, 2022): 155884.
Next-Gen Corsi-Rosenthal Box & Double-Barrel HEPA Big Cleaning at a Whisper. Datasheet [online]. Clean Air Kits, 2024 [retrieved on Nov. 24, 2024]. Retrieved from the Internet: <URL: https://www.cleanairkits.com/>.
MA-WM45 Air Purifier. Datasheet [online]. Medify Air, 2024 [retrieved on Nov. 24, 2024]. Retrieved from the Internet: <URL: https://medifyair.com/products/ma-45-air-purifier>.
OA600 Nitro Series. Datasheet [online]. Omni CleanAir, 2024 [retrieved on Nov. 24, 2024]. Retrieved from the Internet: <URL: https://omnicleanair.com/products/oa600-nitro/>.
B-Air® RA-650 Hepa Air Scrubber w/GFCI Daisy Chain—Blue. Datasheet [online]. T&G Chemical & Supply Company, Inc., 2024 [retrieved on Nov. 24, 2024]. Retrieved from the Internet: <URL: https://www.tgchemical.com/catalog/p/3001015-EA/B-Air-RA-650-HEPA-Air-Scrubber-w-GFCI-Daisy-Chain-Blue/>.
X post entitled “Our commercial air cleaner, the Blast, delivers a whopping 950m3/hr at noise levels of 43dBA making it one of the quietest and most effective air purifiers in the market.” 1 page, posted Mar. 14, 2024 by user “@SmartairUk”. Retrieved from Internet: <URL: https://x.com/TheFandelier/status/1742360502326730909>.
Lennox 19L14-20" x 20" x 5" Healthy Climate HCF14-13 Air Filter, MERV 13 (2-Pack). Datasheet [online]. Amazon.com, Inc., 2024 [retrieved on Nov. 24, 2024]. Retrieved from the Internet: <URL: https://www.amazon.com/gp/product/B08666PNZ5/?th=1>.
Lennox X7935 Carbon Clean Healthy Climate MERV 16 Filter (2 Pack). Datasheet [online]. Amazon.com, Inc., 2024 [retrieved on Nov. 24, 2024]. Retrieved from the Internet: <URL: https://www.amazon.com/Lennox-Carbon-Healthy-Climate-Filter/dp/B00E5G1K36/?th=1>.
Supplementary Air Filtered Exchanges (SAFE). Patient Knowhow, Inc. [serialonline], [retrieved on Nov. 24, 2024]. Retrieved from the Internet <URL: https://www.patientknowhow.com/safe.html>.
QuietCool 2830 CFM Smart App Controlled 3-Speed Gable Mount Attic Fan Datasheet [online]. Home Depot, 2024 [retrieved on Nov. 24, 2024]. Retrieved from the Internet: <URL: https://www.homedepot.com/p/QuietCool-2830-CFM-Smart-App-Controlled-3-Speed-Gable-Mount-Attic-Fan-AFG-SMT-ES-3-0/314262957>.
Wearable virus defense. Datasheet [online]. Respiray, 2024 [retrieved on Nov. 24, 2024]. Retrieved from the Internet: <URL: https://respiray.com/wearable-personal-air-purifier-for-viruses-bacteria/>.
Song, Victoria,. My week with Dyson’s absurd wearable air purifier. The Verge, [serialonline], Apr. 27, 2023, [retrieved on Nov. 24, 2024]. Retrieved from the Internet <URL: https://www.theverge.com/23698352/dyson-zone-review-headphones-wearables-air-purifier>.
X post entitled “Ok here’s a technical breakdown of why the “@Dyson Zone™ Air-Purifying Headphones” aka. the Snot Cannon aka. the Wearable SuperSpreader Event is such a staggeringly bad idea and a significant danger to public health if it is allowed to be sold.” 1 page, posted Mar. 30, 2022 by user “@RealSexyCyborg”. Retrieved from Internet: <URL: https://x.com/realsexycyborg/status/1509125141439033348?s=46>.
Keisar, David, et al. “Development and evaluation of a fluidic facemask for airborne transmission mitigation.” Experimental Thermal and Fluid Science 141 (2023): 110777.
Lindsley, William G., et al. “A comparison of performance metrics for cloth masks as source control devices for simulated cough and exhalation aerosols.” Aerosol Science and Technology 55.10 (2021): 1125-1142.
Screen captures from YouTube video clip entitled “Do It Yourself: Maintain Your Filter Tester’s Performance,” 3 pages, uploaded on Dec. 7, 2020 by user “TSI Incorporated”. Retrieved from Internet: <https://www.youtube.com/watch?v=Khch_AnGX1Q&t=101s>.
Screen captures from YouTube video clip entitled “Operation of TSIs Automated Filter Tester Model 8130,” 2 pages, uploaded on Jul. 14, 2016 by user “TSI Incorporated”. Retrieved from Internet: <https://www.youtube.com/watch?v=OcuntPnHzyk&t=40s>.
Dhyani, H. et al. (Published Apr. 17, 2024). Detoxification of toxic nerve agent sarin utilizing cupric oxide functionalized activated carbon fabric composite for advanced NBC Protective Clothing.

(56) References Cited

OTHER PUBLICATIONS

Abstract. Composite Interfaces, 31 (11), 1331-1352. (Year: 2024) [retrieved on Sep. 12, 2025]. Retrieved from the Internet: <URL: https://www.tandfonline.com/doi/full/10.1080/09276440.2024.2342087?scroll=top&needAsccess=true>.
M98 Particulate/Gas Filter Set. Datasheet [online]. HDT Global, 2025 [retrieved on Sep. 12, 2025]. Retrieved from the Internet: <URL: https://www.hdtglobal.com/product/m98-particulategas-filter-set-2/>.
FFA400-326 Positive Pressure CBRN Filtration System. Datasheet [online]. HDT Global, 2025 [retrieved on Sep. 12, 2025]. Retrieved from the Internet: <URL: https://www.hdtglobal.com/product/ffa400-326/>.
2nd Notice of Allowance notified Jun. 2, 2025 for U.S. Appl. No. 18/913,327.
Air Shield Pro. Datasheet [online]. Trend Tool Technology Inc. [retrieved on Nov. 24, 2024]. Retrieved from the Internet: https://www.trend-usa.com/airpro.
Final Office Action notified Apr. 2, 2025 for U.S. Appl. No. 18/913,327.
International Search Report and Written Opinion for PCT Application No. PCT/US2025/049760 mailed Jan. 2, 2026.
Lynch, "An invisible mask? Wearable air curtain, treated to kill viruses, blocks 99.8% of aerosols" [serialonline], Jul. 8, 2024, [retrieved on Nov. 24, 2024]. Retrieved from the Internet https://news.engin.umich.edu/2024/07/an-invisible-mask-wea rable-air-curtain-treated-to-kill-viruses-blocks-99-8-of-aerosols/.
Non-Final Office Action notified Jan. 13, 2025 for U.S. Appl. No. 18/913,327.
Notice of Allowance notified Apr. 23, 2025 for U.S. Appl. No. 18/913,327.
Notice of Allowance notified Aug. 18, 2025 for U.S. Appl. No. 19/194,120.
Restriction Requirement notified Dec. 9, 2024 for U.S. Appl. No. 18/913,327.
Restriction Requirement notified Jun. 30, 2025 for U.S. Appl. No. 19/194,120.
Srikrishna. "Pentagon Found Daily, Metagenomic Detection of Novel Bioaerosol Threats to Be Cost-Prohibitive: Can Virtualization and AI Make It Cost-Effective?." Health security 22.2 (Apr. 16, 2024): 108-129.
Technical Specifications: IQAir® GC Series. Datasheet [online]. IQAir [retrieved on Sep. 15, 2025] Retrieved from the Internet: <https://www.iqair.com/sites/default/files/documents/Tech-Specs_GC-NE_120V_130723.pdf>.
RSU 48 Air Scrubber 1000 CFM. Datasheet [online]. ElectroCorp. [retrieved on Sep. 15, 2025]. Retrieved from the Internet: <https://www.electrocorp.net/products/rsu-48>.
Electrocorp RSU—Radial Scrubber Unit—360 Degree Air Intake. Datasheet [online]. Electrocorp. [retrieved on Sep. 15, 2025]. Retrieved from the Internet: <https://www.airwashsystems.com/rsu-air-scrubber-purifier.html>.
Industrial Odor Control Solutions. Datasheet [online]. Electrocorp. [retrieved on Sep. 15, 2025]. Retrieved from the Internet: <https://www.electrocorp.net/collections/odor-control/rap-48-cch>.
RSF1000I Carbon Commercial Air Purifier Overview. Datasheet [online]. Iso-Aire [retrieved on Sep. 15, 2025]. Retrieved from the Internet: <https://static1.squarespace.com/static/5f0893d2fe49967f7825d046/t/6628187927c52a5ea8ba0074/1713903737239/ISO-Aire+RSF1000I+Carbon+Overview.pdf>.
RSF Carbon Series, Commercial Grade Air Purifiers At-A-Glance. Datasheet [online]. Iso-Aire [retrieved on Sep. 15, 2025]. Retrieved from the Internet: <https://www.iso-aire.com/rsf-carbon-series-commercial-grade-air-purifiers-at-a-glance-chart>.
Security Engineering: Procedures for Designing Airborne Chemical, Biological, and Radiological Protection for Buildings. Department of Defense. UFC 4-024-01, Jun. 10, 2008. Retrieved from the Internet: <https://stg.wbdg.org/dod/ufc/ufc-4-024-01>.
Category #1 Units (300-699 CFM) and Category #2 Units (>700 CFM (Cubic Feet per Minute)). Datasheet [online]. Bay Area Air District. [retrieved on Sep. 15, 2025]. Retrieved from the Internet: <https://www.baaqmd.gov/~/media/files/strategic-incentives/clean-air-centers/forms/baaqmd-portable-air-cleaner-bulk-pricing-list-pdf.pdf?rev=598d5a0e040349b7b04af58ee72ad293&sc_lang=en>.
Frequently Asked Questions about Testing of Portable Air Cleaners. Datasheet [online]. Association of Home Appliance Manufactures "AHAM", Jun. 15, 2020. Retrieved from the Internet: <https://ahamverifide.org/wp-content/uploads/2020/06/Air-Cleaner-Performance-FAQs.pdf>.
Yiming Xiang et al. "Assessing the performance of portable gas-phase air cleaners and Implications for their use in buildings". Energy and Buildings, vol. 346 (Jul. 19, 2025): 116152. Retrieved from the Internet: <https://www.sciencedirect.com/science/article/pii/S0378778825008825>.
Sara Bjerre Sørensen et al. "Removal of volatile organic compounds by mobile air cleaners: Dynamics, limitations, and possible side effects". Building and Environment, vol. 242 (Jun. 22, 2023): 110541. Retrieved from the Internet: <https://www.sciencedirect.com/science/article/pii/S0360132323005681>.
Screen capture from YouTube video clip entitled "Natural Refrigerant Webinar Series: Condenser/Cooler Heat Rejection Methods & Systems," 1 page, uploaded on Feb. 18, 2025 by user "North American Sustainable Refrigeration Council". Retrieved from Internet: <https://www.youtube.com/watch?v=kz2zhCKFsXc&t=1s>.

45
46
47
48
2

35
60B
60
37

35
60A
60
37

35
36
60

MASKLESS RESPIRATORY, SKIN, AND EYE PROTECTION DEVICE FOR AEROSOLS AND VAPORS INCLUDING CHEMICAL, BIOLOGICAL, RADIOLOGICAL, NUCLEAR, AND EXPLOSIVE (CBRNE) CONTAMINANTS

FIELD OF THE INVENTION

The present invention relates generally to a respiratory and eye protection device that utilizes an assembly comprising at least one filter and at least one axial fan to protect against aerosolized and vapor contamination, including chemical, biological, radiological, and nuclear (CBRN) agents, as well as a method of operating and monitoring thereof.

BACKGROUND OF THE INVENTION

Chemical, biological, radiological, and nuclear (CBRN) agents refer to hazardous materials, either naturally occurring or artificially produced, that can cause significant harm to humans (and animals) through chemical poisoning, biological infection, exposure to radioactive particles containing radioactive substances, or the fallout effects of a nuclear explosion.

In general, CBRN agents may be delivered intentionally or released accidentally in the air in aerosolized or vapor form, or onto surfaces in liquid (condensed) form, which in turn evaporates at varying rates depending on the volatility of the agent.

Chemical, biological, or radiological agents include non-persistent (e.g. sarin nerve agent (GB)), persistent (e.g. venomous nerve agent (VX)), low-volatility (e.g. Novichok nerve agent (A232)), infectious (e.g. anthrax), contagious (e.g. coronavirus), and radioactive (e.g. cesium chloride), capable of being delivered by a variety of methods including airburst, ground burst, covert or unmanned aerial systems (UAS), drone, unexploded ordinances (UXO), and pandemics, etc.

Historically, CBRN agents have been used in warfare, prompting militaries and medical treatment facilities to develop and implement protective systems to minimize casualties due to CBRN incidents.

More recently, the public has become more aware of the threat of CBRN agents due to the coronavirus (COVID-19) pandemic, prompting the widespread and increased use of respiratory and eye protection to include face masks (e.g., N95 respirators), goggles, and face shields.

CBRN agents can enter the body through several different routes including inhalation, skin, gastrointestinal tract, injection, and irradiation. There has been a significant focus to develop respiratory protection systems since the amount of vapor or aerosolized CBRN agent, when inhaled, is an order of magnitude lower (or more) compared to when absorbed through the skin, for initial symptoms, incapacitation, and/or death to occur.

Various forms of CBRN protection exist to include collective protection (COLPRO) systems and individual protective equipment (IPE). Nevertheless, there are several shortcomings with existing COLPRO and IPE as explained below.

COLPRO systems provide safe environments (e.g., in buildings, tents, containers, ground vehicles, ships, and aircraft) for individuals or assets against the threats posed by CBRN incidents or attacks. Some common examples of COLPRO systems include filtration and ventilation systems for shared facilities and specially designed protective shelters or vehicles. However, there is varied use of COLPRO systems throughout the different branches of the United States military, and it is reported that only a fraction of command posts, medical treatment facilities treating, ships, and other critical infrastructure operate these COLPRO systems.

Even when COLPRO systems are in service, issues that may arise include interior contamination (e.g. clothing desorption), lengthy entry/exit procedures, cross-infection of contagious viruses/bacteria, and component-failures (e.g., malfunctioning of fans and filters).

COLPRO systems may use supplemental, continuous air cleaning, at a total clean airflow rate measured in cubic feet per minute, in a room to remove vapor or aerosolized pandemic/CBRN agents (contaminants) and reduce their ambient concentration. The air changes per hour (ACH) is defined as the total clean airflow rate divided by the volume of the room, expressed per hour. To use a nuclear analogy, the "half-life" of the contaminant concentration in the air (aerosol or vapor) is inversely proportional to the air changes per hour or ACH ($=\log_e(2)/\text{ACH}$) of the air cleaning. The half-life illustrates that the higher the ACH, the faster any "vapor spikes" or aerosol spikes are mixed, diluted, and attenuated, which reduce cumulative exposure to room occupants. In steady state, the residual level of particle concentration remaining depends directly on the rate of contaminant entry into the room (leak) or bioaerosol exhalation by the infected person(s), and inversely on the total clean airflow rate (e.g., the product of the ACH and the volume of the room). The higher ACH in a room, the greater the protection factor from aerosol/vapor spikes and fewer contaminants and quicker their clearance reducing dose inhaled or absorbed by occupants. For example, there was a 50-fold reduction in a household room of particles having a size of 0.3 μm (e.g., the most penetrating particle size, explained more below) within 40 minutes after closing the windows and then running 9 ACH of air filtration.

Even so, a COLPRO system at approximately 5 ACH does not fully address cross-infection especially at close-contact. Asymptomatic, contagious viruses/bacteria can infect without early warning from obvious symptoms (e.g. coronavirus) via lungs or eyes, especially if prolonged or at close-range requiring use of respirators or full-face protection. Nevertheless, with some exceptions, a rate of more than 5 ACH of filtered, recirculated air using centralized heating ventilation and air conditioning (HVAC) systems is uneconomical because the cost of energy needed to transport the air remotely to an HVAC rises approximately as the cube of ACH ($\text{ACH}^3$). This is not including the costs of conditioning the air temperature at these higher airflow rates. COLPRO systems also use central filtration and a protective membrane, both single points of failure that further require excess power to overcome airflow resistance for transporting air to each room (via long, narrow hoses or ducts).

Individual protective equipment includes protective clothing, protective masks (e.g., respirators such as an N95 respirator and gas masks such as a M50 Joint Service General Purpose masks), decontamination and first-aid kits, detectors (e.g., Joint Chemical Agent Detectors (JCADs)), and dosimeters to protect individuals against CBRN agents.

Mission oriented protective posture (MOPP) gear is a subset of IPE worn by military forces to operate in a CBRN environment and is classified based on the level of protection to include MOPP Ready (e.g., protective mask carried and suit, gloves, and boots are available within a certain amount of time) and MOPP Level 0 (e.g., no protection worn, a protective mask is carried, and suit, boots, and gloves are immediately available) through MOPP Level 4 (e.g., all protection worn).

During a CBRN incident, it is oftentimes recommended to shelter-in-place (SIP), i.e., taking refuge in a small interior room with no or few windows. However, unless inside a COLPRO system for the entire period, individual protective equipment will be required for several hours or days while sheltering-in-place, which is unsustainable for most people over extended periods.

Additionally, extended IPE use can lead to heat build-up, physical exertion, breathing resistance, reduced mobility and flexibility, human error, hunger, and thirst, which will cause personnel to seek a clean environment or otherwise risk CBRN exposure when eating, hydrating or going to the bathroom. The use of IPE for prolong periods also can result in "severely degraded" work rates from fatigue, mistakes, and heat/humidity stress in warmer climates within 24 to 36 hours. Furthermore, persistent CBRN agents have a 1-to-4-day period of unpredictable "vapor spikes" or undetectable low levels but may otherwise be cumulatively symptom-inducing, incapacitating, or amount to a lethal exposure. The residual hazard of off-gassing from CBRN agent deposits on outdoor or indoor surfaces in various locations remain for extended periods and may change with wind direction. Furthermore, each subsequent CBRN incident/attack will restart this clock, prolonging the requirement to use IPE.

There is also the issue of insufficient early warning to don protective masks or other IPE. For instance, the United States military heavily relies on the JCAD for point detection (i.e., detecting hazards on a surface or in the air, such as in a room, requiring close proximity to the target). The JCAD is a device that automatically detects, identifies, and alerts operators to the presence of chemical warfare agents (e.g., nerve and blister vapors), as well as at least one blood chemical agent vapor and at least one toxic industrial chemical vapor. However, the JCAD can only detect vapor agents and there are a limited number of these detectors in the inventory. It especially becomes problematic to determine the level of IPE protection required for military forces and the civilian population when the concentration of the CBRN agent in the air is initially unknown.

Even when early warning of exposure to a CBRN agent is provided, the military standard of 8 or 9 seconds of putting on a protective mask during apnea (i.e., while not breathing) can still result in symptoms or incapacitation if the concentration of detected agent in the air (e.g. sarin, VX) is high enough. Most civilians typically do not have gas masks, respirators, or COLPRO nor have the training to use and operate them. The latency will increase further if the gas mask is out of reach or if the gas mask is not ready to don, and if the servicemember (or civilian) is sleeping (adding 1 to 2 seconds for adults to wake up to an alarm).

Respirators such as N95 masks remain useful for reducing risk to both near-field and far-field exposures, whereas air filtration can mitigate far-field exposure in a well-mixed environment. However, most personnel cannot wear respirators for an extended period, nor can they be worn continuously under all circumstances such as while sleeping, eating, or undergoing dental procedures. In addition, respirators can add breathing resistance, may become intolerably hot in warm climates, may cause skin irritation, conceal facial expression and lips (for lip reading), and may cause difficulty with people hearing the user of the respirator speak. Ceiling fans can mitigate this shortcoming of indoor air cleaning, without using respirators or other IPE, by displacing accumulations of infectious particles near high-emitting infectors. For example, a mannequin placed directly underneath a ceiling fan was exposed to approximately 95% fewer aerosol particles from a simulated cough 5 feet away when the fan was on compared to when it was off. However, there was only a 20% reduction when the mannequin was not directly underneath the ceiling fan. Even with ceiling fans properly positioned, indoor air cleaning at sufficiently high ACH is still necessary to remove the displaced bioaerosols from accumulating in the room.

As another option, portable air filters can be used economically, to push above 5 ACH to 12 ACH and beyond, for in-room air cleaning methods. The cost of recycling indoor air, by locally cleaning it within the same room rather than in a remotely located HVAC system, scales up linearly proportional to target ACH (ACH to the power of 1 or $ACH^1$). Portable air cleaners usually include at least one filter and at least one fan inside an enclosure. Fault-tolerance with portable air cleaners is based on a leak-resilience principle: quick dilution and removal of chemical and particle emissions, both external and internal with supplementary air filtered exchanges. Portable air cleaners are able to improve fault-tolerance, power-efficiency, and reduce CBRN exposure by orders of magnitude using decentralized, directionally-optimized air filtration elements in each room. Working together, portable air cleaners can combine to reach an ACH of more than 10 (like passenger jets in flight resilient to leaks in airframes and internal sources) and protection can be economically scaled up past central filtration such as used in COLPRO systems.

The clean air delivery rate (CADR) is a measurement of how well a portable air filter removes air contamination inside a room. Existing portable air filters either are too noisy, take up too much space within a room, or are too expensive. It is thus desirable to maximize the CADR (and the ACH) while minimizing the portable air filter footprint (e.g., for berths on a ships and submarines), the noise produced, the energy used, the procurement cost, and the consumable filter cost.

Based on the supply chain issues that arose during the coronavirus pandemic, there is a need to develop a respiratory and eye protection device, as an alternative to traditional IPE and COLPRO systems, that rely on more readily available filters and fans and that have a secondary market to enable surge scalability when needed.

There is also a need for a respiratory and eye protection device that can overcome the shortcomings of conventional IPE and COLPRO systems for use as a substitute to or in conjunction with existing technology, while also effectively protecting a user from select vapor and aerosolized CBRN agents.

SUMMARY OF THE INVENTION

It is an object of the present invention to provide an improved respiratory and eye protection device for reducing near-field and far-field exposure to select vapor and aerosolized CBRN agents. The improved respiratory and eye protection device can protect in circumstances where traditional respiratory (e.g., N95, gas mask) and eye protection (e.g., goggles) becomes difficult to use such as while sleeping, eating, or undergoing dental procedures. In addition, respirators can add breathing resistance, may become intolerably hot in warm climates, may cause skin irritation, conceal facial expression and lips (for lip reading), and may cause difficulty with people hearing the wearer speak.

It is another object of the present invention to provide an improved respiratory and eye protection device by increasing the air contamination filtration efficiency using a stacked fan and filter assembly.

It is still another object of the present invention to provide an improved respiratory and eye protection device that can provide respiratory and eye protection for a user from select vapor and aerosolized CBRN agents without the need of having to don (additional) individual protective equipment.

It is still another object of the present invention to provide an improved respiratory and eye protection device that can provide long-term respiratory and eye protection for a user from select vapor and aerosolized CBRN agents while maximizing comfort.

To that end, the present invention relates generally to a personal respiratory and eye protection device comprising:

a frame for accommodating a user of the respiratory and eye protection device;

an air processing assembly comprising:

an air processing assembly inlet for receiving ambient air;

an air processing assembly outlet;

at least one axial fan that generates a substantially laminar airflow in an inhalation zone of the user during inhalation; and at least one filter stacked together with the at least one axial fan between the air processing assembly inlet and the air processing assembly outlet in a stacking direction, wherein the air processing assembly is disposed above the inhalation zone with respect to the direction of the substantially laminar airflow generated by the at least one axial fan in the inhalation zone, wherein the air processing assembly is in-line with the inhalation zone, wherein the at least one filter reduces contaminated air in the inhalation zone and comprises an aerosolized particle contamination filter configured to achieve an aerosolized particle contamination filtration efficiency of 50% or greater for particles having a size of about 0.3 μm, wherein substantially all air released from the air processing assembly outlet in the inhalation zone has been filtered by the at least one filter, and wherein the air processing assembly is coupled to the frame and processes substantially all ambient air in a direction of generated airflow by the at least one axial fan before entering the inhalation zone.

The present invention also relates generally to a modular filter assembly for filtering contamination from ambient air, wherein the modular filter assembly comprises an air processing assembly further comprising:

an air processing assembly inlet for receiving ambient air;

an air processing assembly outlet; and at least one axial fan stacked on top of at least one filter between the air processing assembly inlet and the air processing assembly outlet, wherein the at least one filter reduces contaminated air in the surrounding environment and comprises a vapor contamination filter configured to achieve a vapor contamination filtration efficiency of 50% or greater for one or more of Novichok nerve agent (A232), thickened venomous nerve agent (TVX), sulfur mustard agent (HD), thickened sulfur mustard agent (THD), soman nerve agent (GD), and sarin nerve agent (GB), wherein a substantial amount of the air released into the surrounding environment from the air processing assembly outlet has been filtered by the at least one filter.

The present invention also relates generally to a stackable assembly for filtering contamination from ambient air:

two lateral components;

a front component comprising at least one front seal capable of sealing or substantially sealing an interface between the front component and the two lateral components;

a back surface that does not comprise an aerosolized contamination filter; and a top plate comprising a top seal for sealing or substantially sealing an interface between the top plate, the two lateral components, and the front component; and a bottom plate comprising a bottom seal for sealing or substantially sealing an interface between the bottom plate, the two lateral components, and the front component, wherein at least one of the two lateral components and the front component comprises at least one filter and at least one axial fan, wherein the at least one filter comprises an aerosolized contamination filter configured to achieve an aerosolized contamination filtration efficiency of 50% or greater for particles having a size of about 0.3 μm.

The present invention also relates generally to a fan outlet shroud for a stacked filter and fan assembly comprising:

a base plate for covering an outlet of at least one axial fan, wherein a center of the base plate comprises a circular aperture, wherein a diameter of the circular aperture is smaller than a diameter of the outlet of at least axial one fan; and an extension attached to the base plate at the circular aperture forming a sealed or substantially sealed connection, wherein the extension comprises a channel extending the length of the extension substantially through the center of the extension, wherein the at least one axial fan generates an airflow through the channel and the circular aperture.

The present invention also relates generally to a containment apparatus for enclosing a hazardous material emitting air contamination comprising:

an enclosure for isolating the hazardous material comprising:

at least three closed faces comprising a transparent material, wherein a sealed or substantially sealed connection is formed between each of the at least three closed faces, and an open face for receiving the hazardous material when a periphery of the open face contacts a surface supporting the hazardous material, wherein the periphery of the open face comprises a sealant for forming a sealed or substantially sealed connection between the enclosure and the surface; and an air processing assembly disposed on or enclosed within the enclosure comprising:

an air processing assembly inlet for receiving contaminated air in the enclosure, an air processing assembly outlet, and at least one axial fan and at least one filter coupled together between the air processing assembly inlet and the air processing assembly outlet, wherein the at least one filter reduces contaminated air in the enclosure and comprises a vapor contamination filter configured to achieve a vapor contamination filtration efficiency of 50% or greater for one or more of Novichok nerve agent (A232), thickened venomous nerve agent (TVX), sulfur mustard agent (HD), thickened sulfur mustard agent (THD), soman nerve agent (GD), and sarin nerve agent (GB), wherein the air processing assembly outlet only releases air in the enclosure that has been filtered by the at least one filter.

BRIEF DESCRIPTION OF THE DRAWINGS

The drawings described herein are for illustrative purposes only of selected embodiments and not all possible implementations and are not intended to limit the scope of the present disclosure.

The above set forth and other features of the present invention are made more apparent in the ensuing the Detailed Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Figure 1:
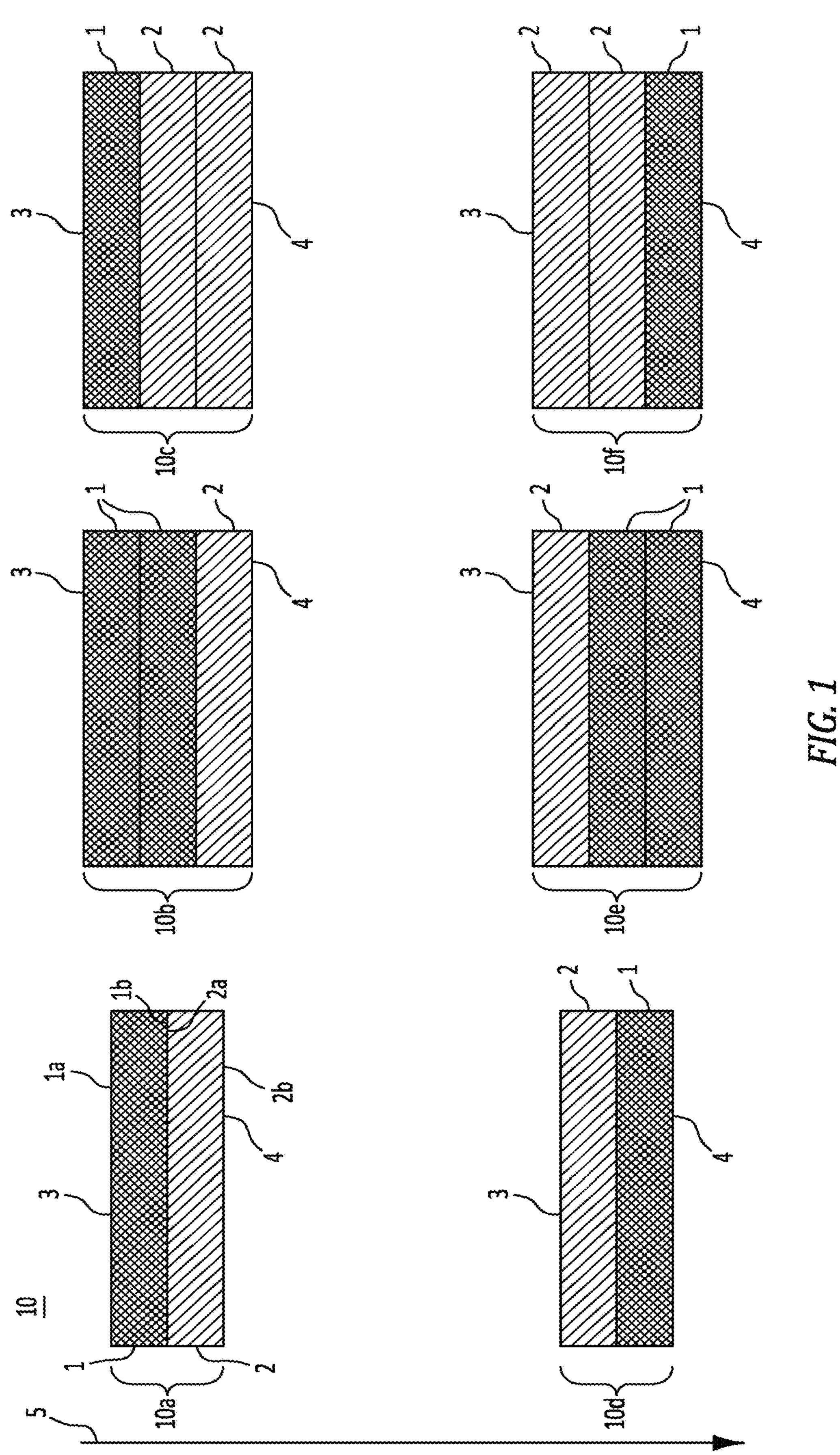
FIG. 1 depicts a side view of respiratory and eye protection devices, in accordance with an embodiment of the present invention.

The inventor of the present invention has found that respiratory and eye protection devices for protection against select vapor and aerosolized CBRN agents utilizing different configurations of fans and filters that require less power to operate and utilize less expensive materials, while generating less noise and providing superior comfort to a user during extended use.

The inventor of the present invention has also found that these respiratory and eye protection devices can achieve a high air contamination filtration efficiency of specific vapor and aerosolized CBRN agents posing a threat to national security.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected.

It should be understood that the disclosed embodiments are merely illustrative of the present disclosure, which may be embodied in various forms.

As used herein, "a," "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath", "below", "lower", "above", "upper", "front", "back", and the like, are used for ease of description to describe one element or feature's relationship to another element(s) or feature(s). It is further understood that the terms "front" and "back" are not intended to be limiting and are intended to be interchangeable where appropriate.

As used herein, the terms "comprise(s)" and/or "comprising," specify the presence of stated features, integers, steps, operations, elements, and/or components, but do not preclude the presence or addition of one or more other features, integers, steps, operations, elements, components, and/or groups thereof.

As used herein, the term "substantially laminar airflow" refers to airflow characterized such that it has a Reynolds Number of below about 2500, preferably below about 2000, more preferably below about 1000. Details regarding determination of Reynolds Numbers can be found, for example, in Perry's Chemical Engineer's Handbook, 7th ed., which is hereby incorporated by reference.

As used herein, the term "electrically connected" refers to a connection that supplies power to a device from a source like a wall outlet or battery, a connection that supplies a signal, such as voice, video, and data, and combinations of one or more of the foregoing.

As used herein, the term "substantially the same size" and the term "substantially" with respect to any dimension recited herein refers to within +/−1 inch of the size. In other embodiments, however, where the term "substantially the same size" is indicated herein, the measurements or position may be within about 1/64, about 1/32, about 1/16, about 1/8, about 1/4, about 3/8, about 1/2, about 5/8, about 3/4, about 1/8, about 1.25, about 1.5, about 1.75, or about 2 inches or less, as other examples, or within about 1, about 5, about 10, about 15, about 20, about 25, about 30, about 40, or about 50 percent (%), as still other examples.

As used herein, the term "substantially through the center" refers to within +/−1 inch of the center. In other embodiments, however, where the term "substantially through the center" is indicated herein, the measurements or position may be within about 1/64, about 1/32, about 1/16, about 1/8, about 1/4, about 3/8, about 1/2, about 5/8, about 3/4, about 7/8, about 1.25, about 1.5, about 1.75, or about 2 inches or less, as other examples, or within about 1, about 5, about 10, about 15, about 20, about 25, about 30, about 40, or about 50 percent (%), as still other examples.

As used herein, the term "substantially perpendicular" refers to within about a 20 degree angle of being perpendicular. In other embodiments, however, where a "substantially perpendicular" is indicated herein, the measurements or position may be within about 1, about 5, about 10, about 15, about 20, about 25, or about 30 degrees of being perpendicular, as other examples, or within about 1, about 5, about 10, about 15, about 20, about 25, about 30, about 40, or about 50 percent (%) of being perpendicular, as still other examples.

As used herein, the term "substantially sealed" refers to the amount of permitted gas or air that is able to pass through an interface to be within about 0.001, about 0.01, about 1, about 2, about 10 percent, or about 25 percent of the amount of permitted gas or air that is able to pass through an unsealed interface.

As used herein, unless otherwise defined above, the terms "substantial" and "substantially" refer to within about 70 percent or more. In other embodiments, however, the term "substantial" and "substantially" refer to about 75, about 80, about 85, about 90, about 95, or about 99 percent (%) or more.

As used herein, the term "filtration efficiency" refers to the percentage (%) of containment removed by the at least one filter.

The inventor has found there are different scalable fans and filters that can be used in respiratory and eye protection devices and are readily available in the supply chain because they have a secondary market, described herein. As a result of the secondary market, in addition to being in a scalable supply, these fans cost less due to economies of scale and come with improved quality control, product features, reliability, durability, and ruggedness.

For example, the axial fan is a scalable fan that has a motor-driven rotating shaft (axis) on which are mounted skewed fan blades that pull air in and force it out in a direction parallel to the shaft. Three types of axial fans include box fans, case fans, and automotive cooling fans. Box fans are used in and supported primarily by the consumer market with a range of airflow and noise characteristics running on alternating current. An example of a box fan includes the Lasko 20-inch Box Fan. Case fans are used inside portable and gaming computers for cooling with significant airflow but low noise and low power consumption, typically powered by 12-volt direct current (DC), are also small and lightweight. Examples of case fans include the Arctic P12 Case Fan and Arctic P12 Max Case Fan. Automotive cooling fans (i.e., radiator fans, engine cooling fans, electric fans, condenser fans, cooling fan assemblies, pusher fans, and puller fans) are used for cooling radiators in cars or motorcycles and supported by the automotive industry, have a high level of airflow, power consumption, noise, and weight, and are also typically powered by 12-volt DC. An example of an automotive cooling fan can be found in Bilodeau et al. (U.S. Pat. No. 8,152,484B2), which is herein incorporated by reference, as well as the Spal 30101522 Puller Fan. Case fans are airflow fans and are optimized to move as much air as possible without forcing the air to move in a certain direction whereas automotive cooling fans are static pressure fans and are optimized for higher pressure/resistance applications.

Another type of fan, centrifugal fans (i.e., radial fans), have a motor driven hub which contains impellers that throw off air into the fan housing that is then directed to an outlet. Centrifugal fans discharge air at a 90 degree angle (perpendicular) to the air intake. Centrifugal fans are typically used in high pressure/resistance applications.

The inventor has found that axial fans are preferred over centrifugal fans in respiratory and eye protection device applications because they generate less audible noise, require less power, are less expensive, and have more compact designs. Furthermore, axial fans generate higher airflow rates and move a greater volume of air, making it possible to achieve a greater number of air changes per hour. Additionally, axial fans can be stacked in series to increase the static pressure, thus optimized for higher pressure/resistance applications. Axial fans can also be used in parallel in order to increase the total airflow volume.

In one embodiment, the axial fans have a fan speed ranging from about 200 to about 3,300 rotations per minute (rpm), generate a volumetric airflow rate ranging from about 45 to about 90 cubic feet per minute (CFM), generate a static pressure ranging from about 2 to about 5 millimeters of water (mm $H_2O$), and generate an audible noise of about 40 decibels (dbA) or less, preferably about 20 dbA or less.

There are scalable filters that are specifically designed to maximize the capture of either aerosolized particles or vapors.

An example of an aerosolized particle filter is a filter having a minimum efficiency reporting value (MERV) rating equal to 13 or greater, preferably a MERV rating ranging from 13 to 16. These filters are used in the HVAC industry and are superior at capturing aerosolized particles having a size of about 0.3 micrometers (μm), which is considered to be the "most penetrating particle size" (of the aerosolized particle contamination filter). A particle size of about 0.3 μm is too small to be easily captured by inertial impact (like larger particles) but not small enough to be significantly affected by Brownian motion (like smaller particles), making it the most difficult size to filter out effectively by most air filters. The MERV rating is based on the ability of the filter to capture larger particles between 0.3 and 10 μm. For instance, a filter with a MERV rating of 13 can capture greater than or equal to 50% of particles ranging from 0.3 to 1 μm versus a filter with a MERV rating of 16 can capture greater than or equal to 95% of particles ranging from 0.3 to 1 μm. The inventor has found that filters with a MERV value of 13 to 16 provide the best filtration efficiency with the least amount of airflow resistance. Filters with a MERV value ranging from 13 to 16 are also used in the HVAC industry.

Another example of an aerosolized particle filter is a high efficiency particulate air (HEPA) filter. These filters and are used in homes and hospitals and have a filtration efficiency of 99.97% for airborne particles that are 0.3 μm or larger in size. However, MERV filters with a rating value of 13 to 16 are preferred over HEPA filters because they are less expensive and do not require as much pressure to operate.

In one embodiment, the aerosolized particle contamination filter is configured (i.e., designed to perform the recited function of) to achieve an aerosolized particle contamination filtration efficiency of 50% or greater for particles having a size of about 0.3 μm, preferably 95% or greater.

In one embodiment, aerosolized particle filters can be come in the form of a cartridge or a panel. Cartridge filters are typically cylindrical/tubular and comprise filter media, end caps, a core, gaskets/O-rings, and a support cage. Panel filters comprise a frame (e.g., square or rectangular), filter media, and optionally, some form of backing/support for the filter media. Panel filters have a thickness ranging from about 1 inch to about 5 inches.

In one embodiment, the filter media may be pleated which is when the filter media is folded into a series of pleats to increase surface area. Furthermore, the filter media may be electrostatically charged and therefore utilize static electricity to increase the capture of particles by the filter media. Additionally, filters can be stacked in series to increase the filtration efficiency.

Vapor filters comprise activated carbon as an adsorbent and typically consists of a housing containing a bed of granular activated carbon, designed for efficient contact between the vapor and the carbon surface. The high efficiency gas adsorber (HEGA) filter is a type of vapor contamination filter that uses woven activated carbon cloth and exhibits a minimum mechanical efficiency of 99.9% when tested in accordance with the Institute of Environmental Sciences designation: IES-RP-CC-008-84. For example, the Allergy Machine™ (manufactured by Austin Air) uses a HEGA filter.

Based on the direction of output airflow generated by the at least one fan, it is desirable to stack or otherwise dispose the vapor contamination filter after the aerosolized particle filter to maximize capture of chemical aerosol/vapor agents. However, if the vapor contamination filter is placed before the aerosolized particle filter, the aerosolized particle filter can trap any of the activated carbon that may break loose.

The activated carbon acts as a porous media where vapors are trapped and held onto the large surface area within the carbon particle. The filtration efficiency of the activated carbon is determined by the type and amount of contaminant in the gas stream, the type and amount of adsorbent, and the residence time (the time that the gas stream is in contact with the carbon). In one embodiment, a residence time of about 0.125 seconds is sufficient.

In order to capture specific chemical agents, the activated carbon may be impregnated with an impregnant selected from the group consisting of copper, silver, zinc, molybdenum, triethylenediamine (TEDA), zeolite, potassium iodine, chromium, and combinations of one or more of the foregoing. For example, the United States Army uses ASZM-TEDA having the following composition:

| Impregnant | Content (wt. %) |
|---|---|
| Cu | 6.0 |
| Ag | 0.1 |
| Zn | 6.0 |
| Mo | 2.5 |
| TEDA | 3.5 |

Various grades (A, N, T) of carbon are available for the vapor filter. A-grade carbon is activated 8×16 carbon mesh used to adsorb heavy solvents, elemental iodine, and most odors. N-grade carbon is 8×16 carbon mesh made with specially impregnated activated carbon used to adsorb organic radioactive iodide. T-grade carbon uses 12×30 carbon mesh made with ASZM-TEDA used to adsorb chemical warfare agents. A-grade and N-grade carbon may still adsorb chemical warfare agents but not to the same degree as T-grade carbon. Vapor filters may also be dimethyl methylphosphonate (DMMP) certified by the United States Army Combat Capabilities Development Command (DEVCOM), Aberdeen Proving Grounds. During DMMP certification, vapor filters are destructively evaluated using DMMP as a chemical nerve agent simulant.

In one embodiment, the vapor contamination filter is configured (i.e., designed to perform the recited function of) to achieve a vapor contamination filtration efficiency of 50% or greater, preferably 95% or greater, for one or more of Novichok nerve agent (A232), thickened venomous nerve agent (TVX), sulfur mustard agent (HD), thickened sulfur mustard agent (THD), soman nerve agent (GD), and sarin nerve agent (GB).

1. Air Processing Assembly

As shown in FIG. 1, an air processing assembly (10) comprises at least one axial fan (1) and at least one filter (2) stacked together in various configurations (10*a*-10*f*), depending on the required static pressure and/or filtration efficiency. For example, the air processing assembly can have one axial fan stacked on top of one filter (10*a*) or can have two fans stacked on top of one filter (10*b*). In one embodiment, the at least one axial fan and the at least one filter are stacked such that the respective centers of each of the foregoing are aligned. The air processing assembly has an air processing assembly inlet (3) and an air processing assembly outlet (4) based on an input airflow (5) generated by the least one axial fan. The at least one axial fan and the at least one filter are stacked together between the air processing assembly inlet and the air processing assembly outlet. The at least one filter and the at least one axial fan can be any combination of filter and axial fan previously recited to include any filter and fan configurations and any filter materials.

Figure 2:
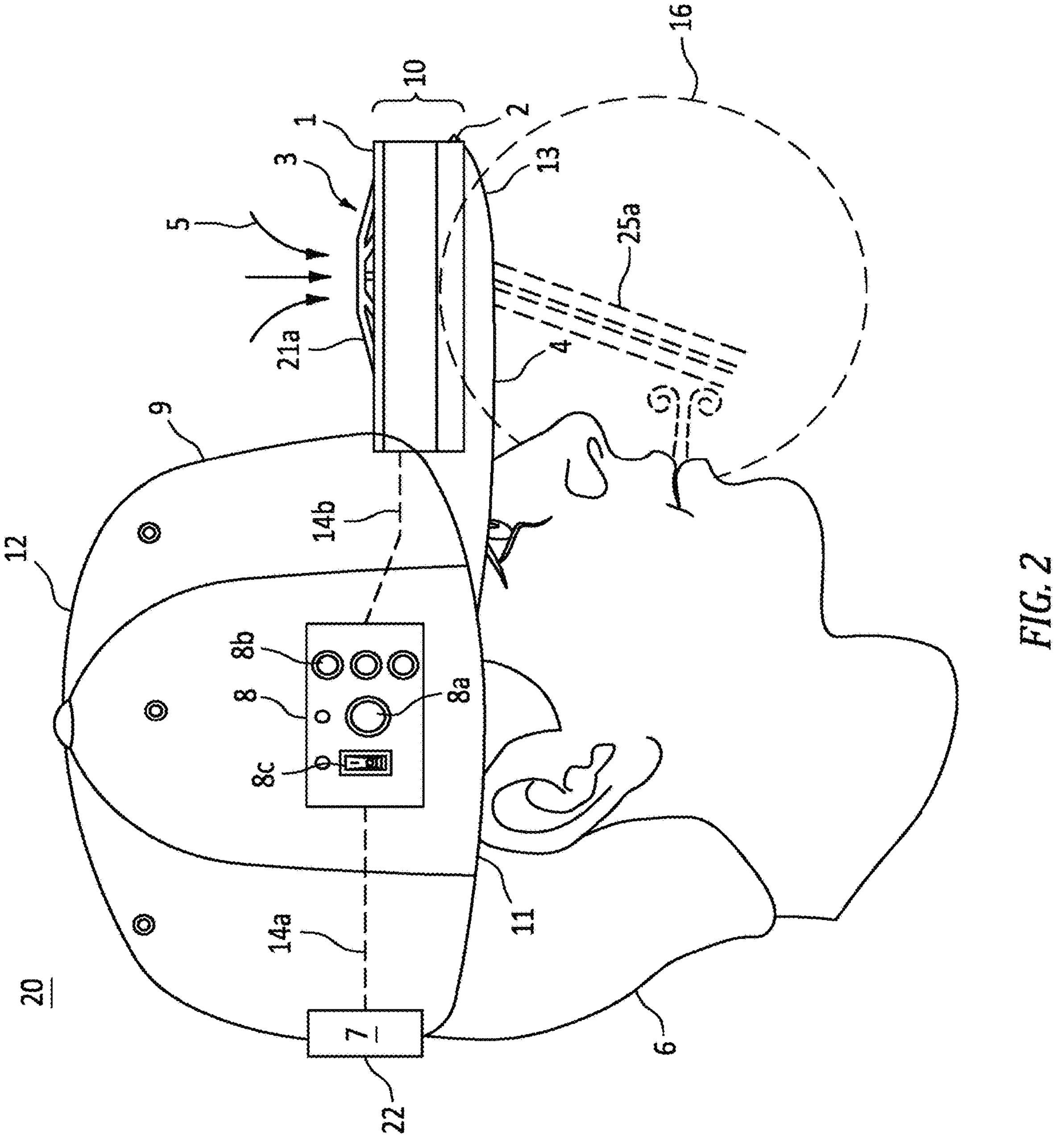
FIG. 2 depicts a side view of a respiratory and eye protection device, in accordance with an embodiment of the present invention.
Figure 6:
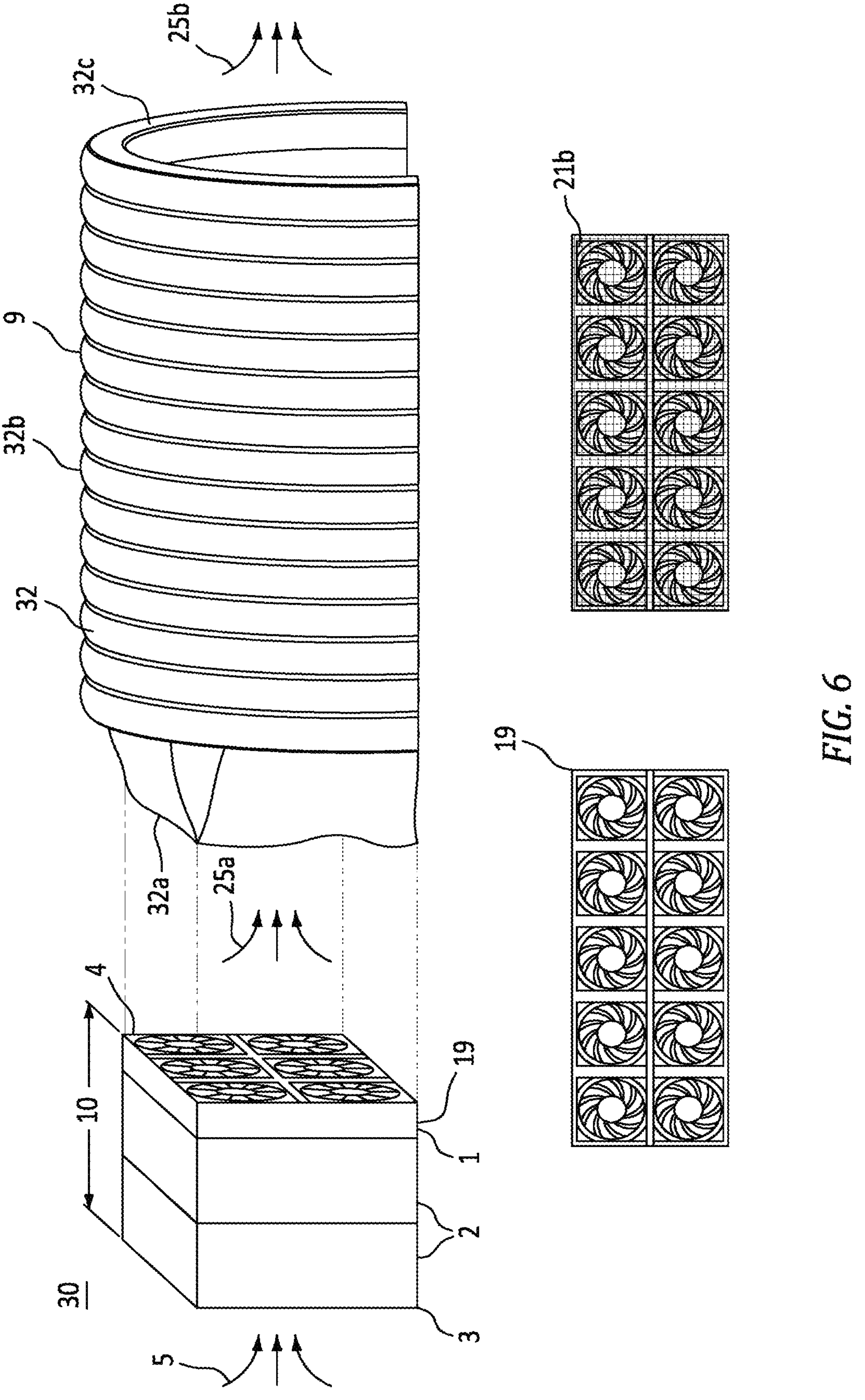
FIG. 6 depicts a perspective view of a respiratory and eye protection device, in accordance with an embodiment of the present invention.

In one embodiment, as shown in FIG. 1, the at least one filter comprises a filter inlet (2*a*) and a filter outlet (2*b*), and the at least one axial fan comprises a fan inlet (la) and a fan outlet (1*b*), and the filter inlet and the filter outlet are equal to or greater than the fan inlet and the fan outlet. In one embodiment, the air processing assembly inlet comprises an inlet guard (21*a*) (as shown in FIG. 2) and the air processing assembly outlet comprises an outlet guard (21*b*) (as shown in FIG. 6). The primary purpose of the inlet guard is to prevent debris from entering the air processing assembly. The primary purpose of the outlet guard is to provide additional protection to a user of the respiratory and eye protection device and prevent fingers and other body parts from indiscriminately entering the air processing assembly. In one embodiment, the inlet guard has a mesh size ranging from about 0.5 to about 3, preferably about 20 to about 200 and the outlet guard has a mesh size ranging from about 0.5 to about 3. However, any material known to the skilled artisan can be used as an inlet guard and an outlet guard to achieve these purposes such as hardware cloth sized about 0.5 inches and below, preferably about 0.25 inches and below, metal wire fan finger guard grill, aluminum screening, and combinations of one or more of the foregoing.

2. Personal Respiratory and Eye Protection Device

A. Wearable Personal Respiratory and Eye Protection Device

As shown in FIG. 2, the air processing assembly (10) can be implemented in a personal respiratory and eye protection device (20) that can be worn by the user. In some embodiments, the wearable personal respiratory and eye protection device provides an aerosolized particle contamination filtration efficiency of at least 75% or preferably at least 85%, or even more preferably at least 95% for particles having a size of about 0.3 μm and therefore provides protection from ambient and close-contact aerosol air inhalation without obstructing the face of the user. In some embodiments, the wearable personal respiratory and eye protection device generates a noise level ranging about 60 decibels (dBA) or less, when the at least one axial fan is in operation, measured within about 3 inches from an ear of the user. In some embodiments, the wearable personal respiratory and eye protection device is also lightweight and requires minimal power. In one embodiment, the wearable personal respiratory and eye protection device weighs between about 0.5 to about 1.5 pounds and has a power requirement ranging from about 0.1 amps to about 0.6 amps. Therefore, the user can still nourish themselves, freely communicate, and perform physical activity, while still being protected from air contamination without developing discomfort or exhaustion from the personal respiratory and eye protection device, without heat stress in warm/hot climates, and without being physically tethered to an airline for air supply or an alternating current (AC) power supply. The wearable personal respiratory and eye protection device is therefore suitable for daily use, especially at school, the office, the hospital, and at home with sick family members, where there is a likelihood of exposure.

In this arrangement, the at least one axial fan (1) can comprise one or more axial fans. The air processing assembly is coupled to a frame (9) which accommodates a user (6) of the personal respiratory and eye protection device. Although the at least one axial fan is depicted as being stacked on top of the at least one filter such that the at least one axial fan is disposed at the air processing assembly inlet, the at least one filter may be stacked on top of the least one axial fan. The air processing assembly is in line with an inhalation zone (16) of the user during inhalation and is disposed above the inhalation zone with respect to the direction of output airflow (25*a*) generated by the at least one axial fan in the inhalation zone (i.e., above the inhalation zone in front of the face of the user). In one more embodiments, the output airflow generated by the at least one axial fan is substantially laminar.

In one embodiment, the inhalation zone is an approximately 10-inch radius around the nose and mouth of the user, wherein the majority of the air is drawn into their lungs, in conformity with the definition used by the United States Department of Labor. In one embodiment, the air processing assembly processes substantially all ambient air in a direction of output airflow generated by the at least one axial fan before entering the inhalation zone. Furthermore, the air processing assembly outlet only releases air in the inhalation zone that has been substantially filtered by the at least one filter. Therefore, the air processing assembly is attached to the frame in such a manner such that ambient air must substantially first enter the processing inlet before entering the inhalation zone. For example, there should be no significant gaps between the frame and the air processing assembly that would allow substantially contaminated air to enter the inhalation zone. Although the interface between the at least one axial fan and the at least one filter does not necessarily need to be sealed, substantially all of the input airflow generated airflow from the at least one axial fan should pass through the at least one filter. One technique to avoid having to seal the interface between the at least one axial fan and the at least one filter is to ensure that the at least one filter is larger than the at least one axial fan when stacked such that a periphery of the at least one filter extends past the at least one axial fan on all sides. If used, the interfaces between two or more stacked axial fans and the interfaces between the two or more stacked filters should also be brought in close contact with limited spacing or directly in contact, if not sealed. Any means known to the skilled artisan can seal/substantially seal and/or couple the interface between the at least one axial fan and the at least one filter, between two stacked axial fans, and between two stacked filters, including acrylic sealants, silicone sealants, polyurethane sealants, butyl sealants, and polysulfide sealants. In one embodiment, tape is used to seal and/or couple the at least one axial fan and the at least one filter, between two stacked axial fans, and between two stacked filters, however, any fastener and adhesive can be used known to the skilled artisan.

In some embodiments, the at least one axial fan generates a substantially laminar output airflow in the inhalation zone. As discovered by the inventor, a laminar output airflow is ideal to protect the user from airborne CBRN agents since turbulent flow will promote the mixing and entraining of filtered air from the at least one filter with contaminated ambient air within the inhalation zone. In one embodiment, the output airflow (25*a*) generated by the at least one axial fan is directed towards the face of the user. The inventor discovered by tilting the at least one axial fan (or otherwise redirecting the output airflow generated by the at least one axial fan) towards the face of the user, even by a slight amount such that the output airflow generated by the at least one axial fan is directed towards the face of the user, the filtration efficiency for particles having a size of about 0.3 μm increased. In one or more embodiments, the at least one axial fan (or the output airflow generated by the at least one axial fan) is tilted about 1 degree or more, about 2 degrees or more, about 5 degrees or more, about 10 degrees or more, about 15 degrees or more, or about 20 degrees or more towards a major surface of the face of the user with respect to a direction parallel to the height of the user when standing and/or with respect to the stacking direction of the at least one filter and the at least one axial fan. In one embodiment, the at least one axial fan generates a velocity of output airflow ranging from about 50 to about 500 feet per minute (ft/min), measured in the inhalation zone.

In an embodiment, the frame comprises an attachment mechanism (11), a protrusion (13) coupled to the attachment mechanism, and a crown (12) surrounding a top portion of the head of the user, coupled to the attachment mechanism and the protrusion. However, in other embodiments, the frame may just comprise the attachment mechanism (e.g., a clip for attaching to an article of clothing such as a hat or a pair of eyeglasses) or the frame may just comprise the attachment mechanism and the protrusion (e.g., a visor). In one embodiment, the attachment mechanism may be a strap or a band that couples the personal respiratory and eye protection device to a head of the user. In one embodiment, the protrusion may be a brim of a hat.

As shown in FIG. 2, the frame may be a baseball hat. However, the frame may have several other configurations that are capable of being worn by the user and known to the skilled artisan. For example, the frame may also be a helmet to add additional blunt force protection in hazardous areas wherein there is a potential for head injury such as on construction sites or an operational environment for the military.

Figure 3:
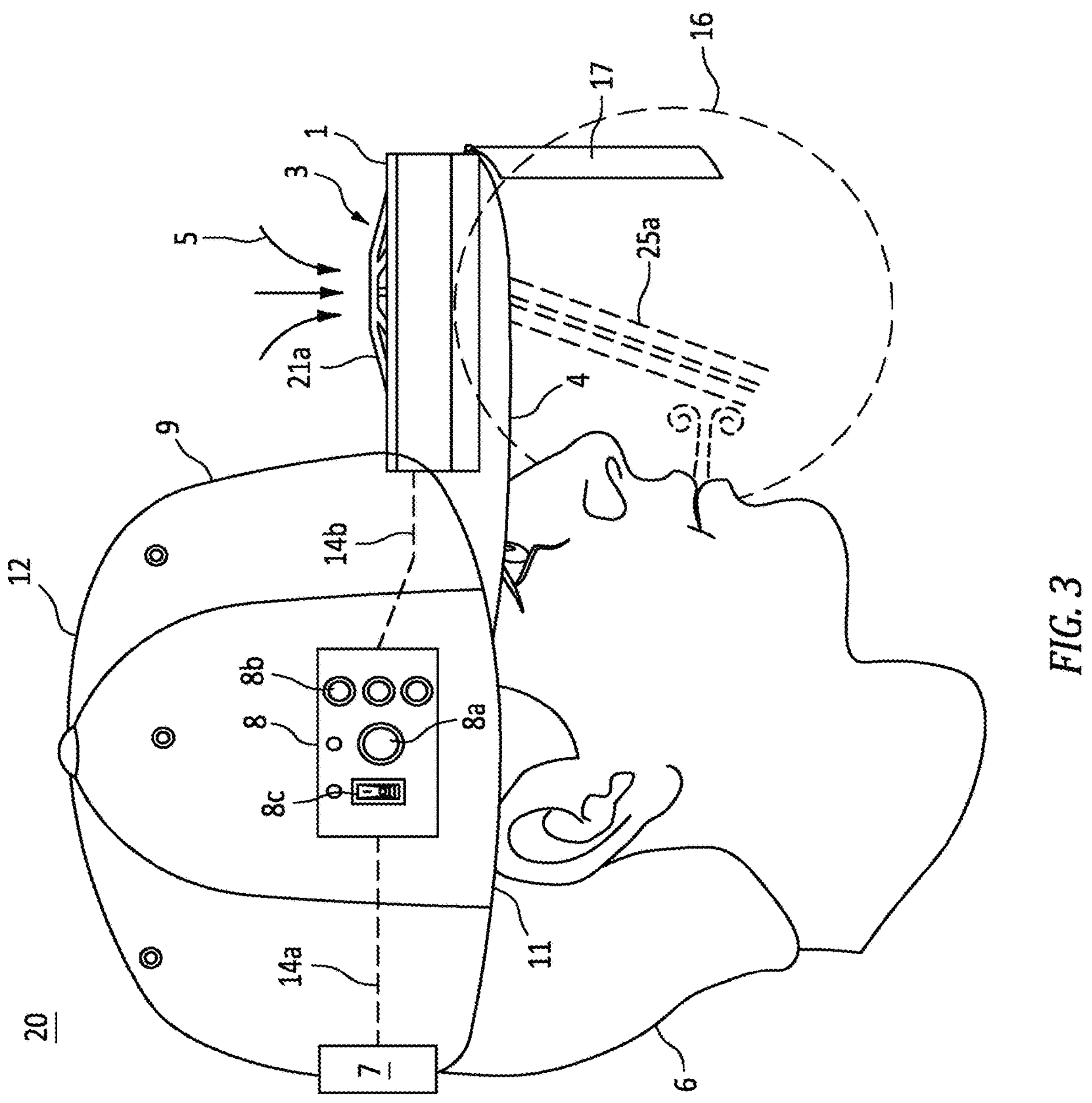
FIG. 3 depicts a side view of a respiratory and eye protection device, in accordance with an embodiment of the present invention.

As shown in FIG. 3, the wearable personal respiratory and eye protection device may comprise a face shield (17) made of a semi-transparent material that is coupled to the frame, extending from the frame towards the inhalation zone. For example, the face shield may cover the face from the forehead down to the tip of the nose, the bottom lip, the bottom of the chin, or the larynx. The inventor discovered that by adding a face shield, the filtration efficiency for particles having a size of about 0.3 μm increased. In one embodiment, the face shield is either coupled to an end of the protrusion or is coupled to the attaching mechanism. In some embodiments, the face shield may be made of any material known to the skilled artisan to include polycarbonate, polyethylene terephthalate (PET), glycol modified polyethylene terephthalate (PETG), polypropylene thermoplastics, and one or more of the foregoing. Any means known to the skilled artisan can couple the face shield to the frame including acrylic sealants, silicone sealants, polyurethane sealants, butyl sealants, and polysulfide sealants. In one embodiment, tape is used to couple the face shield to the frame, however, any fastener and adhesive can be used known to the skilled artisan. In one embodiment, the face shield is integral to the frame.

In one embodiment, the frame comprises an electromagnetic interference (EMI) shielding material configured (i.e., designed to perform the recited function of) to shield the user from EMI generated by the at least one fan or other electrical components to a specific absorption rate (SAR) of 1.6 watts per kilogram (W/kg) or below. The electromagnetic interference (EMI) shielding material can either be integrated with the frame (e.g., as a fabric) or can be added as a layer to the attachment mechanism, crown and/or the protrusion. The EMI shielding material can be nickel, copper, aluminum, carbon black, iron, and any combination of the foregoing.

Figures 4, 5:
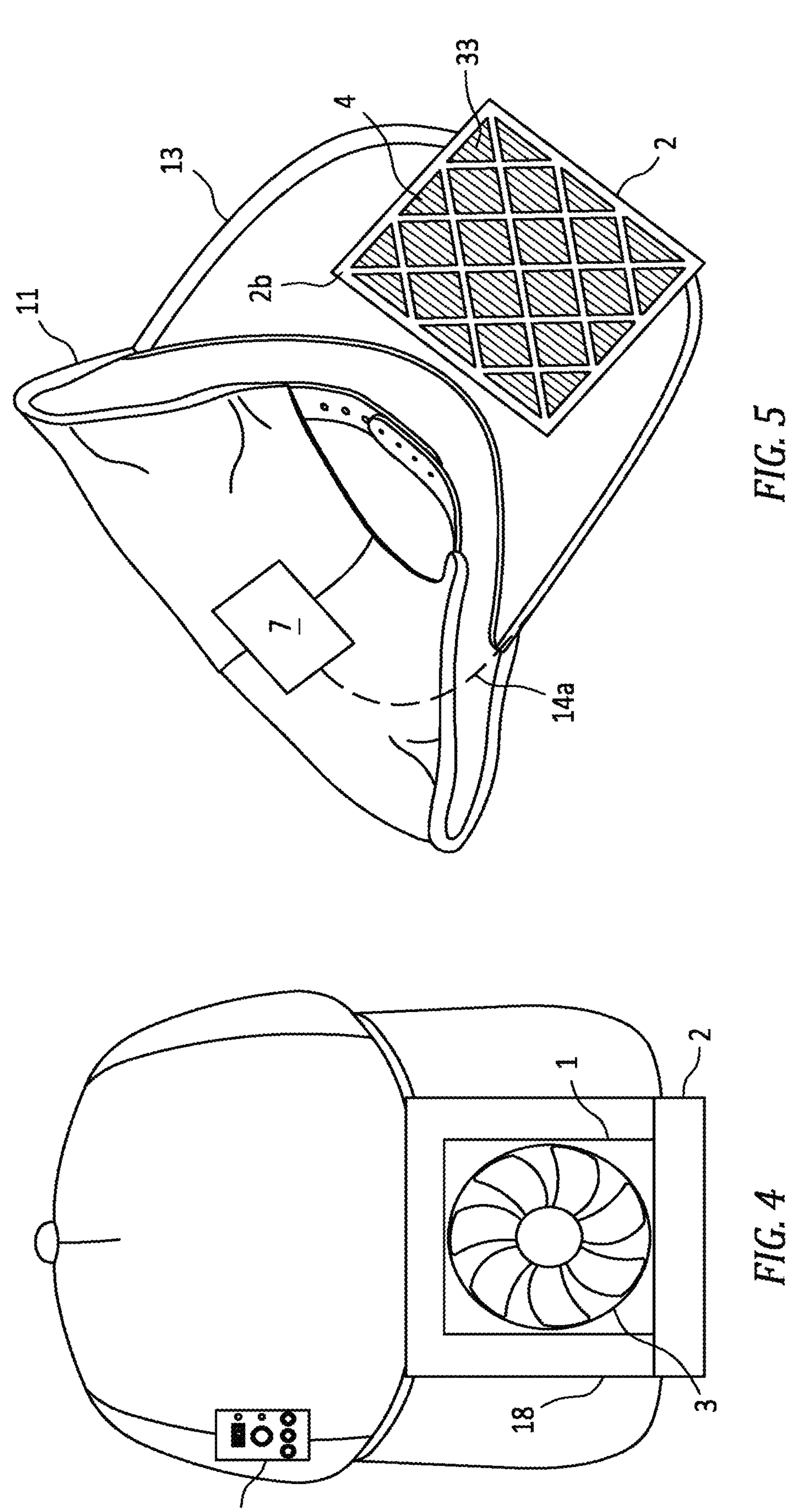
FIG. 4 depicts a top view of a respiratory and eye protection device, in accordance with an embodiment of the present invention.
FIG. 5 depicts a perspective view of a bottom of a respiratory and eye protection device, in accordance with an embodiment of the present invention.

As shown in FIG. 4, in some embodiments, the protrusion comprises at least one reinforcement member (18) disposed on one or more sides of the air processing assembly. The at least one reinforcement member reinforces the protrusion to support the weight of the air processing assembly. Otherwise, the air processing assembly may obstruct the field of view of the user by causing the protrusion to sag. This is especially apparent when two or more axial fans or two or more filters are stacked. In some embodiments, the at least one reinforcement member may be any rigid material known to the skilled artisan such as plastic, metal or wood. In one embodiment, the at least one reinforcement member is coupled to the protrusion and the at least one filter. Optionally, the at least one reinforcement member is coupled to at least one lateral side of the attachment mechanism. Any means known to the skilled artisan can couple the at least one reinforcement member to the frame including acrylic sealants, silicone sealants, polyurethane sealants, butyl sealants, and polysulfide sealants. In one embodiment, tape is used to couple the at least one reinforcement member to the frame, however, any fastener and adhesive can be used known to the skilled artisan. The air processing assembly inlet guard (21*a*) is not depicted in FIG. 4 to facilitate showing the skewed fan blades of the at least one axial fan.

As shown in FIG. 5, the processing assembly may be coupled to the protrusion through an aperture in the protrusion. In one embodiment, the at least one filter comprises at least one pleat (33) oriented perpendicular to a facing direction of the user when the wearable personal respiratory and eye protection device is worn by the user. In this configuration, the at least one axial fan and the at least one filter are stacked together such that the at least one filter is larger than the at least one axial fan by at least about 1.5 inches on each side of the at least one axial fan, based on the pleat orientation. In such a configuration, the input airflow generated by the at least one axial fan will not (or minimally) bypass the filter, increasing the filtration efficiency. The specific pleat orientation and filter margin facilitate minimizing the filter leakage that occurs due to cutting the at least one filter from a larger panel filter as purchased. For instance, a panel filter as purchased has a frame (i.e., a border material) that surrounds the filter media. When the panel filter is cut to size, at least two sides of the frame need to be removed, leaving only the filter media at these exposed edges. The input airflow (5) generated by the at least one axial fan may bypass the filter at the exposed edges (i.e., the sides without the frame) as well as the sides with the frame unless the at least one pleat (33) is oriented perpendicular to a facing direction of the user when the wearable personal respiratory and eye protection device is worn by the user and the at least one filter is larger than the at least one axial fan by at least about 0.25 inches, about 0.50 inches, about 0.75 inches, about 1 inch, about 1.25 inches, about 1.50 inches, about 1.75 inches, about 2 inches, or more on each side of the at least one axial fan, based on the pleat orientation.

In an alternative embodiment, the at least one filter is a cylindrical cartridge filter that is stacked on top of the at least one axial fan and thus disposed at the air processing assembly inlet. For example, the cylindrical cartridge filter may be a TruSens Standard HEPA Filter for Z-2000 (manufactured by DuPont). In this embodiment, input airflow generated by the at least one axial fan is pulled through the cylindrical cartridge filter by the at least one axial fan and into the inhalation zone. In this configuration, the interface between the at least one axial fan and the cylindrical cartridge filter may need to be sealed or substantially sealed. Any means known to the skilled artisan can seal the interface between the at least one axial fan and the cylindrical filter cartridge including acrylic sealants, silicone sealants, polyurethane sealants, butyl sealants, and polysulfide sealants. In one embodiment, tape is used to couple the at least one axial fan and the cylindrical filter cartridge, however, any fastener and adhesive can be used known to the skilled artisan. Additionally, such a configuration would negate the necessity of having to cut the at least one filter from a large panel filter and thus form a better seal between the cylindrical cartridge filter and the at least one axial fan.

Additionally, as shown in FIG. 5, the wearable personal respiratory and eye protection device may comprise a counterweight (7) for balancing the weight of the air processing assembly in order to provide additional comfort to the user. For example, the air processing assembly may cause discomforting pressure on the forehead and lead to neck fatigue. The counterweight may be placed anywhere on the frame and made of any material known to the skilled artisan that can achieve this purpose. In one embodiment, the counterweight may be a power source (22) such as a battery (e.g., a 12-volt battery), or a controller (8).

The power source may be electrically connected to a controller (8) by a connection (14*a*) and the controller is electrically connected to the at least one axial fan by a connection (14*b*). However, a power source of the personal respiratory and eye protection device is not limited to a battery and may alternatively use solar power or another power source. In one embodiment, the controller may comprise a regulator for manually adjusting one or more settings of the wearable personal respiratory and eye protection device. For example, the one or more settings may be one or more of activating and deactivating power from the power source and controlling the speed of the output airflow (25*a*) generated by the at least one axial fan. As shown in FIG. 2, in one embodiment, the controller is coupled to the frame such that the regulator is accessible to the user while the personal respiratory and eye protection device is worn.

B. Non-Wearable Personal Respiratory and Eye Protection Device

In another aspect of the present invention and as shown in FIG. 6, the air processing assembly (10) can be implemented in a personal respiratory and eye protection device (30) for enclosing the user without being worn or otherwise attached to the user for close-range and/or long-range vapor and aerosolized particle contamination protection.

In one embodiment, the frame (9) comprises a canopy (32) having a canopy inlet (32*a*) coupled to the air processing assembly outlet (4), a canopy outlet (32*c*) for exhausting air (25*b*) introduced into the canopy, and a canopy body (32*b*) between the canopy inlet and the canopy outlet.

In one embodiment, the at least one axial fan of the air processing assembly may comprise two or more axial fans arranged in parallel (19) that are stacked with the at least one filter. For example, the at least one axial fan may comprise two or more rows of two or more axial fans arranged in parallel, preferably two rows of five or more axial fans arranged in parallel. In one embodiment, the air processing assembly outlet guard (21*b*) protects the head of the user or another body part from coming into contact with a skewed fan blade of the one or more axial fans. The air processing assembly outlet guard is properly sized and/or spaced to minimally obstruct output airflow (25*a*) generated by the at least one axial fan so as to minimize the turbulent airflow within the canopy. In one or more embodiments, the laminar output airflow (25*a*) generated by the at least one axial fan is substantially laminar.

In one embodiment, the distance between the canopy inlet and the canopy outlet is suitable to enclose the entire height of a user. In another embodiment, the distance between the canopy inlet and the canopy outlet ranges between about 6 inches to about 6 feet, preferably between about 6 inches and about 3 feet. Most importantly, in this embodiment the canopy should enclose the nose and mouth of the user and therefore the canopy body should be capable of accommodating the user when a user fully places their head into the canopy body through the canopy outlet. In this embodiment, a width and a height of the canopy should also be appropriately sized to accommodate the user. In one embodiment, the canopy is sized such that a distance ranging from about 6 inches to about 1.5 feet between the user and an interior of the canopy (i.e., lateral walls and ceiling).

In one embodiment, the canopy body is made of a semi-permeable material selected from the group consisting of cardboard, polymer fabric, sheet metal, plexiglass, and combinations of one or more of the foregoing. The transparency of the canopy body can also vary based on application. For example, in a hospital setting where a doctor needs to observe the patient, a more transparent material would be desired. However, to enable the user to sleep and have added privacy, in embodiments, it would be desirable to be less transparent. The canopy body should be able to contain and guide the substantially laminar output airflow generated by the at least one axial fan out of the canopy through the canopy outlet. The canopy body should also be able to protect the user by substantially preventing aerosolized particle air contamination, vapor contamination, or both from entering the canopy.

In one embodiment, the canopy body comprises a ceiling, one or more sidewalls, and optionally, a floor. In this instance, the floor is a surface on which the user lays on, e.g., in the prone position, in the supine position, or in the fetal position.

In one embodiment, the canopy inlet and the canopy outlet are substantially the same size and are concentrically arranged. In another embodiment, a slope of the canopy (i.e., the ceiling of the canopy) deviates about 25 degrees or less, about 20 degrees or less, about 15 degrees or less, about 10 degrees or less, about 5 degrees or less, or about 2 degrees or less with respect to the stacking direction of the at least one axial fan and the at least one filter and/or with respect to a direction parallel to the height of the user when in the supine position. In this configuration, vapor and aerosolized particle contamination in the ambient air is less likely to circulate into the canopy body through the canopy outlet. For example, if a height of the canopy body was larger than a height of the canopy inlet, the rapid expansion (or contraction) of volume can cause turbulent airflow within the canopy body or at the canopy outlet.

In one embodiment, the canopy inlet is coupled to the air processing assembly outlet such that of the air introduced into the canopy, substantially only air filtered by the at least one filter is introduced into the canopy. Any means known to the skilled artisan can seal or substantially seal the interface between the air processing assembly outlet and the canopy inlet including acrylic sealants, silicone sealants, polyurethane sealants, butyl sealants, and polysulfide sealants. In one embodiment, tape is used to couple the air processing assembly outlet and the canopy inlet, however, any fastener and adhesive can be used known to the skilled artisan.

Although not depicted, in an embodiment, the air processing assembly is generally disposed such that the at least one axial fan generates a substantially laminar output airflow substantially perpendicular to a surface supporting the user (e.g., the floor). In this instance, the user may be sitting, standing, or laying down (e.g., in the prone position, in the supine position or in the fetal position). In one embodiment, the user may be an infant or child in a crib and unable to wear an N95 respirator or gas mask. In one embodiment, the air processing assembly is suspended from a ceiling, a wall, or another surface object known to the skilled artisan and thus the canopy does not contact the floor. In another embodiment, the canopy contacts the floor, but output airflow generated by the at least one axial fan is able to exit through the canopy outlet via spacers between the canopy outlet and the floor.

Figure 7:
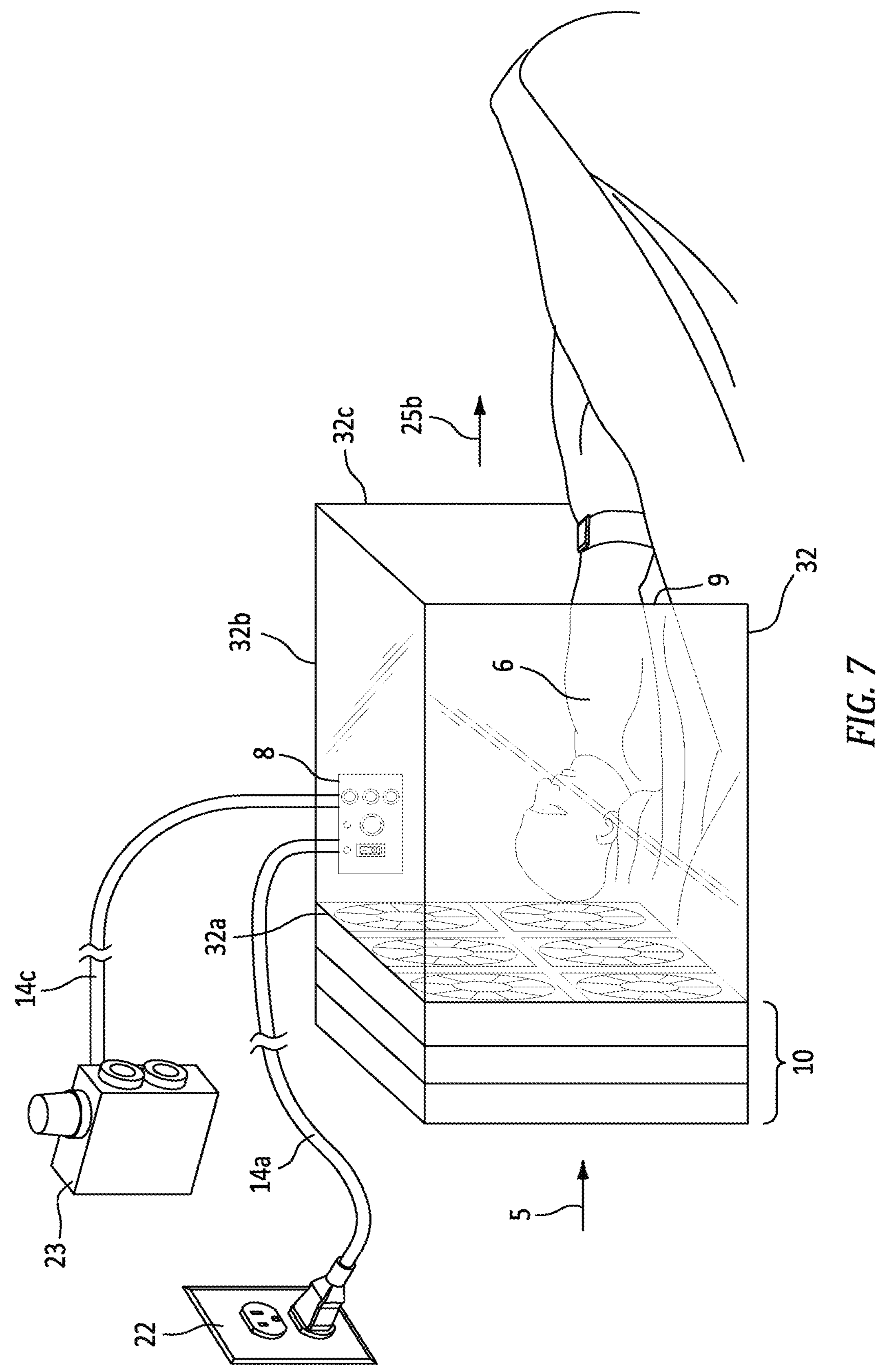
FIG. 7 depicts a perspective view of a respiratory and eye protection device, in accordance with an embodiment of the present invention.

As depicted in FIG. 7, in an embodiment (i.e., the respiratory and eye protection sleeping device), the air processing assembly is disposed such that the at least one axial fan generates a substantially laminar output airflow (25*a*) parallel to a surface supporting the user (e.g., the floor). This embodiment is ideal when the user is laying down (e.g., in the prone position, in the supine position or in the fetal position while sleeping). Shared sleeping quarters (e.g. bunks or beds aboard ships and in prisons) have been shown to amplify aerosolized transmission (cross-infection) due to maximal duration and minimal distance of inhalation exposure. One of the major constraints in places like berths (i.e., sleeping arrangements) on aircraft carriers, battleships, and submarines is the amount of space to insert air purifiers is very constrained. Furthermore, to reach an ACH target (e.g. 12 ACH), the portable air purifiers are bulky (space-consuming) because they need to be provisioned in proportion to room volume as described above. In this embodiment, the personal respiratory and eye protection device can protect the sailor/passenger enclosed within the canopy as well as add communal air cleaning to shared sleeping quarters. For example, a network effect will occur when more sailors use the personal respiratory and eye protection device, since a greater volume of air within shared sleeping quarters will get filtered. The personal respiratory and eye protection device of this embodiment can also be used in other shared sleeping situations such as military barracks, travel on trains and airplanes, in hostels, and patient rooms in hospitals. The personal respiratory and eye protection device can further be implemented for home use when there are sick household members, especially if there is a shared bed arrangement.

Figure 8:
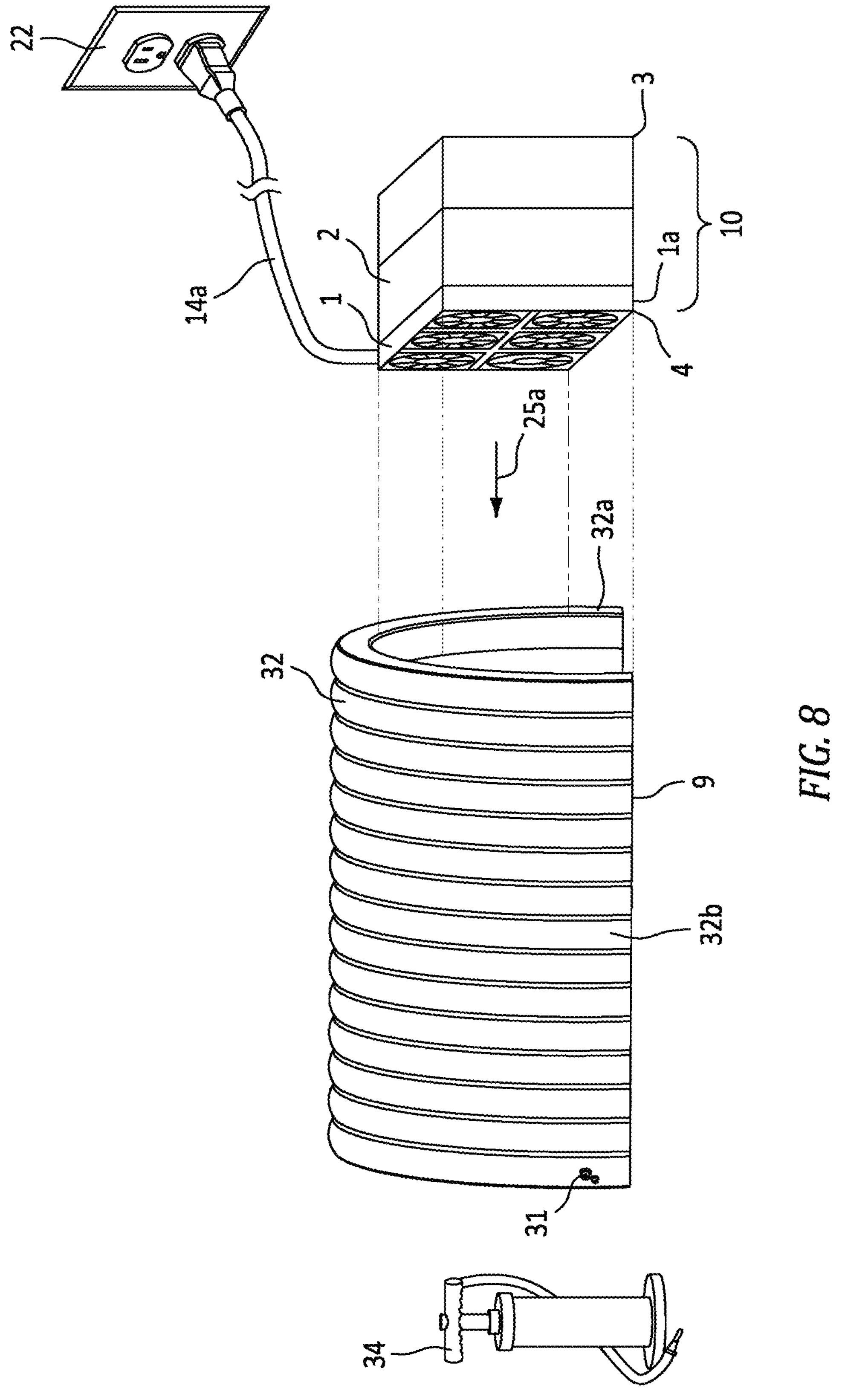
FIG. 8 depicts a perspective view of a respiratory and eye protection device, in accordance with an embodiment of the present invention.

As shown in FIG. 8, in some embodiments the canopy body may comprise at least one air valve (31) coupled to at least one inflatable air chamber (not depicted) embedded within walls of the canopy body. In this embodiment, the canopy is capable of inflating via the at least one air valve by either a manual hand pump (34), an automatic pump, an oral inflation tube, or any means known to the skilled artisan. In this embodiment, the canopy body comprises a polymer fabric selected from the group consisting of polyvinyl chloride, vinyl, nylon, latex, polychloroprene, mylar, and one or more of the foregoing. In an embodiment, the respiratory and eye protection device is a self-supporting structure when the canopy is inflated. For example, in this embodiment, when inflated, the canopy is able to stand on the surface supporting the user without having to secure the canopy to a wall, ceiling, or nearby object. This embodiment is particularly useful when expedient employment of the personal respiratory and eye protection device is required. When in a deflated state, the volume of the canopy is minimized, making it easier to transport and travel with the personal respiratory and eye protection device.

Figures 16A, 16B, 16C:
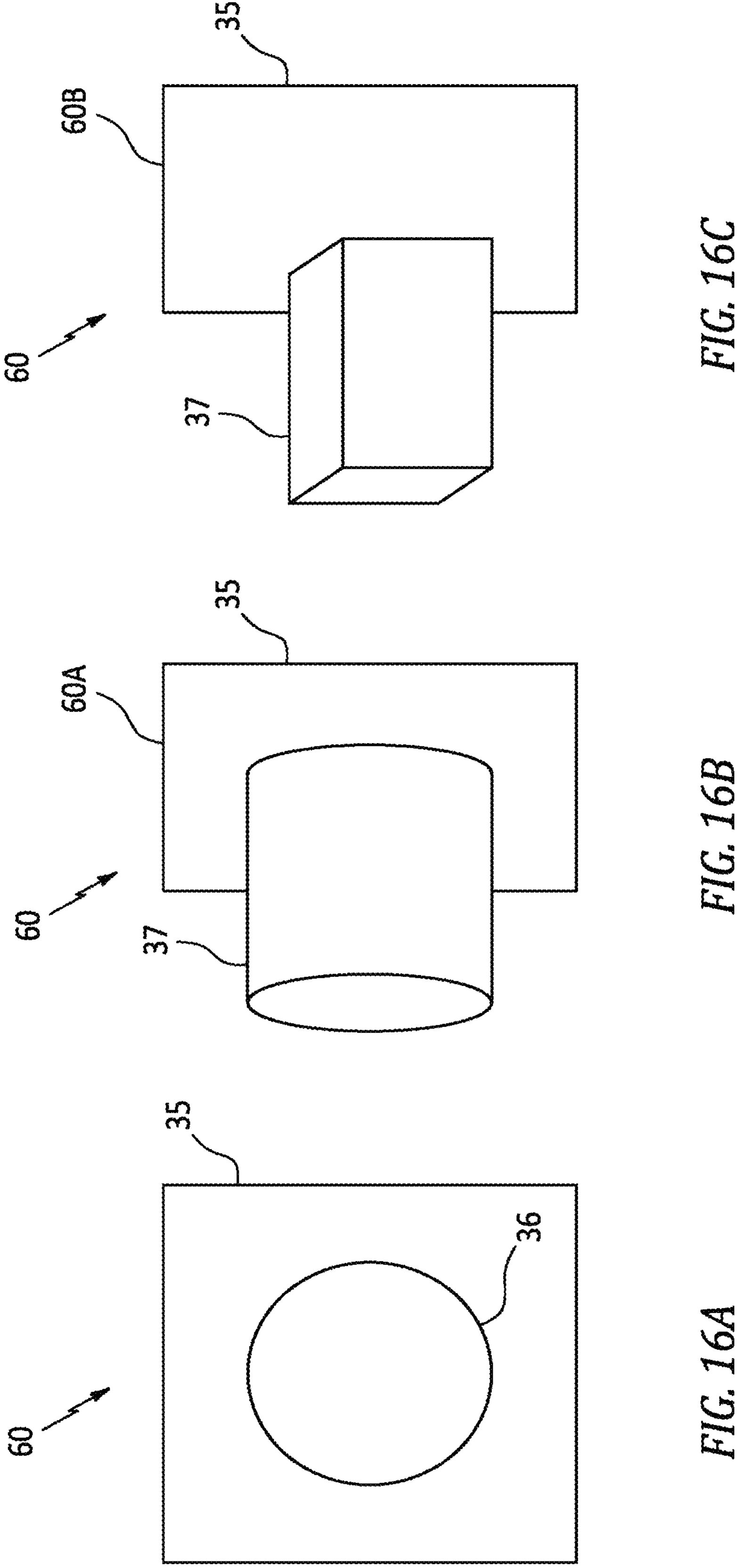
FIG. 16A depicts is a top view of a fan shroud base plate, in accordance with an embodiment of the present invention.
FIGS. 16B-C depict a perspective view of fan shrouds, in accordance with an embodiment of the present invention.

In one embodiment, the at least one axial fan is disposed at the air processing assembly outlet and the at least one filter is disposed at the air processing assembly inlet. In such an embodiment, as shown in FIGS. 16B-C, the at least one axial fan may have a fan outlet shroud (60) in order to improve the measured clean air delivery rate (CADR) by 10-20%. The inventor discovered that the fan outlet shroud enhances airflow through the filter (e.g., when airflow is pulled through the filter) by reducing flow recirculation (from outlet to inlet) and eddies at the fan blade tips, while inducing and enhancing air mixing in the room.

Figure 17B:
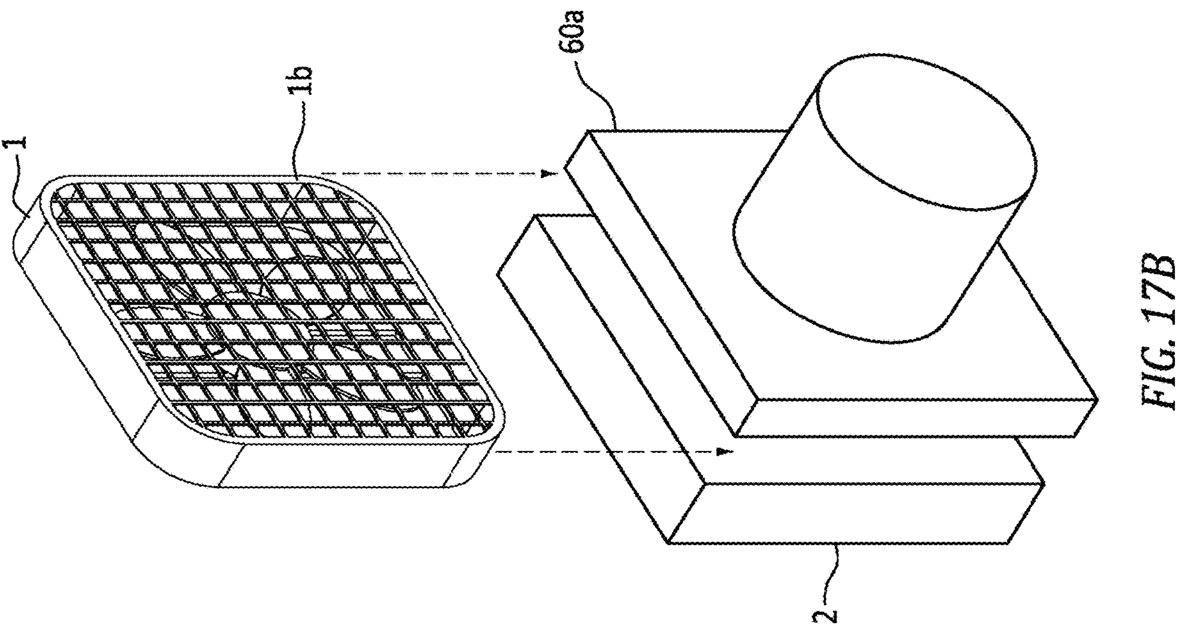
FIG. 17A-B depict a perspective view of a fan shroud, in accordance with an embodiment of the present invention.
Figure 17A:
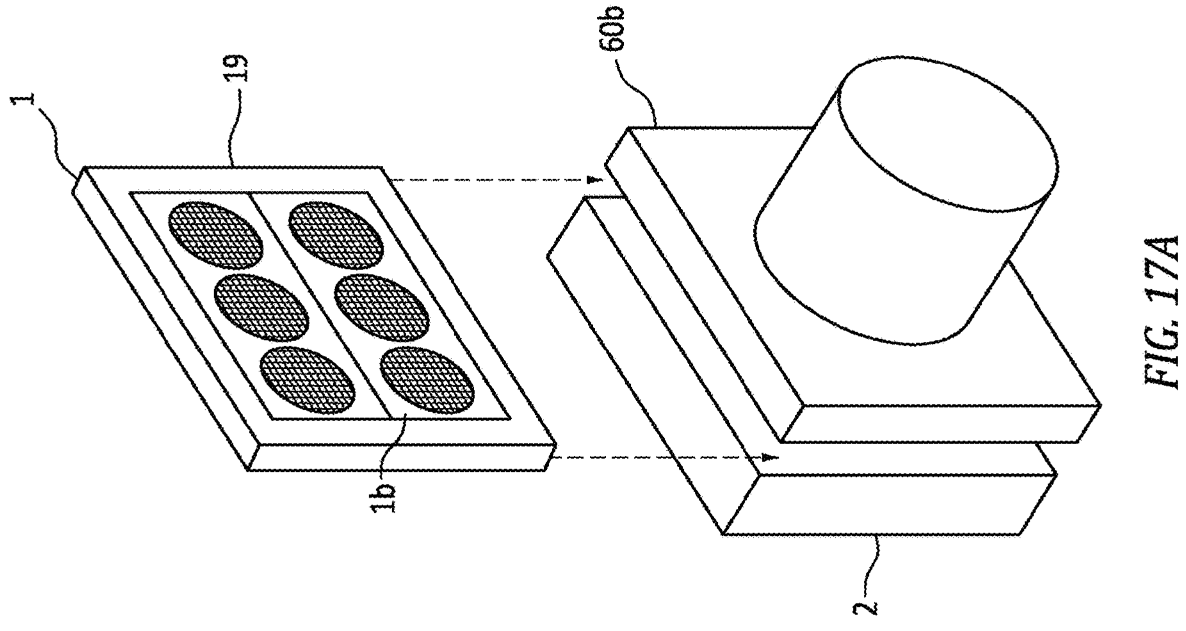

In one embodiment, the fan outlet shroud for the at least one axial fan comprises a base plate (35), as shown in FIG. 16A, for covering the outlet of at least one axial fan (1*b*). In this embodiment, a center of the base plate comprises a circular aperture (36) and a diameter of the circular aperture is smaller than a diameter of the outlet of at least one axial fan. As shown in FIGS. 16B-C, in this embodiment, an extension (37) is attached to the base plate at the circular aperture forming a sealed or substantially sealed connection. Any means known to the skilled artisan can seal and/or couple the interface between the base plate and the extension, including acrylic sealants, silicone sealants, polyurethane sealants, butyl sealants, and polysulfide sealants. In one embodiment, the base plate and the extension are welded together, however, any fastener and adhesive can be used known to the skilled artisan. In this embodiment, the extension comprises a channel extending the length of the extension substantially through the center of the extension and the at least one axial fan generates an output airflow (25*a*) through the channel and the circular aperture. In one embodiment, the circular aperture diameter ranges from about 10 to about 20 inches and the channel length ranges from about 6 to 20 about inches. In one embodiment, the circular aperture diameter and the channel length are substantially the same size. In one embodiment, as shown in FIG. 16C, the fan outlet shroud (60*b*) has an extension that is either a cube or a rectangular prism. In another embodiment, as shown in FIG. 16B, the fan outlet shroud (60*a*) has an extension that is a cylinder. In one embodiment, the circular aperture diameter and a channel inner diameter are substantially the same. In some embodiments, the base plate and extension can be made of any material known to the skilled artisan to include cardboard, sheet metal, polycarbonate, polyethylene, polypropylene, acrylonitrile butadiene styrene (ABS), polyvinyl chloride (PVC), and any combination of one or more of the foregoing. As shown in FIG. 17A, in one embodiment, the at least one axial fan is an array of axial fans (19) comprising two or more axial fans arranged in parallel. As shown in FIG. 17B, in another embodiment, the at least axial one axial fan is a box fan.

In one embodiment, a kit is provided comprising the personal respiratory and eye protection device and the fan outlet shroud (60) for the at least one axial fan.

As shown in FIG. 7, the power source (22) is electrically connected to a controller (8) by a connection (14*a*) and the controller is electrically connected to the at least one axial fan by an electrical connection (not depicted). The power source may be alternating current (AC) power but may also use a DC power source (e.g., a battery), photovoltaic power, or another power source known to the skilled artisan. In one embodiment, the controller may be disposed in an interior of the canopy so as to be accessible to the user while within the canopy. In one embodiment, the interior of the canopy may also comprise lights that are electrically connected to the controller and the power source in order to provide lighting within the canopy for the user to read and perform other activities. In one embodiment, the controller may comprise a regulator for manually controlling one or more settings of the personal respiratory and eye protection device. For example, the one or more settings may be one or more of activating and deactivating power from the power source, controlling the airflow speed of the output airflow (25*a*) generated by the at least one axial fan, and activating and deactivating power to the interior lights. In another embodiment, the controller may be disposed on an exterior of the canopy. For example, when the personal respiratory and eye protection device is utilized in the hospital, a medical attendant can manually control the one or more settings while the patient is incapacitated, sleeping, or otherwise unavailable.

3. Modular Portable Air Cleaner

Figure 9B:
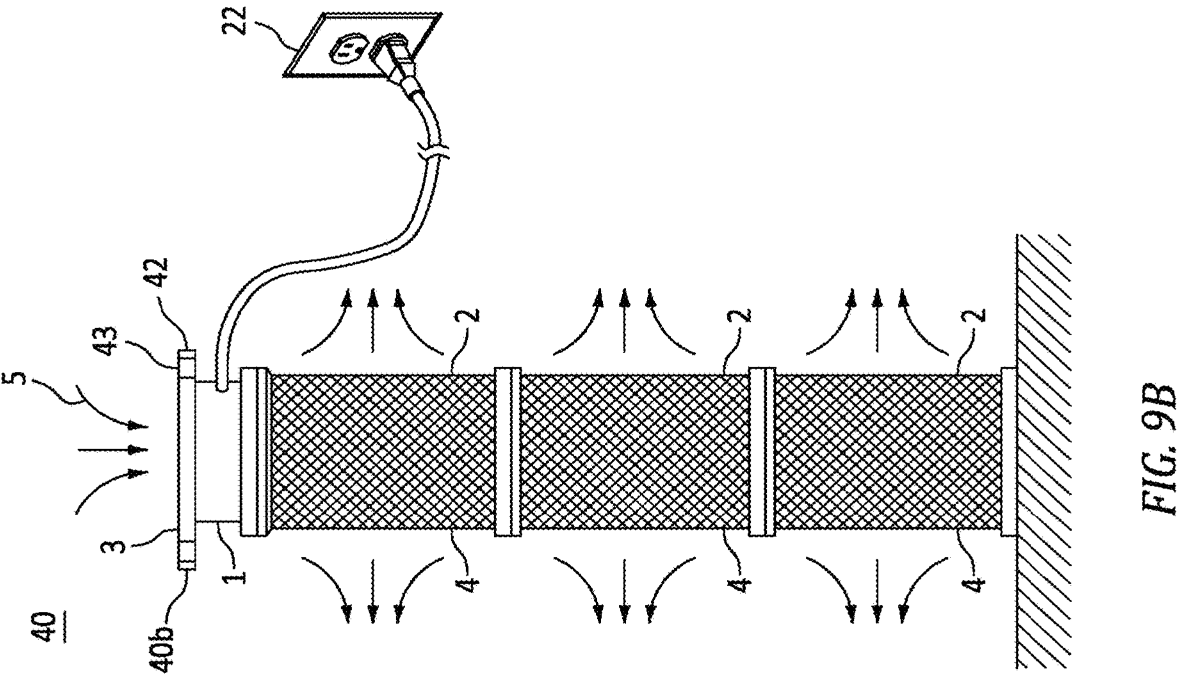
FIG. 9B depicts a side view of a respiratory and eye protection device, in accordance with an embodiment of the present invention.
Figure 9A:
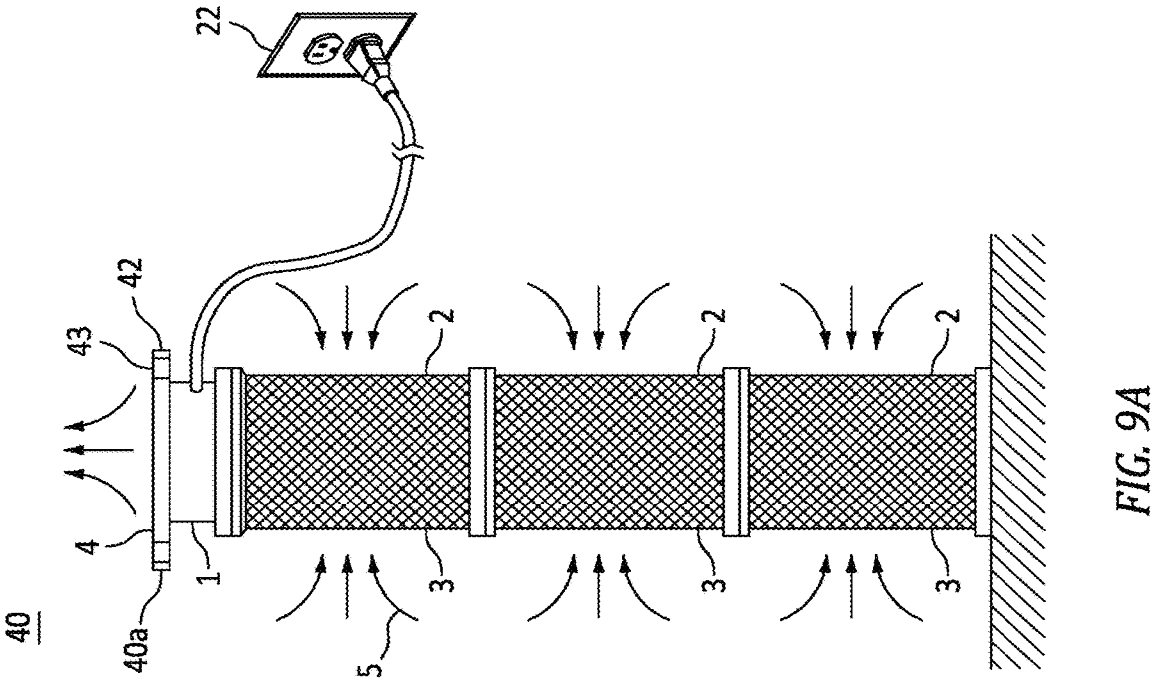
FIG. 9A depicts a side view of a respiratory and eye protection device, in accordance with an embodiment of the present invention.

As shown in FIGS. 9A-9B, in one embodiment, the air processing assembly (10) can be implemented in a modular portable air cleaner (40) (i.e., a modular filter assembly) that utilizes minimal floorspace and able to achieve high clean air delivery rates, especially in environments that may contain vapor and aerosol contamination. This embodiment of a modular portable air cleaner is particularly useful for suppressing vapor spikes.

In one embodiment, the modular portable air cleaner comprises an air processing assembly (10) that further comprises an air processing assembly inlet (3) for receiving ambient air, an air processing assembly outlet (4), and at least one axial fan (1) stacked on top of at least one filter (2) between the modular filter assembly inlet and the modular filter assembly outlet.

In one embodiment, the at least one filter and the at least one axial fan can be any combination of filter and axial fan previously recited to include any filter and fan configurations and any filter materials.

In one embodiment, as shown in FIG. 9A, the modular portable air cleaner (40*a*) generates an input airflow (5) via the at least one axial fan such that air is pulled through the at least one filter. In another embodiment, as shown in FIG. 9B, the modular portable air cleaner (40*b*) generates an input airflow (5) via the at least one axial fan such that air is pushed through the at least one filter.

In one embodiment, any power source (22) previously discussed can be used to energize the at least one axial fan.

In one embodiment, the at least one filter reduces contaminated air in the surrounding environment and comprises a vapor contamination filter configured to achieve a vapor contamination filtration efficiency of 50% or greater, preferably 95% or greater, even more preferably 99% or greater of one or more of Novichok nerve agent (A232), thickened venomous nerve agent (TVX), sulfur mustard agent (HD), thickened sulfur mustard agent (THD), soman nerve agent (GD), and sarin nerve agent (GB).

In one embodiment, the at least one filter comprises an aerosolized contamination filter configured to achieve an aerosolized contamination filtration efficiency of about 50% or greater for particles having a size of about 0.3 μm, preferably about 95% or greater, even more preferably about 99% or greater for particles having a size of about 0.3 μm.

Figures 10, 11:
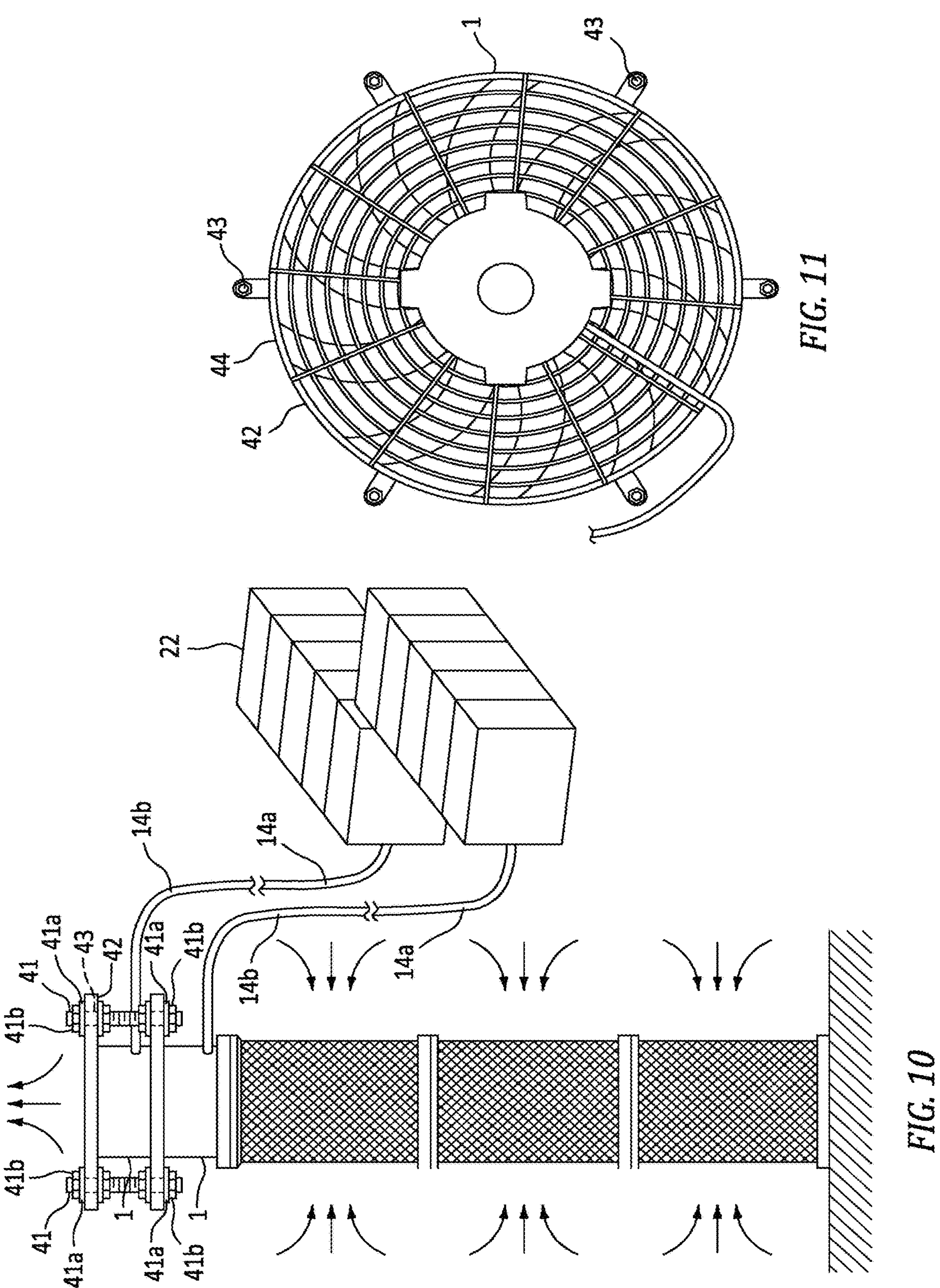
FIG. 10 depicts a side view of a respiratory and eye protection device, in accordance with an embodiment of the present invention.
FIG. 11 depicts a top view of a fan, in accordance with an embodiment of the present invention.

As shown in FIG. 11, in one embodiment, the at least one axial fan can comprise a radiator fan (44). Since radiator fans have a high level of output airflow compared to other fans, they are particularly beneficial for achieving a high clean air delivery rate. In one embodiment, each radiator fan is capable of generating an output airflow ranging from about 0 and about 1275 cubic feet per minute (CFM) at a static pressure ranging from about 0 to about 1 millimeters of water (mm $H_2O$) while drawing a current ranging from about 10.8 amps to about 12.7 amps. In another embodiment, the at least one axial fan is an array of axial fans comprising two or more axial fans arranged in parallel. In another embodiment, the at least one axial fan comprises two or more stacked case fans.

In one embodiment, the at least one filter comprises two or more stacked filters, wherein a seal is interposed between each of the two or more stacked filters for sealing or substantially sealing an interface therebetween. In one embodiment, the seal can be formed from any of the sealing materials previously recited. For example, tape can be used to seal the interface between two adjacently stacked filters by wrapping the tape around the peripheral interface. In this embodiment, the at least one filter may comprise a base plate or another stabilizing mechanism (not depicted) to help balance and maintain the modular portable air cleaner in an upright orientation as shown in FIGS. 9A and 9B.

In one embodiment, as shown in FIG. 10, the at least one axial fan comprises two or more stacked radiator fans and further comprises at least one threaded fastener (41) (e.g., a threaded rod) for releasably interconnecting each radiator fan, wherein each threaded fastener is coupled to a periphery of each radiator fan and maintains a distance of about 0.01 inches or more, about 0.1 inches or more, about 0.2 inches or more, about 0.3 inches or more, about 0.4 inches or more, about 0.5 inches or more, about 0.75 inches or more, or about 1 inch or more is interposed between each radiator fan. In one embodiment, each radiator fan has a flange (42) with one or more apertures (43). When two or more radiator fans are stacked, these apertures on adjacent flanges can be aligned such that a threaded fastener (41) is able to be inserted through two or more concentrically aligned apertures. In this embodiment, the spacing between adjacent radiator fans can be maintained by the threaded fastener by using at least one washer (41*a*) and at least one nut (41*b*) to fasten each radiator fan to the threaded fastener in place relative to one another in order to maintain the spaced distance.

Figure 12:
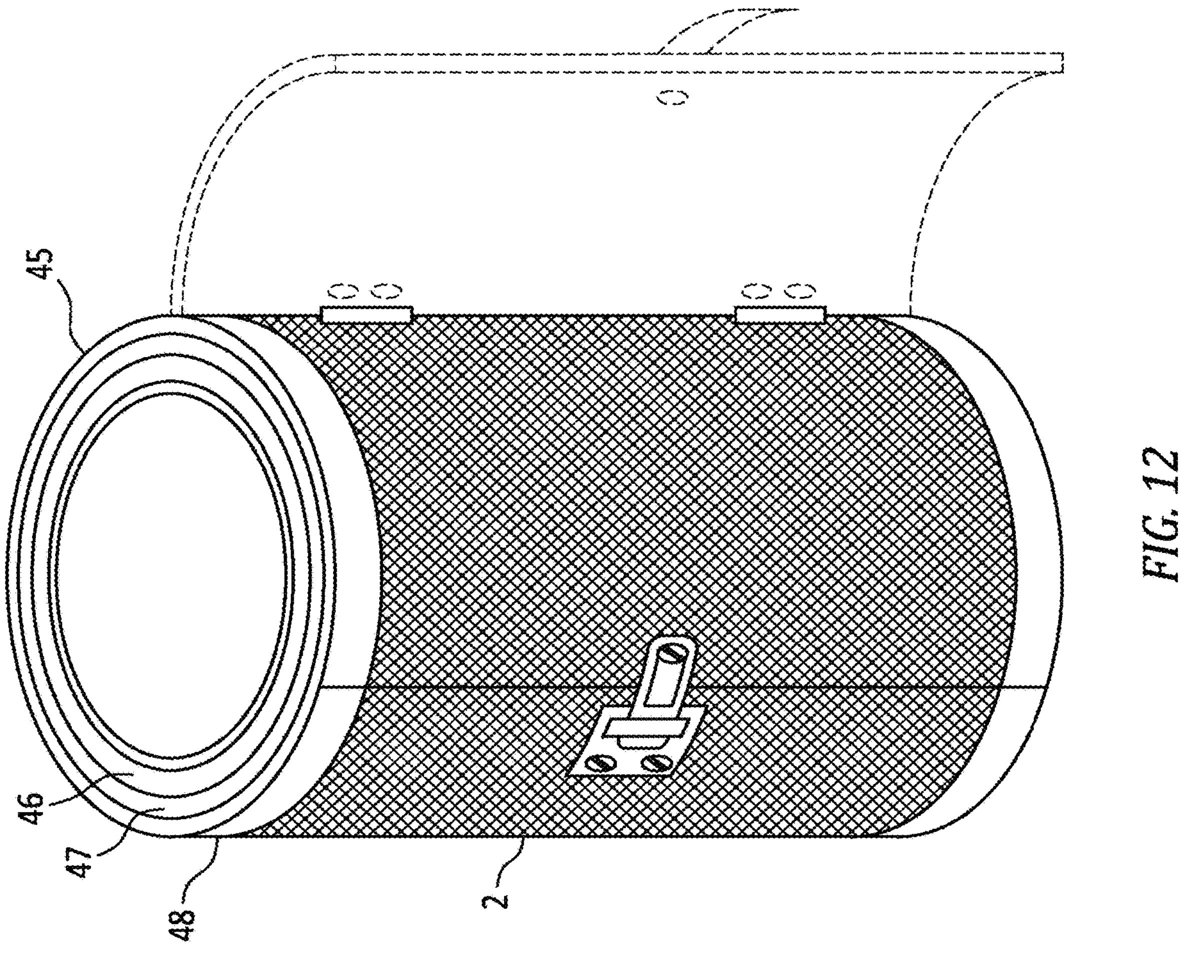
FIG. 12 depicts a perspective view of a filter, in accordance with an embodiment of the present invention.

In one embodiment, as shown in FIG. 12, the at least one filter is a cylindrical filter cartridge. In one embodiment, each cylindrical filter cartridge comprises a vapor contamination filter layer (46) concentrically arranged with the aerosolized contamination filter layer (47). In one embodiment, the cylindrical filter cartridge further comprises a pre-filter layer (48) to filter larger contaminants. In one embodiment, the inner most concentric layer is the vapor contamination filter layer when input airflow is being pulled through the at least one filter by the at least one axial fan (as shown in FIG. 9A). In another embodiment (not depicted), the inner most concentric layer is the pre-filter layer or the aerosolized contamination filter layer when input airflow is being pushed through the at least one filter by the at least one axial fan (as shown in FIG. 9B).

In one embodiment, a spacer tube (not depicted) for maintaining a distance greater than about 0.01 inches is interposed between each fan of the two or more stacked fans. In another embodiment, a spacer tube (not depicted) for maintaining a distance of about 0.01 inches or more, about 0.1 inches or more, about 0.2 inches or more, about 0.3 inches or more, about 0.4 inches or more, about 0.5 inches or more, about 0.75 inches or more, or about 1 inch or more is interposed between each filter of the two or more stacked filters. In one embodiment, the spacer tube is a tube having an inner diameter slightly larger than the outer diameter of the at least one filter and/or the at least one axial fan. In this embodiment, when filters and/or fans are stacked, an end of each adjacent filter and/or fan is inserted into an end of the spacer tube. In some embodiments, a spacer tube may be comprised of cardboard, plastic, or other rigid or flexible material. In some embodiments, tape or another sealant is used to seal the interface between each end of the spacer tube and the respective end of the at least one filter and/or the at least one axial fan. In one embodiment, the spacer tube is a carboard tube.

In one embodiment, the at least one axial fan of the modular portable air cleaner may have a fan outlet shroud (60) (as shown in FIGS. 16B-C and previously recited) when input airflow is being pulled through the at least one filter by the at least one axial fan (as shown in FIG. 9A).

In one embodiment, a kit is provided comprising the modular portable air cleaner and the fan outlet shroud for the at least one axial fan.

4. Wall-Adjacent Portable Air Cleaner

Figure 13B:
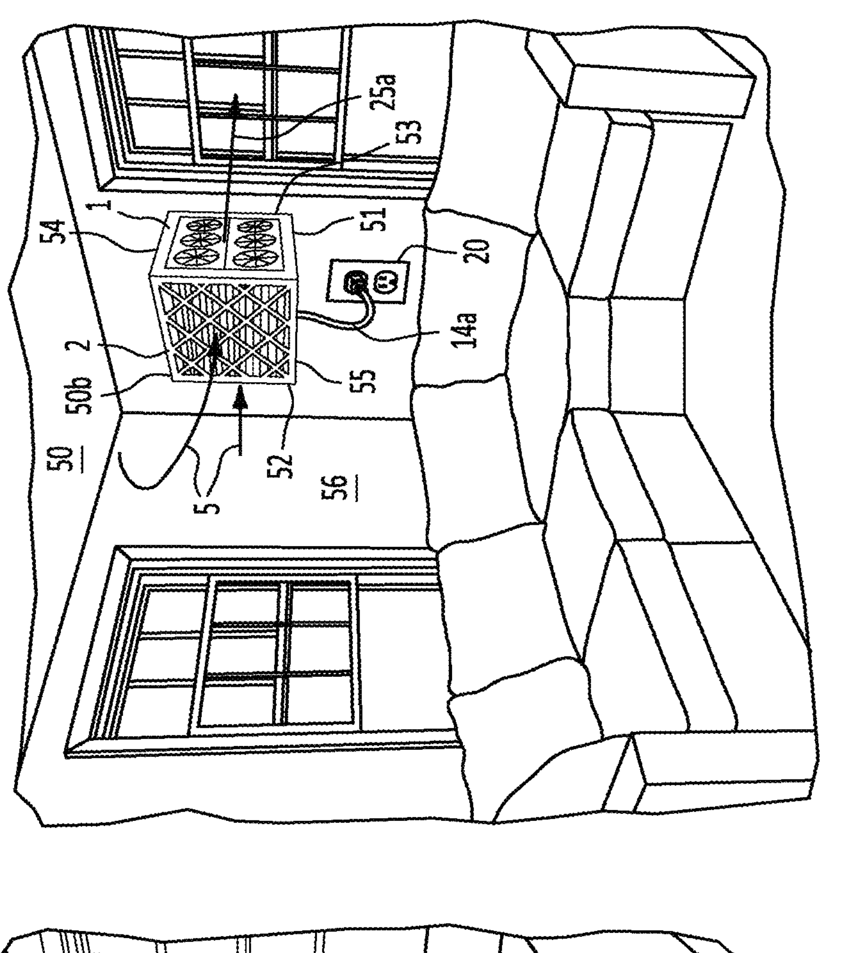
FIGS. 13A-B depict a perspective view of respiratory and eye protection devices, in accordance with an embodiment of the present invention.
Figure 13A:
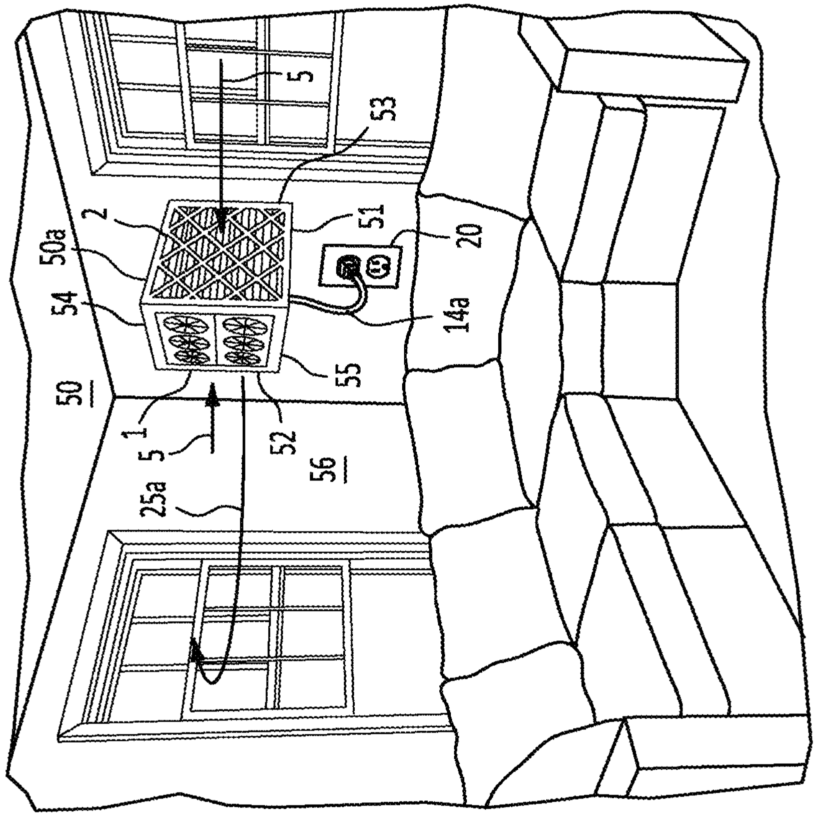

In FIGS. 13A-13B, a wall-adjacent portable air cleaner (i.e., a stackable assembly) is depicted that is stackable for maximizing floorspace efficiency in constrained spaces with approximately 15% more clean air delivery rate (CADR) as compared to the prior art. The prior art utilizes axial fans and filters on four or more sides of a cube (known as a Corsi-Rosenthal box) but in addition to consuming floorspace by not enabling stacking, its clean air delivery rate (CFM) is significantly reduced when one of the filters is also positioned near or adjacent to a wall or in a corner due to rapid recirculation between of air exiting the fan and entering the filter, resulting in suboptimal mixing of air within the room. The wall-adjacent portable air cleaner improves floor-space efficiency, especially when stacked vertically. The wall-adjacent portable air cleaner is able to protect occupants in a room from aerosol and vapor contamination.

In one embodiment, the wall-adjacent portable air cleaner comprises two lateral components (51), a front component (52) comprising at least one front seal capable of sealing or substantially sealing an interface between the front component and the two lateral components, and a back surface (53) that does not comprise an aerosolized contamination filter.

In one embodiment, a periphery of the back surface optionally comprises a back seal for sealing or substantially sealing an interface between the back surface and the wall (56), a top plate (54) comprising a top seal for sealing or substantially sealing an interface between the top plate, the two lateral components, and the front component, and a bottom plate (55) comprising a bottom seal for sealing or substantially sealing an interface between the bottom plate, the two lateral components, and the front component. In one embodiment, the seal can be formed from any of the sealing materials previously recited.

In one embodiment, the top plate (54) is plate that is not capable of filtering aerosolized contamination such as a piece of plywood, sheet metal, or any material known to the skilled artisan that would be suitable for this intended purpose but significantly less expensive than the cost of the filter.

In one embodiment, the back surface (53) is either an open face or a plate that is not capable of filtering aerosolized contamination such as a piece of plywood or sheet metal but significantly less expensive than the cost of the filter. As the skilled artisan would appreciate, by eliminating this aerosolized contamination filter (on back surface, top plate, and/or bottom plate) compared to a cube with filters on four of five sides, a significant a cost savings can be realized while still achieving high clean air delivery rates.

In one embodiment, at least one of the two lateral components and the front component comprises at least one filter (2) and at least one axial fan (1).

In one embodiment, the at least one filter can be any filter configuration previously recited to include any filter materials.

In one embodiment, the at least one axial fan can be a case fan, a box fan, two or more axial fans arranged in parallel, or any combinations of the foregoing. In one embodiment, the at least one axial fan has a fan speed ranging from about 200 to about 3,300 rotations per minute (rpm), wherein the at least one axial fan generates a volumetric output airflow rate ranging from about 45 to about 90 cubic feet per minute (CFM), and wherein the at least one axial fan generates a static pressure ranging from about 2 to about 5 millimeters of water (mm $H_2O$).

In one embodiment, any power source (22) previously discussed can be used to energize the at least one axial fan.

In one embodiment, as shown in FIGS. 13A-B, the wall-adjacent portable air cleaner (40*a*) generates an input airflow (5) and an output airflow (25*a*) via the at least one axial fan such that air is pulled through the at least one filter. However, in another embodiment, the wall-adjacent portable air cleaner may generate an input airflow (5) via the at least one axial fan such that air is pushed through the at least one filter.

As shown in FIG. 13A, in one embodiment, the front component comprises the at least one axial fan. In another embodiment, as shown in FIG. 13B, one of the two lateral components comprises the at least one axial fan. Compared to the embodiment in FIG. 13A, the embodiment in FIG. 13B can result in about 15% or more of an increased clean air delivery rate (CADR) due to more optimal mixing of air in the room compared to an alternative embodiment where all fans and filters are otherwise equivalent.

Figure 14:
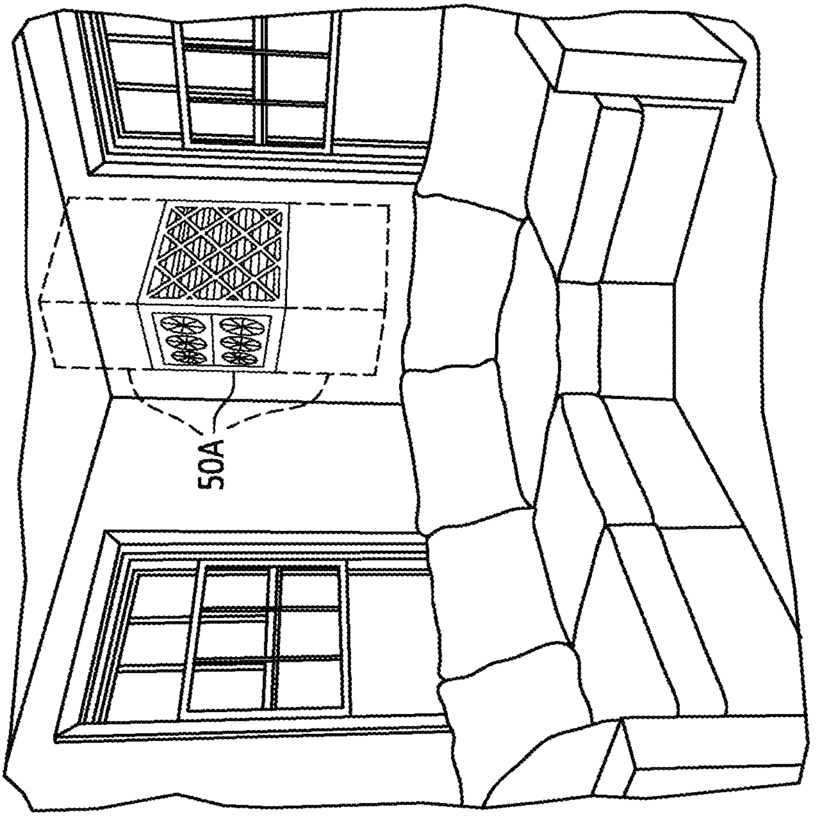
FIG. 14 depicts a perspective view of a respiratory and eye protection device, in accordance with an embodiment of the present invention.

As shown in FIG. 14, the wall-adjacent portable air cleaner is stackable. In one embodiment, the wall-adjacent portable air cleaner may further comprise a wall attachment mechanism to anchor the wall-adjacent portable air cleaner to the wall. Any bracket or fastener known to the skilled artisan can be used as the wall attachment mechanism.

Figure 15:
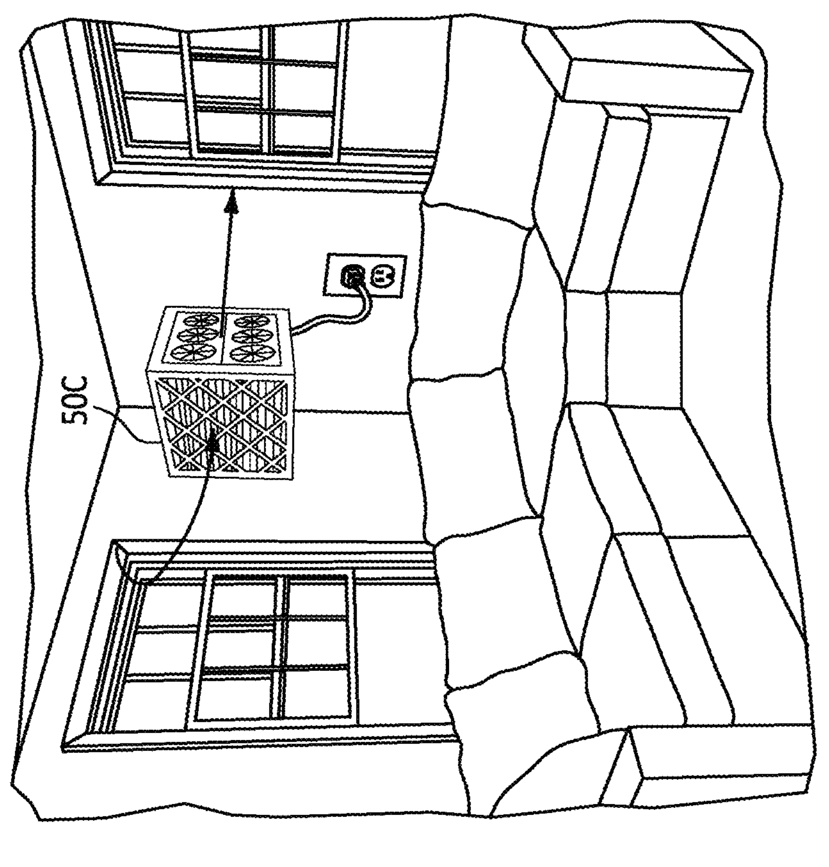
FIG. 15 depicts a perspective view of a respiratory and eye protection device, in accordance with an embodiment of the present invention.
Figure 15:

In one embodiment, as depicted in FIG. 15, the wall-adjacent portable air cleaner (50*c*) may be placed in the corner of the room to take greater advantage of the floor space. In such an embodiment, one of the two lateral components comprises a lateral plate (i.e., not capable of filtering aerosolized contamination but significantly less expensive than the cost of the filter) comprising a lateral seal capable of sealing or substantially sealing an interface between the bottom plate, the front component, and the top plate, such the other of the two lateral components comprises the at least one axial fan. In this embodiment, the lateral plate of the wall-adjacent portable air cleaner is disposed against the wall.

In one embodiment, the lateral plate is a plate that is not capable of filtering aerosolized contamination such as a piece of plywood, sheet metal, or any material known to the skilled artisan that would be suitable for this intended purpose but significantly less expensive than the cost of the filter.

In one embodiment, the at least one axial fan of the wall-adjacent portable air cleaner may have a fan outlet shroud (60) (as shown in FIGS. 16B-C and previously recited) when input airflow is being pulled through the at least one filter by the at least one axial fan (as shown in FIGS. 13A-B), the addition of which can further result in about 15% or more of an increased clean air delivery rate (CADR) due to more optimal mixing of air in the room compared to an alternative embodiment where all fans and filters are otherwise equivalent.

In one embodiment, a kit is provided comprising the wall-adjacent portable air cleaner and the fan outlet shroud for the at least one axial fan.

5. Hazardous Material Containment Apparatus

Figure 18:
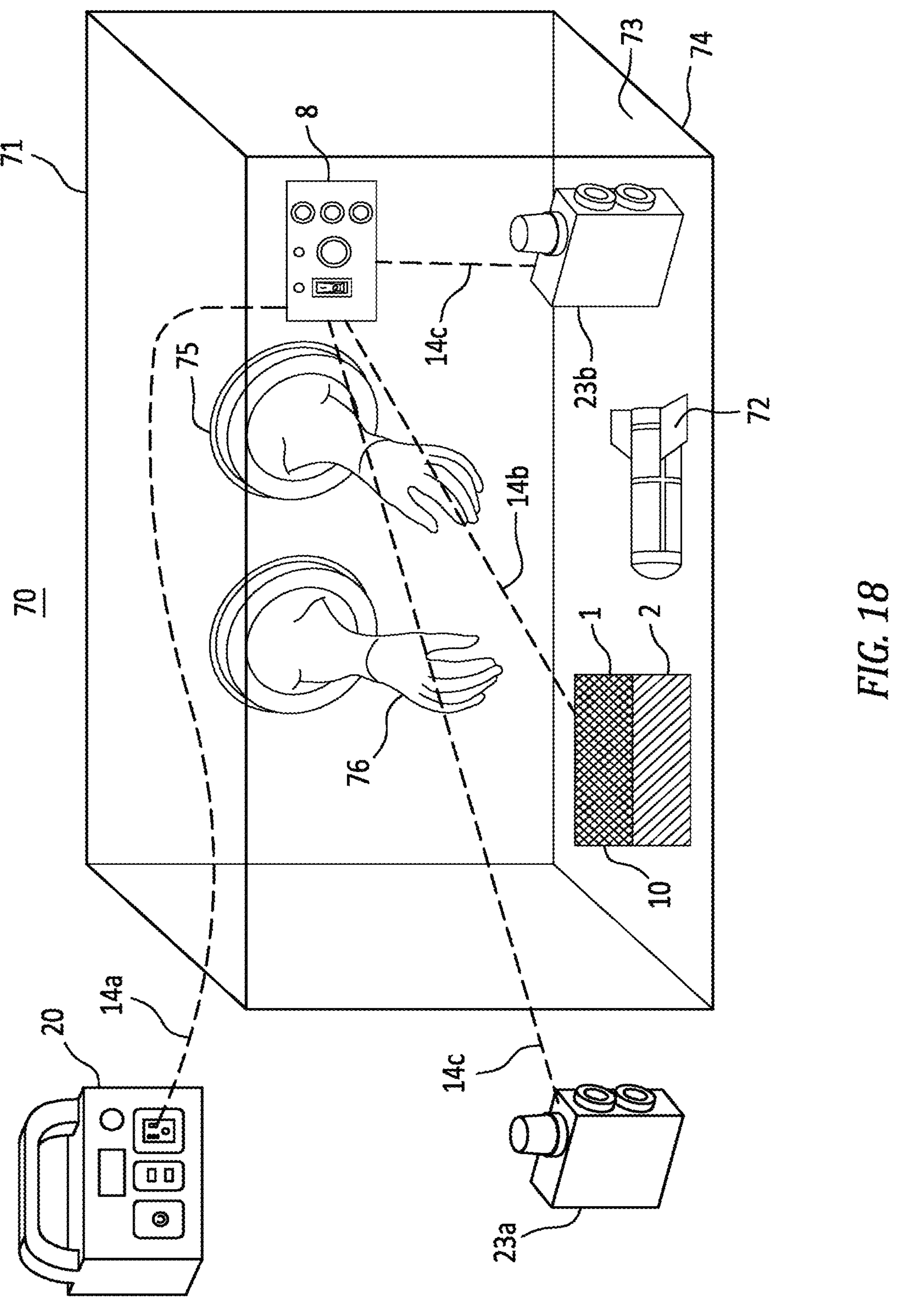
FIG. 18 depicts a perspective view of a respiratory and eye protection device, in accordance with an embodiment of the present invention.

As shown in FIG. 18, in one embodiment, the air processing assembly (10) or one or more of the respiratory and eye protection devices previously recited can be implemented in a containment apparatus (70) for enclosing a hazardous material emitting air contamination. The air containment apparatus is at least semi-transparent, loosely or tightly sealed box with an air processing assembly system to redundantly suppress vapors or aerosol emanating from a contaminated, off gassing, or leaky object/spill on the ground or otherwise that cannot be touched, either indoors or outdoors.

A benefit to using such a containment apparatus is that it can allow visibility of the hazardous object, while suppressing vapor or aerosol spikes from contaminated or leaky object instances where the hazardous object cannot be defused, sealed, packed, and shipped easily until an explosive ordnance disposal (EOD) team or a hazardous material (HAZMAT) team is available.

The containment apparatus can reduce the risk for a disposal technician and those nearby who are lacking personal protective equipment by temporarily preventing leaks from an unexploded ordnance (UXO) or shell while the disposal technician formulates a plan to permanently defuse/seal the UXO.

In both a military and civilian setting, the containment apparatus would also be able to suppress vapor or aerosol spikes from the contaminated or leaky object identified inside COLPRO or SIP (indoors) without requiring contact, until emergency services or a disposal unit is available.

In one embodiment, the containment apparatus for enclosing a hazardous material emitting air contamination comprises an enclosure (71) for isolating the hazardous material (72) comprising at least three closed faces comprising at least a semi-transparent or a transparent material such that a sealed or substantially sealed connection is formed between each of the at least three closed faces, and an open face (73) for receiving the hazardous material when a periphery (74) of the open face contacts a surface supporting the hazardous material.

In one embodiment, the periphery of the open face comprises a sealant for forming a sealed or substantially sealed connection between the enclosure and the surface. In one embodiment, the seal can be formed from any of the sealing materials previously recited. In at least one embodiment, the sealant is selected from the group consisting of tape, duct tape, adhesive, caulking, gasketing, and one or more of the foregoing.

Figure 19:
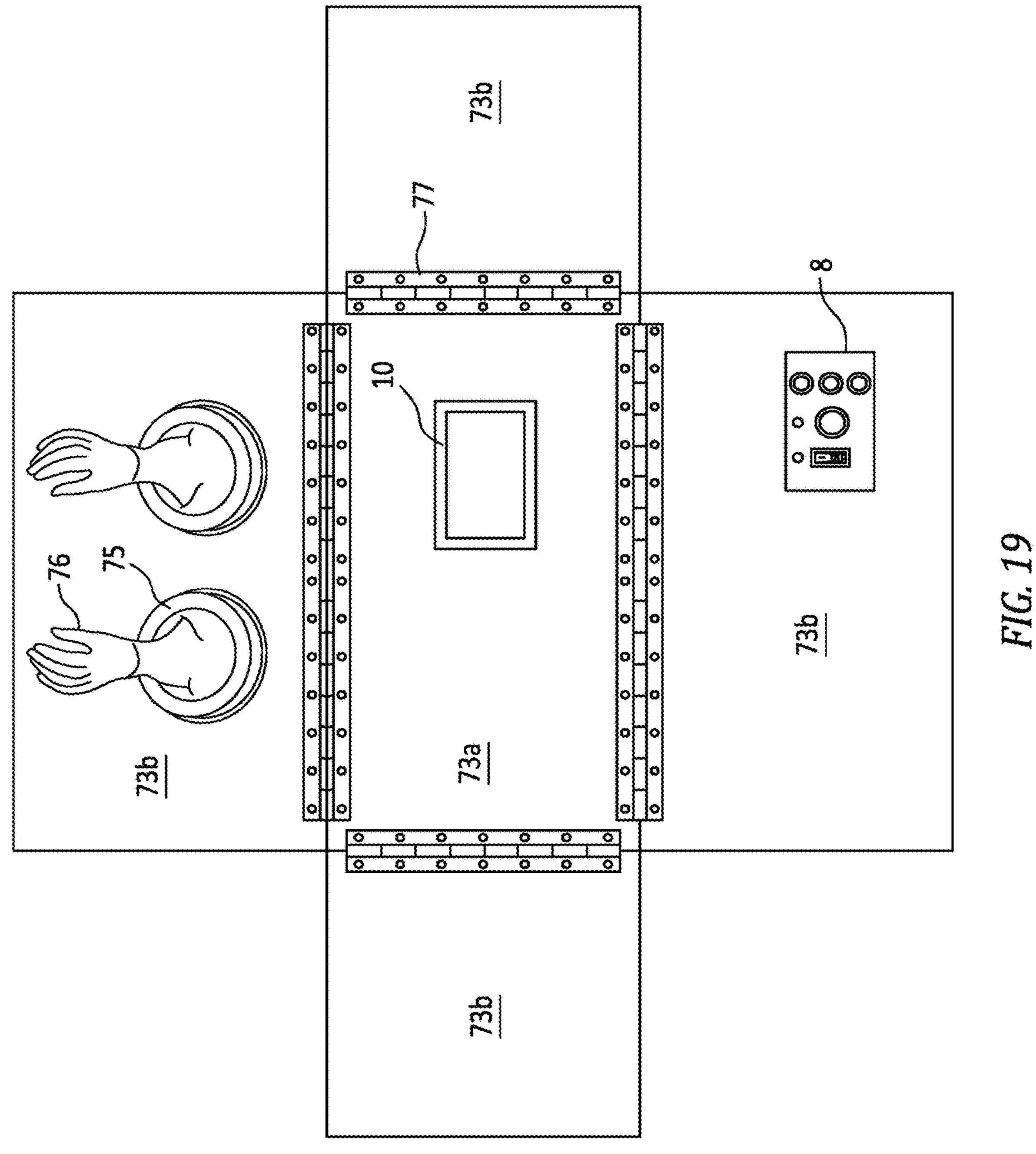
FIG. 19 depicts a top view of a respiratory and eye protection device in a disassembled state, in accordance with an embodiment of the present invention.

In one embodiment, the containment apparatus further comprises an air processing assembly (10) disposed on (as shown in FIG. 19) or enclosed within (as shown in FIG. 18) the enclosure comprising an air processing assembly inlet for receiving contaminated air in the enclosure, an air processing assembly outlet, and at least one fan (1) and at least one filter (2) coupled together between the air processing assembly inlet and the air processing assembly outlet, and substantially all air released from the air processing assembly outlet has been filtered by the at least one filter. In one embodiment, the at least one fan may be an axial fan.

In one embodiment, the at least one filter and the at least one axial fan can be any combination of filter and axial fan previously recited to include any filter and fan configurations and any filter materials. In another embodiment, the air processing assembly is a Healthmate Plus™ (manufactured by Austin Air). In at least one embodiment, the at least one axial fan generates an output airflow ranging from about 50 to about 400 cubic feet per minute (CFM).

In one embodiment, any power source (22) previously discussed can be used to energize the at least one axial fan.

In one embodiment, the at least one filter reduces contaminated air in the enclosure and comprises a vapor contamination filter configured to achieve a vapor contamination filtration efficiency of 50% or greater, preferably 95% or greater, for one or more of Novichok nerve agent (A232), thickened venomous nerve agent (TVX), sulfur mustard agent (HD), thickened sulfur mustard agent (THD), soman nerve agent (GD), and sarin nerve agent (GB).

In at least one embodiment, the at least three closed faces have a thickness ranging from about ¼ inch to about 4 inches. In one embodiment, the at least three closed faces are made of a material selected from the group consisting of acrylic, polycarbonate, polyethylene terephthalate glycol (PETG), polystyrene, and combinations of the foregoing.

In one embodiment, at least one of the at least three closed faces comprises at least one aperture (75) and at least one glove (76) disposed within the enclosure and coupled to a periphery of the at least one aperture such that a sealed or substantially sealed connection is formed between the at least one glove and the enclosure at the at least one aperture. In at least one embodiment, an operator of the containment apparatus disposed external to the enclosure is capable of inserting at least a hand into the enclosure through the at least one aperture and the at least one glove in order to better assess the hazardous material (e.g., manipulate a tool inside the enclosure).

As shown in FIG. 19, in at least one embodiment, the at least three closed faces comprise a top face (**73*a*) and four lateral faces (73*b*) and the top face is opposite the open face such that each lateral face comprises a hinge connection (77**) with the top face. In this embodiment, the enclosure is foldable to enable easy transport and expedient setup. In an embodiment where the air processing assembly is disposed on the enclosure such that either the air processing assembly outlet or the air processing assembly inlet is disposed outside of the enclosure and either the air processing assembly outlet or the air processing assembly inlet is disposed inside of the enclosure, a negative pressure can be generated within the enclosure to help seal or substantially seal the interface between the open face and the surface supporting the hazardous material.

In one embodiment, the at least one axial fan of the containment apparatus may have a fan outlet shroud (60) (as shown in FIGS. 16B-C and previously recited) when input airflow is being pulled through the at least one filter by the at least one axial fan.

In one embodiment, a kit is provided comprising the containment apparatus and the fan outlet shroud for the at least one axial fan.

6. Respiratory and Eye Protection Device Operation and Monitoring

In one or more embodiments of the respiratory and eye protection device previously recited, the power source (22) is electrically connected to a controller (8) by a connection (**14*a*) and the controller is electrically connected to the at least one axial fan by an electrical connection (14*b***). The power source may be alternating current (AC) power or may use a DC power source (e.g., a battery), photovoltaic power, or another power source known to the skilled artisan.

In one or more embodiments, previously recited, the controller may be disposed on an exterior of the respiratory and eye protection device so as to be accessible to a user. The controller may comprise a regulator for manually controlling one or more settings of the respiratory and eye protection device. For example, the one or more settings may be one or more of activating and deactivating power from the power source and, controlling the speed of the output airflow (**25*a***) generated by the at least one fan and/or the speed of the at least one fan.

One or more embodiments of the respiratory and eye protection device previously recited may comprise one or more sensors electrically connected to the controller and optionally, an output. In one embodiment, the output is an array of light and/or audible indicators (8*b*) for displaying a light or generating a noise to alert the user when an event occurs. In another embodiment, the output is an onboard display (8*c*) such as a monitor that can provide a textual and/or graphical display based on the nature of the event. In another embodiment, a signal is transmitted through one or more networks to a remote computer system when an event occurs.

A. Slow-Spin Protection Circuit

In one or more embodiments of the respiratory and eye protection device previously recited, a slow-spin protection circuit (SSPC) is utilized to prevent damage to a fan motor of the at least one fan. In one or more embodiments, the at least one fan is at least one axial fan. The SSPC also prevents injury to a user of the respiratory and eye protection device from excessive heat generated during a short-circuit.

When a foreign substance (i.e., debris) such as a small stone, a twig, or the like is caught in the fan and rotation of the fan is locked or slowed, so-called motor lock occurs in which the drive of the at least one fan motor is either stopped or slowed.

When the motor lock occurs, the electric current that flows in the at least fan motor is increased and a lock current (an electric current that flows in the motor at the time of overload: abnormal current) flows, which may cause damage to a fan motor and the like of the at least one fan motor, overheating, or injury to the user.

In this case, when an electric current that is equal to or higher than a fixed value keeps flowing even after a specified time has passed, measures are taken such as to incorporate a lock current control circuit which stops or reduces electric conduction to the at least one fan motor and thus prevents the lock current from being outputted from the fan motor to prevent the fan motor and the like from being damaged or from overheating.

In one or more embodiments of the respiratory and eye protection device previously recited, the one or more sensors may comprise one or more current sensors to detect a current value of the motor of the at least one fan.

In one or more embodiments, the one or more current sensors is electrically connected to the controller (8) by a connection (14*c*) which may be a wired or a wireless connection.

In regards to the SSPC, the one or more current sensors serving as a current detecting means compares a current value of the load current that flows in the at least one fan motor and a threshold current value, and when an abnormality is detected, a switch or a fuse breaks the circuit or reduces the current flow between the at least one fan motor and the power supply after a set time exceeding the time it normally takes for the at least one fan to reach its full speed from zero revolutions per minute.

Figure 20:
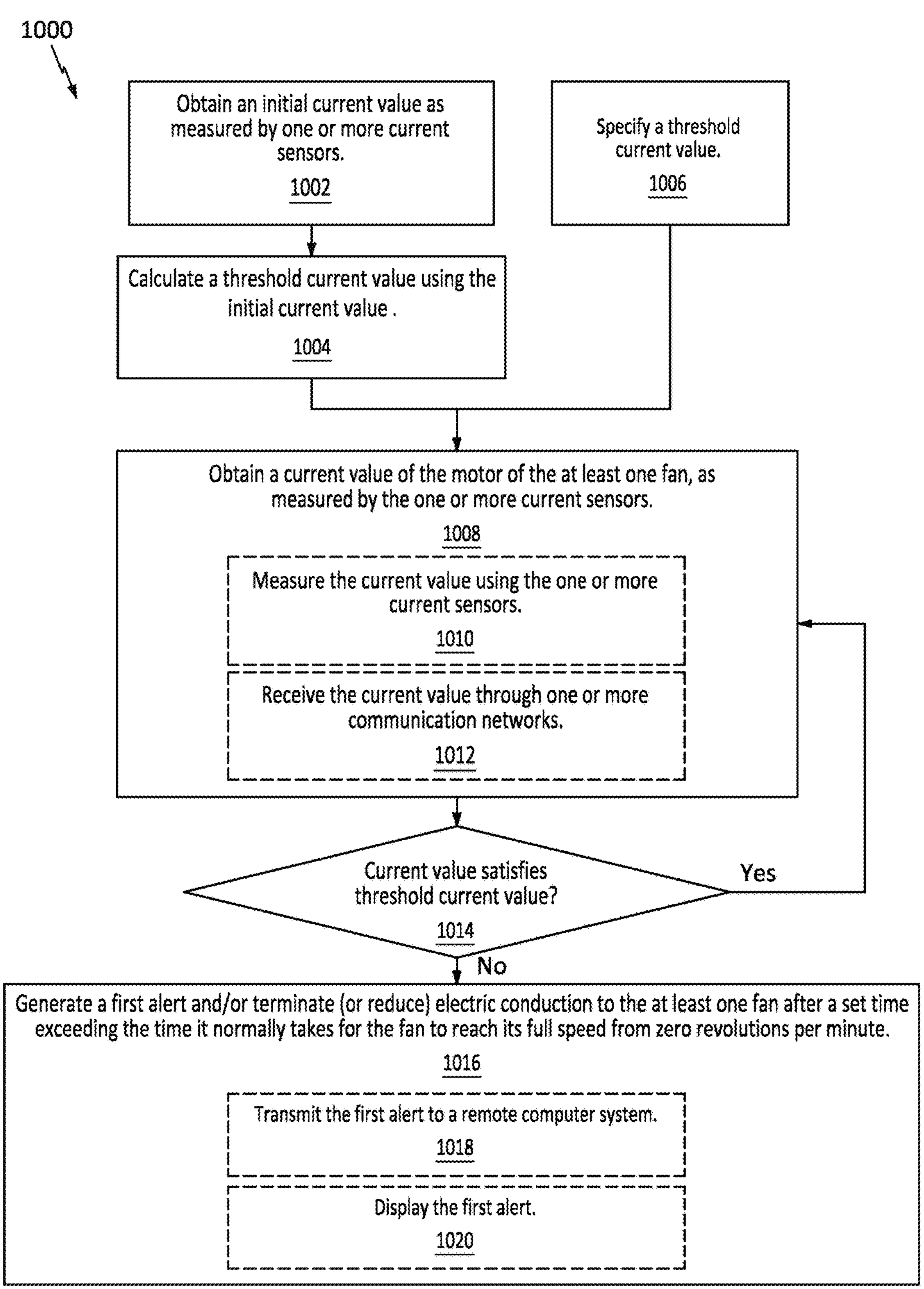
FIG. 20 depicts a flowchart showing a method of monitoring and operating one or more respiratory and eye protection devices based on a current value of the at least one axial fan, in accordance with some embodiments.

FIG. 20 is a flowchart showing an SSPC method (1000) of operating and monitoring one or more embodiments of the respiratory and eye protection device previously recited.

The method (1000) may be performed by controller (8) (i.e., a computer system) that includes one or more processors and memory (e.g., a non-transitory computer-readable medium) storing instructions for execution by the one or more processors. The instructions include instructions for performing the method (1000).

In some embodiments of the method (1000), an initial current value of the fan motor is determined (1002) using one or more current sensors. A threshold current value is calculated (1004) using the initial current value. The initial current value may be taken by the one or more current sensors or may be combinations of repeated measurements taken by the one or more current sensors (as described below for step 1008). For example, the initial current value may be averages (e.g., means, geometric means, mean squares) or other statistical functions of the repeated measurements. The initial current value may be measured in the same manner as the current value of step 1008 (below). Alternatively, the threshold current value may be specified (1006).

As part of monitoring the one or more embodiments of the respiratory and eye protection device previously recited, a current value of the motor of the at least one fan is determined (1008) by one or more current sensors (e.g., the one or more current sensors of step 1002) (e.g., electrically connected to the motor of the at least one fan). For example, the one or more current sensors include (e.g., are) one or more amperage meters but the one or more current sensors can be any known sensor known to the skilled artisan capable of detecting a current in a fan motor. The current value may be an individual measurement taken by the one or more current sensors, or may be an average (e.g., mean, geometric mean, mean square) or other statistical functions of repeated measurements taken by the one or more current sensors.

In some embodiments, the method (1000) includes measuring (1010) the current value using the one or more current sensors. For example, in some embodiments, the computer system that performs the method (1000), and thus determines the current value, is communicatively coupled (e.g., by one or more communication busses) to the one or more current sensors and receives the current value from the one or more current sensors. In some embodiments, the current value is received (1012) from the one or more current sensors through one or more communication networks. In some embodiments, the current value may be determined (1008) after the current value has been calculated (1004) or specified (1006).

In some embodiments, a determination is made (1014) as to whether the current value satisfies (e.g., is less than) the threshold current value after a set time exceeding the time it normally takes for the at least one fan to reach its full speed from zero revolutions per minute (e.g., between about 1 and about 60 seconds). If the current value satisfies the threshold current value (1014—Yes), the method 1000 reverts to step (1008) and monitoring one or more embodiments of recited respiratory and eye protection devices continues. In response to a determination that the current value does not satisfy (e.g., is greater than, or equal to) the threshold current value (1014—No), in some embodiments a first alert is generated and/or electric conduction to the at least one fan is terminated (or reduced) if the current value does not satisfy the threshold current value after a set time exceeding the time it normally takes for the at least one fan to reach its full speed from zero revolutions per minute (i.e., between about 1 and about 60 seconds) (1016).

In some embodiments, the first alert is transmitted to a remote computer system (1018). For example, the computer system that performs the method (1000), and thus that generates the first alert, is a first computer system that transmits the first alert to a second computer system (e.g., a server system; a user's computer system device) remote from the first computer system for display by the second computer system.

In some embodiments, the first alert is displayed (1020). For example, the computer system that performs the method (1000), and thus that generates the first alert, includes a display; the computer system displays the first alert on the display. In some embodiments, the computer system may both display the first alert and transmit the first alert to a remote computer system. In some embodiments, the display may also be on onboard display on the one or more embodiments of recited respiratory and eye protection devices and/or an array of light and/or audible indicators.

In some embodiments, when it is determined that the current value does not satisfy the threshold current value, a signal is transmitted to a switch to terminate or reduce the electric conduction to the at least one fan motor either immediately when the current value does not satisfy the threshold current value or after a set amount of time of the current value not satisfying the threshold current value (e.g., exceeding the time it normally takes for the at least one fan to reach its full speed from zero revolutions per minute).

In some embodiments, when it is determined that the current value does not satisfy the threshold current value (e.g., is higher than the threshold current value), a signal is transmitted to adjust the speed of the at least one fan either immediately when the current value does not satisfy the threshold current value or after a set amount of time of the current value not satisfying the threshold current value (e.g., exceeding the time it normally takes for the at least one fan to reach its full speed from zero revolutions per minute).

In some embodiments, when the respiratory and eye protection device comprises two or more fans, a current value of the motor of each fan is determined by the one or more current sensors. If it is determined that the current value of one or more of the fans does not satisfy the threshold current value and the current value of one or more of the fans satisfies the threshold current value, then a signal is selectively transmitted to effectuate only the one or more of the fans that do not satisfy the threshold current value.

In some embodiments, a flowmeter (e.g., anemometer) is disposed at the at least one fan outlet and is used in conjunction with or instead of the current sensor to verify that the at least one fan is functioning properly (i.e., that the fan is generating the expected output airflow).

B. Aerosol/Vapor Protection Circuit

In one or more embodiments of the respiratory and eye protection device previously recited, an aerosol/vapor protection circuit (AVPC) is utilized to monitor at least one aerosol/vapor agent in real-time and to identify the presence of these aerosol/vapor agents. In one embodiment, the AVPC provides an immediate alert before significant exposure occurs and allow for protective measures to be taken. As defined herein, an aerosol/vapor agent is either a vapor agent, an aerosol agent, or both a vapor agent and an aerosol agent.

Two or more embodiments of the respiratory and eye protection device previously recited can also be used as part of a network to facilitate and enhance early warning as well as support communal protection from aerosol/vapor agents.

In one or more embodiments of the respiratory and eye protection device previously recited, the one or more sensors may comprise at least one aerosol/vapor detection sensor (23) to detect the presence and/or the concentration of select aerosol/vapor agents including but not limited to Novichok nerve agent (A232), thickened venomous nerve agent (TVX), sulfur mustard agent (HD), thickened sulfur mustard agent (THD), soman nerve agent (GD), sarin nerve agent (GB), and one or more of the foregoing.

In one or more embodiments, the at least one aerosol/vapor detection sensor is electrically connected to the controller (8) by a connection (14*c*) which may be a wired or a wireless connection.

In one or more embodiments of the respiratory and eye protection device previously recited, the one or more sensors may be at least one aerosol/vapor detection sensor (23*a*) disposed external to the respiratory and eye protection device. For example, in some embodiments the at least one aerosol/vapor detection sensor (23*a*) is disposed external to an enclosure (17) as shown in FIG. 18.

In one or more embodiments of the respiratory and eye protection device previously recited, the one or more sensors may be at least one aerosol/vapor detection sensor (23*b*) disposed internal to the respiratory and eye protection device. For example, in some embodiments the at least one aerosol/vapor detection sensor (23*b*) is disposed internal to an enclosure (17) as shown in FIG. 18.

In one or more embodiments of the respiratory and eye protection device previously recited, the one or more sensors may be at least one aerosol/vapor detection sensor (23) disposed internal to the least one filter.

Figure 21:
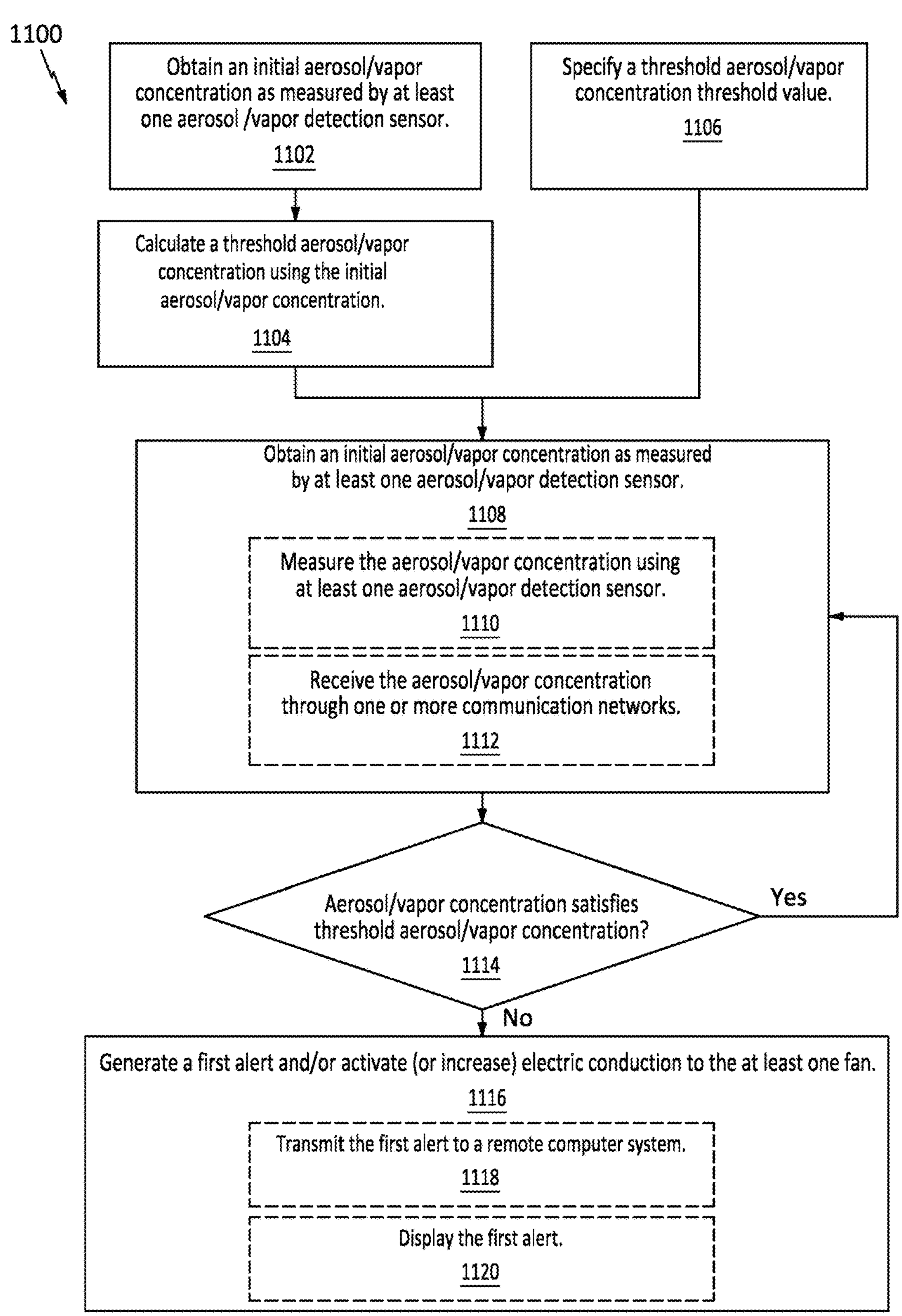
FIG. 21 depicts a flowchart showing a method of monitoring and operating one or more respiratory and eye protection devices based on at least one aerosol/vapor detection sensor, in accordance with some embodiments.

FIG. 21 is a flowchart showing an AVPC method (1100) of operating and monitoring one or more embodiments of the respiratory and eye protection device previously recited using at least one aerosol/vapor detection sensor. The method (1100) may be performed by controller (8) (i.e., a computer system) that includes one or more processors and memory (e.g., a non-transitory computer-readable medium) storing instructions for execution by the one or more processors. The instructions include instructions for performing the method (1100).

In some embodiments of the AVPC method (1100), an initial concentration of one or more aerosol/vapor agents are determined (1102) using at least one aerosol/vapor detection sensor. In some embodiments, a threshold concentration of one or more aerosol/vapor agents is calculated (1104) using the initial concentration of one or more aerosol/vapor agents. In some embodiments, the initial concentration of one or more aerosol/vapor agents may be taken by the at least one aerosol/vapor detection sensor or may be combinations of repeated measurements taken by the at least one aerosol/vapor detection sensor (as described below for step 1108). For example, the initial concentration of one or more aerosol/vapor agents may be averages (e.g., means, geometric means, mean squares) or other statistical functions of the repeated measurements. In some embodiments, the initial concentration of one or more aerosol/vapor agents may be measured in the same manner as the concentration of the one or more aerosol/vapor agents of step (1108) (below). Alternatively, the threshold concentration of one or more aerosol/vapor agents may be specified (1106).

In one embodiment, the threshold concentration of the one or more aerosol/vapor agents are as follows based on the chemical warfare agent (CWA) aerosol/vapor challenge levels established by the Department of the Air Force Instruction 10-2503:

| Agent | CWA Vapor Challenge Levels (mg-min/m$^3$) |
|---|---|
| A232 | 6 |
| TVX | 12 |
| HD | 268 |
| THD | 160 |
| GD | 734 |
| GB (Sarin) | 100 |

In one or more embodiments, the threshold concentration of the one or more aerosol/vapor agents are based on 1/10th the chemical warfare agent (CWA) vapor challenge levels established by the Department of the Air Force Instruction 10-2503:

| Agent | CWA Vapor Challenge Levels (mg-min/m$^3$) |
|---|---|
| A232 | 0.6 |
| TVX | 1.2 |
| HD | 26.8 |
| THD | 16.0 |
| GD | 73.4 |
| GB (Sarin) | 10.0 |

In still other embodiments, the threshold concentration of the one or more aerosol/vapor agents are based on 1/100th or 1/1000 the chemical warfare agent (CWA) vapor challenge levels established by the Department of the Air Force Instruction 10-2503, or any fraction thereof.

As part of monitoring the one or more embodiments of recited respiratory and eye protection devices, in some embodiments, a concentration of the one or more aerosol/vapor agents is determined (1108) by at least one aerosol/vapor detection sensor (e.g., the at least one aerosol/vapor detection sensor of step 1102). In some embodiments, the at least one aerosol/vapor detection sensor may be located within the vicinity of the user, e.g., within a few feet, or may be disposed further away as part of a network, e.g., located on the military base. In at least one embodiment, the at least one aerosol/vapor detection sensor is physically coupled to one or more embodiments of recited respiratory and eye protection devices and in other embodiments, the at least one aerosol/vapor detection sensor is wirelessly detached.

For example, the at least one aerosol/vapor detection sensor includes (e.g., is) one or more Joint Chemical Agent Detector (JCAD) (also known as the M4A1) or Aerosol and Vapor Chemical Agent Detector (AVCAD) but can be any known chemical detection sensor known to the skilled artisan such as an ion mobility spectroscopy (IMS) detector, mass spectrometry detector, electrochemical detector an electrochemical detector, catalytic bead detector, photoionization detector, and infrared gas detector. The concentration of the one or more aerosol/vapor agents may be an individual measurement taken by the at least one aerosol/vapor detection sensor, or may be an average (e.g., mean, geometric mean, mean square) or other statistical functions of repeated measurements taken by the at least one aerosol/vapor detection sensor.

In some embodiments, the method (1100) includes measuring (1110) the concentration of the one or more aerosol/vapor agents using the at least one aerosol/vapor detection sensor. For example, the computer system that performs the method (1100), and thus determines the concentration of the one or more aerosol/vapor agents, is communicatively coupled (e.g., by one or more communication busses) to the at least one aerosol/vapor detection sensor and receives the concentration of the one or more aerosol/vapor agents from the at least one aerosol/vapor detection sensor. In some embodiments, the concentration of the one or more aerosol/vapor agents is received (1112) from the at least one aerosol/vapor detection sensor through one or more communication networks. In some embodiments, the concentration of the one or more aerosol/vapor agents may be determined (1108) after the concentration of the one or more aerosol/vapor agents has been calculated (1104) or specified (1106).

In some embodiments, a determination is made (1114) as to whether the concentration of the one or more aerosol/vapor agents satisfies (e.g., is less than) the threshold concentration of the one or more aerosol/vapor agents. If the concentration of the one or more aerosol/vapor agents satisfies the threshold concentration of the one or more aerosol/vapor agents (1114—Yes), the method (1100) reverts to step (1108) and monitoring one or more embodiments of recited respiratory and eye protection devices continues. In response to a determination that the concentration of the one or more aerosol/vapor agents does not satisfy (e.g., is greater than or equal to) the threshold concentration of the one or more aerosol/vapor agents (1014—No), in some embodiments, a first alert is generated and/or electric conduction is activated (or increased) to the at least one fan (1116).

In some embodiments, the first alert is transmitted to a remote computer system (1118). For example, the computer system that performs the method (1100), and thus that generates the first alert, is a first computer system that transmits the first alert to a second computer system (e.g., a server system; a user's computer system device) remote from the first computer system for display by the second computer system.

In some embodiments, the first alert is displayed (1120). For example, the computer system that performs the method (1100), and thus that generates the first alert, includes a display; the computer system displays the first alert on the display. In some embodiments, the computer system may both display the first alert and transmit the first alert to a remote computer system. In some embodiments, the display may also be on onboard display on the one or more embodiments of recited respiratory and eye protection devices and/or an array of light and/or audible indicators.

In some embodiments, when it is determined that the concentration of the one or more aerosol/vapor agents does not satisfy the threshold concentration of the one or more aerosol/vapor agents (e.g., is higher than the threshold concentration), a signal is transmitted to activate (or increase) electric conduction to the motor of at least one fan of the respiratory and eye protection device and/or to increase the speed of the output airflow (25*a*) generated by the at least one fan and/or the speed of the at least one fan (e.g., the rotation rate) in order to protect the user and/or other personnel who could be harmed by the detected aerosol/vapor agent. In one or more embodiments, the at least one fan is at least one axial fan.

EXAMPLES

The following examples further illustrate preferred embodiments of the respiratory and eye protection device.

Example 1

A wearable personal respiratory and eye protection device as shown in FIG. 2 was assembled. A rectangular shaped aperture was formed in the brim of a standard baseball cap such that no brim material was left at the tip of the brim (U-shaped). The filter utilized was a Filtrete 20×20×1 AC Furnace Air Filter (manufactured by 3M) with a MERV rating value of 13. The filter was cut to a size of about 5 inches to about 5 inches to fit inside brim aperture. The axial fan utilized was the Arctic P12 Case Fan. The width and length of the filter were larger than the width and length of the axial fan. The fan was stacked on top of the filter and the filter was coupled to the aperture to form the air processing assembly. The fan of the air processing assembly was tilted towards the user such that the airflow generated by the at least one axial fan would be tilted towards the user. The filter was sealed to the brim using tape and the fan was coupled to the filter using tape. The axial fan was powered by a 12-volt lithium-ion battery. The filter media of the filter was folded into a series of pleats.

The pleat orientation of the filter was such that the pleats are oriented parallel to a facing direction of the user when the wearable personal respiratory and eye protection device is worn by the user.

Example 2

A similar personal respiratory and eye protection device was assembled as in Example 1 except an Arctic P12 Max Case Fan was used was used instead of an Arctic P12 Case Fan.

Example 3

A similar personal respiratory and eye protection device was assembled as in Example 1 except two stacked filters were used of the same size and an Arctic P12 Max Case Fan was used was used instead of an Arctic P12 Case Fan. The Arctic P12 Max Case Fan was stacked on top of the two filters.

Example 4

A personal respiratory and eye protection device as shown in FIG. 3 was assembled. A rectangular shaped aperture was formed in the brim of a standard baseball cap such that no brim material was left at the tip of the brim (U-shaped). The filter utilized was a HEPA filter. The filter was cut to a size of about 5 inches to about 5 inches to fit inside brim aperture. Two stacked Arctic P12 Max Case Fans were utilized. The width and length of the filter were larger than the width and length of the two axial fans stacked together. The two axial fans were stacked on top of the filter and the filter was coupled to the aperture. The filter was sealed to the brim using tape, the fan was coupled to the filter using tape, and the two axial fans were coupled to each other using tape. A half-face shield (i.e., the face shield covers from the top of the forehead down to the tip of the nose or the bottom lip) was coupled and sealed to the brim and the HEPA filter using tape. The axial fan was powered by a 12-volt lithium-ion battery.

Example 5

A similar wearable personal respiratory and eye protection device was assembled as in Example 1 except the filter was cut to a size of about 5 inches to about 7 inches such that the filter was about 1.5 inches longer on either side of the axial fan when the axial fan is stacked on top of the filter. The pleat orientation of the filter was also changed such that the pleats were oriented perpendicular to a facing direction of the user when the wearable personal respiratory and eye protection device is worn by the user.

Example 6

A respiratory and eye protection sleeping device as shown in FIG. 7 was assembled. The canopy was formed out of a 24 inch×12 inch×6 inch cardboard box with the bottom of the cardboard box removed by a box cutter (i.e., the side opposite of the top with opening flaps). The canopy therefore had a ceiling, two lateral sides, and a floor. The air processing assembly was made by stacking first filter, a second filter, and an array of axial fans (arranged in order from the air processing assembly inlet to the air processing assembly outlet) into a second 24 inch×12 inch×6 inch cardboard box. The array of axial fans was formed using two rows of five Arctic P12 Case Fans in parallel. The first filter was a Filtrete 12×24×1 AC Furnace Air Filter (manufactured by 3M) with a MERV rating value of 13. The second filter was a 12×24×4 Nordic Pure AC Furnace Filter (manufactured by Nordic Pure) with a MERV rating value of 13. The air processing assembly outlet guard, made of hardware cloth sized 0.5 inches, was disposed at the air processing assembly outlet and connected to the holes on corners of the axial fans using cable ties to hold them in place. Tape was used to seal the interfaces between the filters and the second cardboard box and between the open flaps of the first cardboard box and second cardboard box. Bedding was arranged on the floor of the canopy. The axial fans were powered by a 12-volt lithium-ion battery.

Example 7

A fan outlet shroud and air processing assembly combination as shown in FIG. 17A was assembled. A 20-inch×20-inch base plate as shown in FIG. 16A was made from cardboard. An aperture of about 12 inches diameter was cut in the center of the base plate. An extension was made out of a cylindrical cardboard tube having a diameter of about 12 inches and a length of 6 inches was disposed concentrically on top of the base plate at the aperture. Tape was used to seal the interface between the extension and the base plate.

An air processing assembly was assembled by stacking a filter and an array of axial fans made of three rows of Arctic P12 Case Fans in parallel, two rows of three fans on either side of one row of four fans, for a total of 10 fans. The filter was a 20×20×5 AC Healthy Climate Air Filter (manufactured by Lennox) with a MERV rating value of 13. The fan outlet shroud was then stacked with the air processing assembly such that the extension was disposed facing away from the air processing assembly outlet (i.e., the at least one axial fan outlet). Tape was used to seal the interfaces between the axial fans of the array of axial fans and between the air processing assembly outlet and the base plate. The axial fans were powered by a 12-volt lithium-ion battery.

Example 8

A similar fan outlet shroud and air processing assembly combination as prepared in Example 7 was assembled except the fan outlet shroud extension extended 10-inches long as a cube with height and width 20 inches as shown in FIG. 16C.

Example 9

A modular portable air cleaner as shown in FIG. 10 was assembled. The air processing assembly was made by stacking a radiator fan on top of a filter. In this instance, the radiator fan was a Spal 30101522 Puller Fan and the filter was the cylindrical cartridge filter used in a Healthmate Plus™ (manufactured by Austin Air). It is noted that this filter comprises a HEPA filter with about 15 pounds of activated carbon. The radiator fan was powered by a 12-volt automotive battery. The diameter of the radiator fan and the diameter of the cylindrical cartridge filter were within 2 inches of each other. Tape was used to seal the interface between the fan and the filter around their periphery with a spacer tube in between made of cardboard approximately 2 inches thick wrapped around the circumference of the fan and filter. The radiator fan was oriented such that the generated air would be pulled through the filter and exhaust through the fan.

Example 10

A similar modular portable air cleaner as prepared in Example 9 was assembled except two stacked radiator fans were used with spacer tubes in between made of plastic approximately 4 inches thick wrapped around the circumference of the fan and filter, and the two fans. Tape was used to seal the interface between both fans, between fan and filter, and respective spacer tubes in between around their periphery. In an alternative embodiment, the fans were aligned concentrically such that the four apertures (i.e., holes) in each fan housing (i.e., the flange) were also aligned, a threaded rod was inserted in each set of aligned holes, a washer and nut were used to couple each threaded rod to both a top and bottom of each flange at each aperture, the two fans were coupled to one another, cardboard was wrapped around the circumference of both fans, and tape was used to seal the interface between the two fans.

Example 11

A similar modular portable air cleaner as prepared in Example 10 was assembled except four stacked radiator fans were used.

Example 12

A similar modular portable air cleaner as prepared in Example 10 was assembled except eight stacked radiator fans were used and the spacer tubes between fans were made of cardboard approximately 2 inches thick.

Example 13

A similar modular portable air cleaner as prepared in Example 10 was assembled except two stacked filters were used.

Example 14

A similar modular portable air cleaner as prepared in Example 11 was assembled except two stacked filters were used.

Example 15

A similar modular portable air cleaner as prepared in Example 11 was assembled except two of these assemblies were used in parallel.

Example 16

A similar modular portable air cleaner as prepared in Example 10 was assembled except three stacked filters were used.

Example 17

A similar modular portable air cleaner as prepared in Example 11 was assembled except three stacked filters were used.

Example 18

A similar modular portable air cleaner as prepared in Example 10 was assembled except four stacked filters were used.

Example 19

A similar modular portable air cleaner as prepared in Example 12 was assembled except three stacked filters were used.

Example 20

A similar modular portable air cleaner as prepared in Example 9 was assembled except two stacked filters were used and two of these assemblies were used in parallel.

Example 21

A similar modular portable air cleaner as prepared in Example 13 was assembled except two of these assemblies were used in parallel.

Example 22

A similar modular portable air cleaner as prepared in Example 11 was assembled except four stacked filters were used.

Example 23

A similar modular portable air cleaner as prepared in Example 10 was assembled except four of these assemblies were used in parallel.

Example 24

A similar modular portable air cleaner as prepared in Example 14 was assembled except two of these assemblies were used in parallel.

Example 25

A wall-adjacent portable air cleaner, similar to as shown in FIG. 13A, was assembled. A Nordic Pure 20×20×4 AC Furnace Air Filter with a MERV rating value of 13, was used for each of the two lateral components. The front component was an array of axial fans formed using two rows of five Arctic P12 Case Fans in parallel. The top plate and the bottom plate were each a piece of cardboard and the back surface, adjacent to the wall, was an open surface (e.g., no plate or filter). All respective interfaces were sealed with tape. The wall-adjacent portable air cleaner was mounted to the wall. A 12-volt DC power source was used for the wall-adjacent portable air cleaner. In this configuration, the output airflow generated was perpendicular to the wall.

Example 26

A wall-adjacent portable air cleaner, similar to as shown in FIG. 13B, was assembled. A Nordic Pure 20×20×4 AC Furnace Air Filter with a MERV rating value of 13, was used for one of the two lateral components and for the front component. One of the two lateral components was an array of axial fans formed using two rows of five Arctic P12 Case Fans in parallel. The top plate and the bottom plate were each a piece of cardboard and the back surface, adjacent to the wall, was an open surface (e.g., no plate or filter). All respective interfaces were sealed with tape. The wall-adjacent portable air cleaner was mounted to the wall. A 12-volt DC power source was used for the wall-adjacent portable air cleaner. In this configuration, the output airflow generated was parallel to the wall.

Example 27

A hazardous material containment apparatus, similar to as shown in FIG. 18, was assembled. The enclosure was a 3 foot×3 foot×3 foot plexiglass box made of 2-inch material. The bottom of the box was an open face. The interfaces between top and lateral components of the box were sealed with tape. A Healthmate Plus™ (manufactured by Austin Air) was used as the air processing assembly and was disposed on the ground. The enclosure was placed on top of the air processing assembly so that bottom edges of the lateral components of the box contacted the ground and the enclosure surrounded the air processing assembly.

Example 28

A similar hazardous material containment apparatus as prepared in Example 27 was assembled except tape was used to seal the interface between the enclosure and the ground.

Comparative Example 1

A similar wearable personal respiratory and eye protection device was assembled as in Example 3 except the air processing assembly was tilted away from the user by inserting a spacer between the forehead and the filters such that the airflow generated by the at least one axial fan would be tilted away from the user.

Comparative Example 2

A similar respiratory and eye protection sleeping device was assembled as in Example 6 except the canopy was removed.

Comparative Example 3

A similar fan outlet shroud and air processing assembly combination as prepared in Example 7 was assembled except the fan outlet shroud did not have an extension.

Experiments

In the following experiments, the air changes per an hour (ACH) of air filtration was measured using the process as described in the Supplemental Appendix of "Pentagon Found Daily, Metagenomic Detection of Novel Bioaerosol Threats to Be Cost-Prohibitive: Can Virtualization and AI Make It Cost-Effective?" written by Devabhaktuni Srikrishna, the entire publication hereby incorporated by reference.

Experiment 1

A series of tests were conducted using the personal respiratory and eye protection devices of Examples 1-4 and Comparative Example 1.

In the first test, the user wore the wearable personal respiratory and eye protection device of Example 1 as shown in FIG. 2. Using a decibel meter, an ambient noise level was taken which measured between 34 to 39 dbA, when measured within about 3 inches from an ear of the user. The fan was then activated and another noise level measurement was taken. The airflow speed of the output airflow generated by the fan was tested within the inhalation zone at nose-level was also measured using an anemometer.

In order to determine the aerosol filtration efficiency of the personal respiratory and eye protection device for particles having a size of 0.3 μm, a Temptop PMD 331 ISO calibrated aerosol counter was used. An input reading was taken using the aerosol counter above the user and an output reading was taken within the inhalation zone (at nose level), for particles having a size of 0.3 μm.

Similar tests were conducted with the wearable personal respiratory and eye protection devices of Examples 2-4 and Comparative Example 1.

The results of these experiments are shown in the table below:

| Respiratory and Eye Protection Device | Noise Measured (dbA) | Fan Airflow Speed (ft/min) | Input (particles per liter) | Output (particles per liter) | Filtration Efficiency (%) |
|---|---|---|---|---|---|
| Example 1 | 41 | 157 | 22,051 | 3,566 | 84 |
| Example 2 | 58 | 354 | 35,613 | 8,253 | 76 |
| Example 3 | 57 | 276 | 8,340 | 265 | 97 |
| Example 4 | 63 | 216 | 4,783 | 34 | 99 |
| Comparative Example 1 | 57 | 354 | 8,115 | 1,877 | 77 |

The testing results show that the filtration efficiency is a function of filter capability at a given fan airflow speed. For instance, using the wearable personal respiratory and eye protection device of Example 1, a higher filtration efficiency was achieved at a lower fan airflow speed (as compared with Example 2), using the same filter. However, an even greater filtration efficiency was achieved in Experiment 3 when using two filters at a higher fan airflow speed. When using the wearable personal respiratory and eye protection device of Example 4, a superior filtration efficiency of 99% was achieved using a HEPA filter and a half-face shield. However, a noise level of 63 dbA may be unacceptable in some applications. In comparing the wearable personal respiratory and eye protection device of Example 3 and Comparative Example 1, the filtration efficiency was adversely impacted when the airflow generated by the axial fan was tilted away from the face of the user.

Experiment 2

Tests were conducted using the personal respiratory and eye protection devices of Example 1 and Example 5.

The wearable personal respiratory and eye protection device of Example 1 (having parallel pleats) was orientated on a flat surface so that the bottom surface of the filter having the pleats was visible (i.e., surface closest to the inhalation zone). The fan was then activated to generate an output airflow. A Temptop PMD 331 ISO calibrated aerosol counter was used to measure the concentration of particles having a size of 0.3 μm. The concentration of 0.3 μm particles was measured to be 33,899 particles per liter on the edge of the filter closest the face of the user and was measured to be 540 particles per liter on an edge of the filter perpendicular to this edge (on the same filter surface).

Similar testing steps were used with the wearable personal respiratory and eye protection device of Example 5 (having perpendicular pleats). The concentration of 0.3 μm particles was measured to be 1,864 particles per liter on the edge of the filter closest the face of the user and was measured to be 1,709 particles per liter on an edge of the filter perpendicular to this edge (on the same filter surface).

The testing results show that the pleated filters oriented parallel to the facing direction of the user may cause the generated by the at least one axial fan to leak around the filter where it is cut, resulting in low filtration. Furthermore, the seal between the axial fan and the filter can be improved by orienting the pleats perpendicular to the facing direction of the user and adding a margin of about 1.5 inches or sizing the filter such that the filter extends past the axial fan in the direction of the pleats on both ends.

Experiment 3

A series of tests were conducted using the respiratory and eye protection sleeping devices of Example 6 and Comparative Example 2.

In the first test, the user entered the respiratory and eye protection sleeping device of Example 6 as shown in FIG. 7. Using a decibel meter, an ambient noise level (i.e., when the fans were deactivated) was taken which measured at 39 dbA, when measured within about 3 inches from an ear of the user. The fans were then activated, and another noise level reading was taken which measured at 58 dbA. The airflow speed of the output airflow generated by the fan was tested within the inhalation zone at nose-level was also measured using an anemometer which measured at 138 ft/min.

In order to determine the aerosol filtration efficiency of the respiratory and eye protection sleeping device for particles of various seizes, a Temptop PMD 331 ISO calibrated aerosol counter was used. An input reading was taken using the aerosol counter outside of respiratory and eye protection sleeping device and an output reading was taken within the inhalation zone (at nose level), for particles having various sizes.

Similar aerosol filtration efficiency tests were conducted with the respiratory and eye protection sleeping device of Comparative Example 2.

The results of the filtration efficiency test with the respiratory and eye protection sleeping device of Example 6 (with the canopy) are shown in the table below:

| Particle Size (μm) | Input (particles per liter) | Output (particles per liter) | Filtration Efficiency (%) |
|---|---|---|---|
| 0.3 | 7,357 | 434 | 94 |
| 0.5 | 3,741 | 224 | 94 |
| 0.7 | 863 | 58 | 93 |
| 1.0 | 427 | 37 | 91 |

The results of the filtration efficiency test with the respiratory and eye protection sleeping device of Comparative Example 2 (without the canopy) are shown in the table below:

| Particle Size | Input (particles per liter) | Output (particles per liter) | Filtration Efficiency (%) |
|---|---|---|---|
| 0.3 | 7,357 | 1,574 | 78 |
| 0.5 | 3,741 | 812 | 78 |
| 0.7 | 863 | 220 | 75 |
| 1.0 | 427 | 112 | 74 |

The testing results show removing the canopy that covers the user of the respiratory and eye protection sleeping device drops the filtration efficiency of particles sized 0.3 μm from about 94% to about 78%. To put this in perspective, the canopy increases the respiratory and eye protection by threefold. Without the canopy, the aerosolized particles are able to entrain or diffuse into the inhalation zone of the user from above and from the sides. The canopy helps to prevent ambient aerosolized particles from diffusing into the inhalation zone by allowing substantially laminar output airflow generated by the at least one axial fan to flow into the inhalation zone, but without interfering with the side-to-side head movement or breathing of the user.

Experiment 4

A series of tests were conducted using the fan outlet shroud and air processing assembly combinations of Examples 7-8 and Comparative Example 3.

Using the same indoor space, the air changes per an hour (ACH) of air filtration was independently measured for each fan outlet shroud and air processing assembly combination. The results of these tests are shown in the table below:

| Respiratory and Eye Protection Device | ACH |
|---|---|
| Example 7 | 6.2 |
| Example 8 | 6.8 |
| Comparative Example 3 | 5.4 |

The test results demonstrate that adding the extension to the fan outlet shroud increased the ACH of the air processing assembly by about 11-20%.

Experiment 5

A series of tests were conducted using the modular portable air cleaner of Examples 9-24 in comparison with the Healthmate Plus™ (manufactured by Austin Air). It is noted that the Healthmate Plus™ can generate an airflow ranging between 75 and 400 CFM and the Spal 30101522 Puller Fan utilized in the present invention has a max airflow of 1328 CFM.

Using the same indoor space, the air changes per an hour (ACH) of air filtration was independently measured for the Healthmate Plus™ and modular portable air cleaners of Examples 9-24. The results of the tests are shown in the table below:

| Respiratory and Eye Protection Device | ACH |
|---|---|
| Healthmate Plus ™ | 2.95 |
| Example 9 (1 fan × 1 filter) | 4.80 |
| Example 10 (2 fans × 1 filter) | 6.20 |
| Example 11 (4 fans × 1 filter) | 6.70 |
| Example 12 (8 fans × 1 filter) | 8.70 |
| Example 13 (2 fans × 2 filters) | 12.35 |

-continued

| Respiratory and Eye Protection Device | ACH |
|---|---|
| Example 14 (4 fans × 2 filter) | 13.75 |
| Example 15 (Two 4 fans × 1 filter) | 15.90 |
| Example 16 (2 fans × 3 filters) | 16.45 |
| Example 17 (4 fans × 3 filters) | 16.60 |
| Example 18 (2 fans × 4 filters) | 16.80 |
| Example 19 (8 fans × 3 filters) | 17.80 |
| Example 20 (Two 1 fan × 2 filters) | 18.10 |
| Example 21 (Two 2 fans × 2 filters) | 20.85 |
| Example 22 (4 fans × 4 filters) | 21.00 |
| Example 23 (Four 2 fans × 1 filter) | 22.05 |
| Example 24 (Two 4 fans × 2 filters) | 23.00 |

The test results how that the present invention, using only one radiator fan and one filter (Example 9), had an improved ACH of greater than 63% over the prior art (Healthmate Plus™). Furthermore, the present invention using, eight stacked fans with three stacked filters (Example 19), had an improved ACH of greater than about 503% over the prior art.

Experiment 6

A series of tests were conducted using the wall-adjacent portable air cleaner of Examples 25 and 26. Using the same indoor space, the air changes per an hour (ACH) of air filtration was independently measured for the wall-adjacent portable air cleaner of Examples 25 and 26. The results of the tests are shown in the table below:

| Respiratory and Eye Protection Device | ACH |
|---|---|
| Example 25 (airflow perpendicular to wall) | 5.85 |
| Example 26 (airflow parallel to wall) | 6.75 |

The test results show that the wall-adjacent portable air cleaner of the present invention had about a 15% improvement in ACH when changing the direction of the out airflow generated by the at least one axial fan to be parallel to the wall (e.g., Example 26).

Experiment 7

A series of tests were conducted using the hazardous material containment apparatuses of Examples 27 and 28.

In the first series of tests, an aerosol seal test was performed to determine the seal of the hazardous material containment apparatus in relation to ambient aerosol. First the air processing assembly of Example 27 (without the ground seal) was energized (i.e., the at least one fan generated an airflow). A Temptop PMD 331 ISO calibrated aerosol counter was placed inside the enclosure and 1,100 particles per liter of aerosols at 0.3 μm were detected. Unless otherwise stated, all particle counts will be reported in this experiment as number of particles per liter at 0.3 μm. Next the air processing assembly of Example 28 (with the ground seal) was tested in a similar manner and 205 particles per liter of aerosols were detected. The ambient aerosol concentration was detected to be 21,992 particles per liter.

Based on aerosol seal tests, it was determined that since ambient aerosols are omnipresent in large quantities, the bottom of the enclosure permits aerosol leakage from outside the enclosure to inside the enclosure. It was also observed that about a 95% reduction in aerosols was achieved by running the air processing assembly inside the enclosure, even without sealing the enclosure to the ground (due outside-in leakage). It was further observed that about a 99% reduction in aerosols was achieved by running the air processing assembly inside the enclosure, after sealing it to the ground (further limiting outside-in leakage).

In the second series of tests, a vapor seal test was performed to determine the seal of the hazardous material containment apparatus in relation to a vapor generated within the enclosure. First, a Temptop M10 volatile organic compound meter was placed inside the enclosure and 5.00 milligrams per cubic meter (mg/m$^3$) of volatile organic gas was generated within the enclosure. The air processing assembly of Example 27 (without the ground seal) was energized (i.e., the at least one fan generated an airflow). Temptop M10 volatile organic compound meter was placed outside the enclosure and 3.54 mg/m$^3$ of volatile organic gas was detected outside of the enclosure while 5.00 mg/m$^3$ of volatile organic gas was detected inside the enclosure. Next the air processing assembly of Example 28 (with the ground seal) was tested in a similar manner and 0.01 mg/m$^3$ of volatile organic gas was detected outside of the enclosure while 0.82 mg/m$^3$ of volatile organic gas was detected inside the enclosure.

Based on vapor seal tests, it was determined that since there are no (negligible) ambient vapors, unlike the aerosol seal test, the leakage of vapors from inside the enclosure to outside the enclosure can actually be measured directly adjacent to the enclosure. In contrast to the aerosol seal test, it was observed that without sealing the enclosure to the ground, the vapors produced inside the enclosure were not effectively prevented from escaping the enclosure with the air processing assembly (e.g., almost no reduction, 3.54 mg/m$^3$ of volatile organic gas versus 5.00 mg/m$^3$ of volatile organic gas). It was also observed that about a 98% reduction in vapors was achieved by running the air processing assembly inside the enclosure, after sealing it to the ground (further limiting inside-out leakage).

As thus should now be understood by those skilled in the art, the present invention overcomes all of the aforementioned deficiencies while also providing the advantages mentioned herein as well as those advantages that should be understood by those skilled in the art.

Other advantages and objectives are deemed to be apparent from the disclosure herein. It should also be appreciated that the present invention can be implemented and utilized in numerous ways. While the present invention has been described with respect to preferred embodiments, those skilled in the art will readily appreciate that various changes and/or modifications can be made to the invention without departing from the scope of the invention.

Additional Embodiments

Clause 1: A personal respiratory and eye protection device comprising:

- a frame for accommodating a user of the respiratory and eye protection device;
- an air processing assembly comprising:
  - an air processing assembly inlet for receiving ambient air;
  - an air processing assembly outlet;
  - at least one axial fan that generates a substantially laminar airflow in an inhalation zone of the user during inhalation; and
  - at least one filter stacked together with the at least one axial fan between the air processing assembly inlet and the air processing assembly outlet in a stacking direction, wherein the air processing assembly is disposed above the inhalation zone with respect to the direction of the substantially laminar airflow generated by the at least one axial fan in the inhalation zone, wherein the air processing assembly is in-line with the inhalation zone, wherein the at least one filter reduces contaminated air in the inhalation zone and comprises an aerosolized particle contamination filter configured to achieve an aerosolized particle contamination filtration efficiency of 50% or greater for particles having a size of about 0.3 μm, wherein substantially all air released from the air processing assembly outlet in the inhalation zone has been filtered by the at least one filter, and wherein the air processing assembly is coupled to the frame and processes substantially all ambient air in a direction of generated airflow by the at least one axial fan before entering the inhalation zone.

Clause 2: The respiratory and eye protection device of Clause 1, wherein the at least one filter comprises a vapor contamination filter disposed before or after the aerosolized particle contamination filter in the stacking direction, wherein the vapor contamination filter comprises activated carbon.

Clause 3: The respiratory and eye protection device of Clause 1 or Clause 2, wherein the vapor contamination filter comprises a high efficiency gas adsorber (HEGA) filter.

Clause 4: The respiratory and eye protection device of Clause 2, wherein the activated carbon is impregnated with an impregnant selected from the group consisting of copper, silver, zinc, molybdenum, triethylenediamine (TEDA), zeolite, potassium iodine, and combinations of one or more of the foregoing.

Clause 5: The respiratory and eye protection device of any of Clauses 1 to 4, wherein the aerosolized particle contamination filter is selected from the group consisting of a high-efficiency particulate air (HEPA) filter, a minimum efficiency reporting value (MERV) filter with a rating of 13 and above, and combinations of one or of the foregoing.

Clause 6: The respiratory and eye protection device of any of Clauses 1 to 5, wherein the aerosolized particle contamination filter comprises an electrostatically charged pleated media.

Clause 7: The respiratory and eye protection device of any of Clauses 1 to 6, wherein the aerosolized particle contamination filter has a thickness ranging from about 1 inch to about 5 inches.

Clause 8: The respiratory and eye protection device of any of Clauses 1 to 7, wherein the at least one axial fan has a fan speed ranging from about 200 to about 3,300 rotations per minute (rpm), wherein the at least one axial fan generates a volumetric airflow rate ranging from about 45 to about 90 cubic feet per minute (CFM), and wherein the at least one axial fan generates a static pressure ranging from about 2 to about 5 millimeters of water (mm $H_2O$).

Clause 9: The respiratory and eye protection device of any of Clauses 1 to 8, wherein the at least one axial fan comprises two or more case fans stacked in series.

Clause 10: The respiratory and eye protection device of any of Clauses 1 to 9, wherein the at least one axial fan generates an output airflow speed ranging from about 50 to about 500 feet per minute (ft/min), measured in the inhalation zone.

Clause 11: The respiratory and eye protection device of any of Clauses 1 to 10, wherein the at least one filter comprises a filter inlet and a filter outlet, wherein the at least one axial fan comprises a fan inlet and a fan outlet, wherein the filter inlet and the filter outlet are equal to or greater than the fan inlet and the fan outlet, wherein the air processing assembly inlet comprises an inlet guard and the air processing assembly outlet comprises an outlet guard.

Clause 12: The respiratory and eye protection device of any of Clauses 1 to 11, wherein the frame comprises:

an attachment mechanism;

optionally, a protrusion coupled to the attachment mechanism; and optionally, a crown surrounding a top portion of the head of the user, coupled to the attachment mechanism and the protrusion, wherein the airflow generated by the at least one axial fan is directed towards the face of the user.

Clause 13: The respiratory and eye protection device of Clause 12, wherein the attachment mechanism couples the respiratory and eye protection device to the head of the user.

Clause 14: The respiratory and eye protection device of any of Clauses 12 to 13, wherein the frame further comprises a face shield comprising a semi-transparent material extending from the frame towards the inhalation zone.

Clause 15: The respiratory and eye protection device of any of Clauses 12 to 14, wherein the frame further comprises a counterweight for balancing the weight of the air processing assembly.

Clause 16: The respiratory and eye protection device of any of Clauses 12 to 15, wherein the frame comprises an electromagnetic interference (EMI) shielding material configured to shield the user to a specific absorption rate (SAR) of 1.6 watts per kilogram (W/kg) or below.

Clause 17: The respiratory and eye protection device of any of Clauses 12 to 16, wherein the protrusion is coupled to the air processing assembly, wherein the protrusion comprises at least one reinforcement member disposed on one or more sides of the air processing assembly.

Clause 18: The respiratory and eye protection device of any of Clauses 1 to 11, wherein the frame comprises a canopy comprising:

a canopy inlet coupled to the air processing assembly outlet;

a canopy outlet for exhausting air introduced into the canopy; and a canopy body between the canopy inlet and the canopy outlet made of a semi-permeable material, wherein the canopy body encloses the inhalation zone, wherein substantially only air filtered by the at least one filter is introduced into the canopy body.

Clause 19: The respiratory and eye protection device of Clause 18, wherein the canopy body comprises a material selected from the group consisting of cardboard, polymer fabric, sheet metal, plexiglass, and combinations of one or more of the foregoing.

Clause 20: The respiratory and eye protection device of any of Clauses 18 to 19, wherein a distance between the canopy inlet and the canopy outlet ranges between about 6 inches to about 3 feet.

Clause 21: The respiratory and eye protection device of any of Clauses 18 to 20, wherein the canopy body comprises at least one air valve coupled to at least one inflatable air chamber, wherein the canopy body is capable of inflating via the at least one air valve, wherein the canopy body comprises a polymer fabric selected from the group consisting of polyvinyl chloride, vinyl, nylon, latex, polychloroprene, mylar, and one or more of the foregoing, wherein when the canopy body is inflated, the respiratory and eye protection device is a self-supporting structure.

Clause 22: The respiratory and eye protection device of any of Clauses 18 to 21, wherein the at least one axial fan is disposed at the air processing assembly outlet and wherein the at least one axial fan is an array of axial fans comprising two or more axial fans arranged in parallel.

Clause 23: The respiratory and eye protection device of any of Clauses 18 to 22, wherein the canopy inlet and the canopy outlet are substantially the same size and are concentrically arranged.

Clause 24: The respiratory and eye protection device of any of Clauses 1 to 23, further comprising a controller electrically connected to the at least one axial fan and a power source.

Clause 25: The respiratory and eye protection device of Clause 24, wherein the controller comprises a regulator for manually activating or deactivating power from a power source to the at least one axial fan and/or for adjusting the speed of the at least one axial fan.

Clause 26: The respiratory and eye protection device of any of Clauses 24 to 25, further comprising:

at least one sensor for detecting one or more aerosol/vapor agents selected from the group consisting of Novichok nerve agent (A232), thickened venomous nerve agent (TVX), sulfur mustard agent (HD), thickened sulfur mustard agent (THD), soman nerve agent (GD), sarin nerve agent (GB), and one or more of the foregoing; and an output, wherein the controller is electrically connected with the output and the at least one sensor, wherein the controller adjusts the speed of the at least one axial fan when the one or more aerosol/vapor agent is detected.

Clause 27: The respiratory and eye protection device of Clause 26, wherein the output is an array of light and/or audible indicators for displaying a light or generating a noise when the one or more aerosol/vapor agent is detected, and wherein the controller selectively activates a light and/or audible indicator in the array of light and/or audible indicators to indicate when the one or more aerosol/vapor agent is detected.

Clause 28: The respiratory and eye protection device of Clause 26, wherein the output is either displayed on an onboard display and/or transmitted through one or more networks to a remote computer system when the one or more aerosol/vapor agent is detected.

Clause 29: The respiratory and eye protection device of any of Clauses 24 to 25, further comprising:

at least one sensor for detecting a current of the at least one axial fan; and an output, wherein the controller is electrically connected with the output and the at least one sensor, wherein the controller adjusts the speed of the at least one axial fan based on when the current threshold of the at least one axial fan is exceeded in relation to the set amount of time.

Clause 30: The respiratory and eye protection device of Clause 29, wherein the output is an array of light and/or audible indicators for displaying a light or generating a noise when the current threshold of the at least one axial fan is exceeded in relation to the set amount of time, and wherein the controller selectively activates a light and/or audible indicator in the array of light and/or audible indicators to indicate when the current threshold of the at least one axial fan is exceeded in relation to the set amount of time.

Clause 31: The respiratory and eye protection device of Clause 29, wherein the output is either displayed on an onboard display and/or transmitted through one or more networks to a remote computer system when the current threshold of the at least one axial fan is exceeded in relation to the set amount of time.

Clause 32: The respiratory and eye protection device of any of Clauses 1 to 31, wherein the aerosolized particle contamination filter is configured to achieve an aerosolized particle contamination filtration efficiency of 95% or greater for particles having a size of about 0.3 μm.

Clause 33: The respiratory and eye protection device any of Clauses 12 to 32, wherein the aerosolized particle contamination filter comprises at least one pleat oriented perpendicular to a facing direction of the user when the respiratory and eye protection device is worn by the user, wherein the at least one axial fan and the at least one filter are stacked together such that the at least one filter is longer than the at least one axial fan by at least 1.5 inches on each side of the at least one axial fan based on the pleat orientation.

Clause 34: The respiratory and eye protection device of any of Clauses 2 to 33, wherein the vapor contamination filter is configured to achieve a vapor contamination filtration efficiency of 50% or greater for one or more of Novichok nerve agent (A232), thickened venomous nerve agent (TVX), sulfur mustard agent (HD), thickened sulfur mustard agent (THD), soman nerve agent (GD), and sarin nerve agent (GB).

Clause 35: The respiratory and eye protection device any of Clauses 1 to 34, wherein the respiratory and eye protection device generates a noise level ranging 60 decibels (dbA) or less, when the at least one axial fan is in operation, measured within about 3 inches from an ear of the user.

Clause 36: The respiratory and eye protection device any of Clauses 18 to 32 and 34 to 35, wherein a slope of the canopy deviates 10 degree or less with the stacking direction of the at least one axial fan and the at least one filter.

Clause 37: The respiratory and eye protection device any of Clauses 1 to 36, wherein the at least one axial fan comprises a case fan.

Clause 38: A modular filter assembly for filtering contamination from ambient air, wherein the modular filter assembly comprises an air processing assembly further comprising:

an air processing assembly inlet for receiving ambient air;

an air processing assembly outlet assembly outlet; and at least one axial fan stacked on top of at least one filter between the air processing assembly inlet and the air processing assembly outlet, wherein the at least one filter reduces contaminated air in the surrounding environment and comprises a vapor contamination filter configured to achieve a vapor contamination filtration efficiency of 50% or greater for one or more of Novichok nerve agent (A232), thickened venomous nerve agent (TVX), sulfur mustard agent (HD), thickened sulfur mustard agent (THD), soman nerve agent (GD), and sarin nerve agent (GB), wherein a substantial amount of the air released into the surrounding environment from the air processing assembly outlet has been filtered by the at least one filter.

Clause 39: The modular filter assembly of Clause 38, wherein the at least one filter comprises an aerosolized contamination filter configured to achieve an aerosolized contamination filtration efficiency of 50% or greater for particles having a size of about 0.3 μm.

Clause 40: The modular filter assembly of Clause 39, wherein the at least one filter comprises an aerosolized contamination filter configured to achieve an aerosolized contamination filtration efficiency of 95% or greater for particles having a size of about 0.3 μm.

Clause 41: The modular filter assembly of any of Clauses 38 to 40, wherein the at least one axial fan comprises a radiator fan.

Clause 42: The modular filter assembly of any of Clauses 38 to 40, wherein the at least one axial fan is an array of axial fans comprising two or more axial fans arranged in parallel.

Clause 43: The modular filter assembly of any of Clauses 38 to 42, wherein the at least one axial fan comprises two or more stacked case fans.

Clause 44: The modular filter assembly of any of Clauses 38 to 43, wherein the at least one filter comprises two or more stacked filters, wherein a seal is interposed between each of the two or more stacked filters for sealing or substantially sealing an interface therebetween.

Clause 45: The modular filter assembly of any of Clauses 38 to 44, wherein the at least one filter is a cylindrical filter cartridge.

Clause 46: The modular filter assembly of any of Clauses 38 to 45, wherein a spacer tube for maintaining a distance greater than 0.01 inches is interposed between each fan of the two or more stacked fans.

Clause 47: The modular filter assembly of any of Clauses 38 to 46, wherein a spacer tube for maintaining a distance greater than 0.01 inches is interposed between each filter of the two or more stacked filters.

Clause 48: The modular filter assembly of any of Clauses 38 to 47, wherein the at least one axial fan comprises two or more stacked radiator fans and further comprises at least one threaded fastener for releasably interconnecting each radiator fan, wherein each threaded fastener is coupled to a periphery of each radiator fan and maintains a distance of greater than 0.01 inches between each radiator fan.

Clause 49: The modular filter assembly of any of Clauses 38 to 48, wherein each cylindrical filter cartridge comprises a vapor contamination filter layer concentrically arranged with the aerosolized contamination filter layer.

Clause 50: The modular filter assembly of any of Clauses 38 to 49, wherein the vapor contamination filter comprises a high efficiency gas adsorber (HEGA) filter.

Clause 51: The modular filter assembly of any of Clauses 38 to 49, wherein the vapor contamination filter layer comprises an activated carbon layer comprising activated carbon impregnated with an impregnant selected from the group consisting of copper, silver, zinc, molybdenum, triethylenediamine (TEDA), zeolite, potassium iodine, and combinations of one or more of the foregoing.

Clause 52: The modular filter assembly of any of Clauses 39 to 51, wherein the aerosolized contamination filter layer is selected from the group consisting of a high-efficiency particulate air (HEPA) filter, a minimum efficiency reporting value (MERV) filter with a rating of 13 and above, and combinations of one or of the foregoing.

Clause 53: The modular filter assembly of any of Clauses 39 to 52, wherein the aerosolized contamination filter comprises an electrostatically charged pleated media.

Clause 54: The modular filter assembly of any of Clauses 39 to 53, wherein the aerosolized contamination filter has a thickness ranging from about 1 inch to about 5 inches.

Clause 55: The modular filter assembly of any of Clauses 38 to 54, wherein the at least one axial fan is capable of generating an airflow ranging from about 0 and about 1275 cubic feet per minute (CFM) at a static pressure ranging from about 0 to about 1 millimeters of water (mm $H_2O$) while drawing a current ranging from about 10.8 amps to about 12.7 amps.

Clause 56: The modular filter assembly of any of Clauses 38 to 55, further comprising a controller electrically connected to the at least one axial fan and a power source.

Clause 57: The modular filter assembly of Clause 56, wherein the controller comprises a regulator for manually activating or deactivating power from a power source to the at least one axial fan and/or for adjusting the speed of the at least one axial fan.

Clause 58: The modular filter assembly any of Clauses 56 to 57, further comprising:

at least one sensor for detecting one or more aerosol/vapor agent selected from the group consisting of Novichok nerve agent (A232), thickened venomous nerve agent (TVX), sulfur mustard agent (HD), thickened sulfur mustard agent (THD), soman nerve agent (GD), sarin nerve agent (GB), and one or more of the foregoing; and an output, wherein the controller is electrically connected with the output and the at least one sensor, wherein the controller adjusts the speed of the at least one axial fan when the one or more aerosol/vapor agent is detected.

Clause 59: The modular filter assembly of Clause 58, wherein the output is an array of light and/or audible indicators for displaying a light or generating a noise when the one or more aerosol/vapor agent is detected, and wherein the controller selectively activates a light and/or audible indicator in the array of light and/or audible indicators to indicate when the one or more aerosol/vapor agent is detected.

Clause 60: The modular filter assembly of Clause 58, wherein the output is either displayed on an onboard display and/or transmitted through one or more networks to a remote computer system when the one or more aerosol/vapor agent is detected.

Clause 61: The modular filter assembly any of Clauses 56 to 57, further comprising:

at least one sensor for detecting a current of the at least one axial fan; and an output, wherein the controller is electrically connected with the output and the at least one sensor, wherein the controller adjusts the speed of the at least one axial fan based on when the current threshold of the at least one axial fan is exceeded in relation to the set amount of time.

Clause 62: The modular filter assembly of Clause 61, wherein the output is an array of light and/or audible indicators for displaying a light or generating a noise when the current threshold of the at least one axial fan is exceeded in relation to the set amount of time, and wherein the controller selectively activates a light and/or audible indicator in the array of light and/or audible indicators to indicate when the current threshold of the at least one axial fan is exceeded in relation to the set amount of time.

Clause 63: The modular filter assembly of Clause 61, wherein the output is either displayed on an onboard display and/or transmitted through one or more networks to a remote computer system when the current threshold of the at least one axial fan is exceeded in relation to the set amount of time.

Clause 64: The modular filter assembly of Clause 58, wherein the at least one sensor for detecting one or more aerosol/vapor agents comprises at least one sensor disposed within the at least one filter and at least one sensor disposed external to the air processing assembly inlet.

Clause 65: The modular filter assembly any of Clauses 56 to 64, wherein the at least one axial fan comprises a case fan.

Clause 66: A stackable assembly for filtering contamination from ambient air:

two lateral components;

a front component comprising at least one front seal capable of sealing or substantially sealing an interface between the front component and the two lateral components;

a back surface that does not comprise an aerosolized contamination filter;

a top plate comprising a top seal for sealing or substantially sealing an interface between the top plate, the two lateral components, and the front component; and a bottom plate comprising a bottom seal for sealing or substantially sealing an interface between the bottom plate, the two lateral components, and the front component, wherein at least one of the two lateral components and the front component comprises at least one filter and at least one axial fan, wherein the at least one filter comprises an aerosolized contamination filter configured to achieve an aerosolized contamination filtration efficiency of 50% or greater for particles having a size of about 0.3 μm.

Clause 67: The stackable assembly of Clause 66, wherein one of the two lateral components comprises the at least one axial fan.

Clause 68: The stackable assembly any of Clauses 66 to 67, wherein the at least one axial fan comprises a case fan.

Clause 69: The stackable assembly any of Clauses 66 to 68, wherein the at least one axial fan comprises a box fan.

Clause 70: The stackable assembly of any of Clauses 66 to 69, wherein the at least one axial fan comprises two or more axial fans arranged in parallel.

Clause 71: The stackable assembly of any of Clauses 66 to 70, wherein the at least one axial fan has a fan speed ranging from about 200 to about 3,300 rotations per minute (rpm), wherein the at least one axial fan generates a volumetric airflow rate ranging from about 45 to about 90 cubic feet per minute (CFM), and wherein the at least one axial fan generates a static pressure ranging from about 2 to about 5 millimeters of water (mm $H_2O$).

Clause 72: The stackable assembly of any of Clauses 66 to 71, wherein the aerosolized contamination filter is selected from the group consisting of a high-efficiency particulate air (HEPA) filter, a minimum efficiency reporting value (MERV) filter with a rating of 13 and above, and combinations of one or of the foregoing.

Clause 73: The stackable assembly of any of Clauses 66 to 72, wherein the aerosolized contamination filter comprises an electrostatically charged pleated media.

Clause 74: The stackable assembly of any of Clauses 66 to 73, wherein the aerosolized contamination filter has a thickness ranging from about 1 inch to about 5 inches.

Clause 75: The stackable assembly of any of Clauses 66 to 74, wherein the at least one filter comprises two or more stacked filters.

Clause 76: The stackable assembly of any of Clauses 66 to 75, wherein the at least one filter comprises a vapor contamination filter disposed after the aerosolized contamination filter in a direction of airflow generated by the at least one axial fan, wherein the vapor contamination filter comprises activated carbon.

Clause 77: The stackable assembly of Clause 76, wherein the vapor contamination filter comprises a high efficiency gas adsorber (HEGA) filter.

Clause 78: The stackable assembly of Clause 76, wherein the activated carbon is impregnated with an impregnant selected from the group consisting of copper, silver, zinc, molybdenum, triethylenediamine (TEDA), zeolite, potassium iodine, and combinations of one or more of the foregoing.

Clause 79: The stackable assembly of any of Clauses 66 to 78, further comprising a wall attachment mechanism.

Clause 80: The stackable assembly of any of Clauses 66 to 79, further comprising a controller electrically connected to the at least one axial fan and a power source.

Clause 81: The stackable assembly of Clause 80, wherein the controller comprises a regulator for manually activating or deactivating power from a power source to the at least one axial fan and/or for adjusting the speed of the at least one axial fan.

Clause 82: The stackable assembly of any of Clauses 80 to 81, further comprising:

at least one sensor for detecting one or more aerosol/vapor agents selected from the group consisting of Novichok nerve agent (A232), thickened venomous nerve agent (TVX), sulfur mustard agent (HD), thickened sulfur mustard agent (THD), soman nerve agent (GD), sarin nerve agent (GB), and one or more of the foregoing; and an output, wherein the controller is electrically connected with the output and the at least one sensor, wherein the controller adjusts the speed of the at least one axial fan when the one or more aerosol/vapor agent is detected.

Clause 83: The stackable assembly of Clause 82, wherein the output is an array of light and/or audible indicators for displaying a light or generating a noise when the one or more aerosol/vapor agent is detected, and wherein the controller selectively activates a light and/or audible indicator in the array of light and/or audible indicators to indicate when the one or more aerosol/vapor agent is detected.

Clause 84: The stackable assembly of Clause 82, wherein the output is either displayed on an onboard display and/or transmitted through one or more networks to a remote computer system when the one or more aerosol/vapor agent is detected.

Clause 85: The stackable assembly of any of Clauses 80 to 81, further comprising:

at least one sensor for detecting a current of the at least one axial fan; and an output, wherein the controller is electrically connected with the output and the at least one sensor, wherein the controller adjusts the speed of the at least one axial fan based on when the current threshold of the at least one axial fan is exceeded in relation to the set amount of time.

Clause 86: The stackable assembly of Clause 85, wherein the output is an array of light and/or audible indicators for displaying a light or generating a noise when the current threshold of the at least one axial fan is exceeded in relation to the set amount of time, and wherein the controller selectively activates a light and/or audible indicator in the array of light and/or audible indicators to indicate when the current threshold of the at least one axial fan is exceeded in relation to the set amount of time.

Clause 87: The stackable assembly of Clause 85, wherein the output is either displayed on an onboard display and/or transmitted through one or more networks to a remote computer system when the current threshold of the at least one axial fan is exceeded in relation to the set amount of time.

Clause 88: The stackable assembly of any of Clauses 66 to 87, wherein the aerosolized particle contamination filter is configured to achieve an aerosolized particle contamination filtration efficiency of 95% or greater for particles having a size of about 0.3 μm.

Clause 89: The stackable assembly of Clause 76, wherein the vapor contamination filter is configured to achieve a vapor contamination filtration efficiency of 50% or greater for one or more of Novichok nerve agent (A232), thickened venomous nerve agent (TVX), sulfur mustard agent (HD), thickened sulfur mustard agent (THD), soman nerve agent (GD), and sarin nerve agent (GB).

Clause 90: The stackable assembly of any of Clauses 66 to 89, wherein one of the two lateral components comprises a lateral plate comprising a lateral seal capable of sealing or substantially sealing an interface between the lateral plate, bottom plate, the front component, and the top plate, wherein the other of the two lateral components comprises the at least one axial fan.

Clause 91: The stackable assembly of any of Clauses 66 to 90, wherein the at least one axial fan comprises two or more a case fans in series.

Clause 92: A containment apparatus for enclosing a hazardous material emitting air contamination comprising:

an enclosure for isolating the hazardous material comprising:

at least three closed faces comprising a transparent material, wherein a sealed or substantially sealed connection is formed between each of the at least three closed faces, and an open face for receiving the hazardous material when a periphery of the open face contacts a surface supporting the hazardous material, wherein the periphery of the open face comprises a sealant for forming a sealed or substantially sealed connection between the enclosure and the surface; and an air processing assembly disposed on or enclosed within the enclosure comprising:

an air processing assembly inlet for receiving contaminated air in the enclosure, an air processing assembly outlet, and at least one fan and at least one filter coupled together between the air processing assembly inlet and the air processing assembly outlet, wherein the at least one filter reduces contaminated air in the enclosure and comprises a vapor contamination filter configured to achieve a vapor contamination filtration efficiency of 50% or greater for one or more of Novichok nerve agent (A232), thickened venomous nerve agent (TVX), sulfur mustard agent (HD), thickened sulfur mustard agent (THD), soman nerve agent (GD), and sarin nerve agent (GB), wherein substantially all air released from the air processing assembly outlet has been filtered by the at least one filter.

Clause 93: The containment apparatus of Clause 92, wherein the at least one filter comprises an aerosolized air contamination filter configured to achieve an aerosolized air contamination filtration efficiency of 50% or greater for particles having a size of about 0.3 μm.

Clause 94: The containment apparatus of any of Clauses 92 to 93, wherein the at least one filter comprises an aerosolized air contamination filter configured to achieve an aerosolized air contamination filtration efficiency of 95% or greater for particles having a size of about 0.3 μm.

Clause 95: The containment apparatus of any of Clauses 92 to 94, wherein the vapor contamination filter is disposed after the aerosolized contamination filter in the direction of an airflow generated by the at least one fan, wherein the vapor contamination filter comprises activated carbon.

Clause 96: The containment apparatus of any of Clauses 92 to 95, wherein the vapor air contamination filter comprises a high efficiency gas adsorber (HEGA) filter.

Clause 97: The containment apparatus of any of Clauses 92 to 95, wherein the activated carbon is impregnated with an impregnant selected from the group consisting of copper, silver, zinc, molybdenum, triethylenediamine (TEDA), zeolite, potassium iodine, and combinations of one or more of the foregoing.

Clause 98: The containment apparatus of any of Clauses 93 to 97, wherein the aerosolized contamination filter is selected from the group consisting of a high-efficiency particulate air (HEPA) filter, a minimum efficiency reporting value (MERV) filter with a rating of 13 and above, and combinations of one or of the foregoing.

Clause 99: The containment apparatus of any of Clauses 93 to 98, wherein the aerosolized contamination filter comprises an electrostatically charged pleated media.

Clause 100: The containment apparatus of any of Clauses 93 to 99, wherein the aerosolized air contamination filter has a thickness ranging from about 1 inch to about 5 inches.

Clause 101: The containment apparatus of any of Clauses 92 to 100, wherein the at least three closed faces are made of a material selected from the group consisting of acrylic, polycarbonate, polyethylene terephthalate glycol (PETG), polystyrene, and combinations of the foregoing.

Clause 102: The containment apparatus of any of Clauses 92 to 101, wherein the at least three closed faces have a thickness ranging from about ¼ inch to about 4 inches.

Clause 103: The containment apparatus of any of Clauses 92 to 102, wherein the sealant is selected from the group consisting of adhesive, caulking, gasketing, and one or more of the foregoing.

Clause 104: The containment apparatus of any of Clauses 92 to 103, wherein at least one of the at least three closed faces comprises:

at least one aperture; and at least one glove disposed within the enclosure and coupled to a periphery of the at least one aperture, wherein a sealed or substantially sealed connection is formed between the at least one glove and the enclosure at the at least one aperture, wherein an operator of the containment apparatus disposed external to the enclosure is capable of inserting at least a hand into the enclosure through the at least one aperture and the at least one glove.

Clause 105: The containment apparatus of any of Clauses 92 to 104, wherein the at least three closed faces comprise a top face and four lateral faces, wherein the top face is opposite the open face, wherein each lateral face comprises a hinge connection with the top face.

Clause 106: The containment apparatus of any of Clauses 92 to 105, wherein the at least one fan generates an airflow ranging from about 50 to about 400 cubic feet per minute (CFM).

Clause 107: The containment apparatus of any of Clauses 92 to 106, wherein the at least one fan is an axial fan.

Clause 108: The containment apparatus of any of Clauses 92 to 107, wherein the at least one is array of axial fans comprising two or more axial fans arranged in parallel.

Clause 109: The containment apparatus of any of Clauses 92 to 108, wherein the at least one fan comprises two or more stacked case fans.

Clause 110: The containment apparatus of any of Clauses 92 to 109, wherein the at least one fan is a case fan.

Clause 111: The containment apparatus of any of Clauses 92 to 110, wherein the at least one filter comprises two or more stacked filters.

Clause 112: The containment apparatus of any of Clauses 92 to 101, further comprising a controller electrically connected to the at least one fan and a power source.

Clause 113: The containment apparatus of Clause 102, wherein the controller comprises a regulator for manually activating or deactivating power from a power source to the at least one fan and/or for adjusting the speed of the at least one fan.

Clause 114: The containment apparatus of any of Clauses 102 to 103, further comprising:

at least one sensor for detecting one or more aerosol/vapor agents selected from the group consisting of Novichok nerve agent (A232), thickened venomous nerve agent (TVX), sulfur mustard agent (HD), thickened sulfur mustard agent (THD), soman nerve agent (GD), sarin nerve agent (GB), and one or more of the foregoing; and an output, wherein the controller is electrically connected with the output and the at least one sensor, wherein the controller adjusts the speed of the at least one fan when the one or more aerosol/vapor agent is detected.

Clause 115: The containment apparatus of Clause 114, wherein the output is an array of light and/or audible indicators for displaying a light or generating a noise when the one or more aerosol/vapor agent is detected, wherein the controller selectively activates a light and/or audible indicator in the array of light and/or audible indicators to indicate when the one or more aerosol/vapor agent is detected.

Clause 116: The containment apparatus of Clause 114, wherein the output is either displayed on an onboard display and/or transmitted through one or more networks to a remote computer system when the one or more aerosol/vapor agent is detected.

Clause 117: The containment apparatus of any of Clauses 112 to 113, further comprising:

at least one sensor for detecting a current of the at least one axial fan; and an output, wherein the controller is electrically connected with the output and the at least one sensor, wherein the controller adjusts the speed of the at least one fan based on when the current threshold of the at least one 1 fan is exceeded in relation to the set amount of time.

Clause 118: The containment apparatus of Clause 117, wherein the output is an array of light and/or audible indicators for displaying a light or generating a noise when the current threshold of the at least one axial fan is exceeded in relation to the set amount of time, and wherein the controller selectively activates a light and/or audible indicator in the array of light and/or audible indicators to indicate when the current threshold of the at least one fan is exceeded in relation to the set amount of time.

Clause 119: The containment apparatus of Clause 117, wherein the output is either displayed on an onboard display and/or transmitted through one or more networks to a remote computer system when the current threshold of the at least one axial fan is exceeded in relation to the set amount of time.

Clause 120: The containment apparatus of any of Clauses 114 to 116, wherein the at least one sensor for detecting one or more aerosol/vapor agents comprises at least one sensor disposed within the enclosure and at least one sensor disposed external to the enclosure.

Clause 121: The containment apparatus of any of Clauses 114 to 116, and 120, wherein the at least one sensor is capable of detecting a threshold concentration for one or more of the following chemical agents:

0.6 mg-min/m$^3$ of A232;

1.2 mg-min/m$^3$ of TVX;

26.8 mg-min/m$^3$ of HD;

16 mg-min/m$^3$ of THD;

73.4 mg-min/m$^3$ of GD; and 10 mg-min/m$^3$ of GB.

Clause 122: A fan outlet shroud for a stacked filter and fan assembly comprising:

a base plate for covering an outlet of at least one axial fan, wherein a center of the base plate comprises a circular aperture, wherein a diameter of the circular aperture is smaller than a diameter of the outlet of at least one axial fan; and an extension attached to the base plate at the circular aperture forming a sealed or substantially sealed connection, wherein the extension comprises a channel extending the length of the extension substantially through the center of the extension, wherein the at least one axial fan generates an airflow through the channel and the circular aperture.

Clause 123: The fan outlet shroud of Clause 122, wherein the circular aperture diameter ranges from about 10 to about 20 inches.

Clause 124: The fan outlet shroud of any of Clauses 122 to 123, wherein the channel length ranges from about 6 to 20 about inches.

Clause 125: The fan outlet shroud of any of Clauses 122 to 124, wherein the circular aperture diameter and the channel length are substantially the same size.

Clause 126: The fan outlet shroud of any of Clauses 122 to 125, wherein the extension is either a cube or a rectangular prism.

Clause 127; The fan outlet shroud of any of Clauses 122 to 125, wherein the extension is a cylinder.

Clause 128: The fan outlet shroud of any of Clauses 122 to 127, wherein the circular aperture diameter and a channel inner diameter are substantially the same.

Clause 129: The fan outlet shroud of any of Clauses 122 to 128, wherein the fan outlet shroud is usable with any Clause preceding Clause 122.

What is claimed is:

1. A personal protection device comprising:

a frame for accommodating a user of the personal protection device;

an air processing assembly comprising:

an inlet for receiving ambient air;

an outlet;

at least one filter, wherein when the at least one filter is stacked together with at least one fan and positioned between the inlet and the outlet in a stacking direction, wherein the at least one fan is configured to generate an airflow in an inhalation zone, wherein the inhalation zone is about a 10-inch radius around the nose and mouth of the user, wherein the air processing assembly is disposed upstream from the inhalation zone with respect to a direction of the airflow configured to be generated by the at least one fan in the inhalation zone, wherein the air processing assembly is in-line with the inhalation zone, wherein the at least one filter reduces contaminated air in the inhalation zone and comprises an aerosolized particle contamination filter configured to achieve an aerosolized particle contamination filtration efficiency of 75% or greater for particles having a size of about 0.3 μm, as measured in the inhalation zone at a nose level, wherein the aerosolized particle contamination filtration efficiency is calculated using an input from outside the inhalation zone and an output from within the inhalation zone, wherein substantially all air released from the outlet in the inhalation zone has been filtered by the at least one filter, and wherein the air processing assembly is coupled to the frame and processes substantially all ambient air in the direction of the airflow before entering the inhalation zone.

2. The personal protection device of claim 1, wherein the at least one filter comprises a vapor contamination filter disposed upstream or downstream of the aerosolized particle contamination filter in the stacking direction, wherein the vapor contamination filter comprises activated carbon configured to achieve a vapor contamination filtration efficiency of 95% or greater for one or more of Novichok nerve agent (A232), thickened venomous nerve agent (TVX), sulfur mustard agent (HD), thickened sulfur mustard agent (THD), soman nerve agent (GD), and sarin nerve agent (GB) as measured in the inhalation zone at the nose level, wherein the vapor contamination filtration efficiency is calculated using an input from outside the inhalation zone and an output from within the inhalation zone.

3. The personal protection device of claim 2, wherein the activated carbon is impregnated with an impregnant selected from the group consisting of copper, silver, zinc, molybdenum, triethylenediamine (TEDA), zeolite, potassium iodine, and combinations of two or more of the foregoing.

4. The personal protection device of claim 1, wherein the aerosolized particle contamination filter comprises pleated media selected from the group consisting of a high-efficiency particulate air (HEPA) filter, a minimum efficiency reporting value (MERV) filter with a rating of 13 or above, and combinations of two or more of the foregoing.

5. The personal protection device of claim 1, wherein the frame comprises:

an attachment mechanism;

optionally, a protrusion coupled to the attachment mechanism; and optionally, a crown adapted to surround a top portion of the head of the user, coupled to the attachment mechanism and the protrusion, wherein the airflow generated by the at least one fan is directed towards the face of the user.

6. The personal device of claim 5, wherein the frame further comprises a face shield comprising a semi-transparent material extending from the frame towards the inhalation zone.

7. The personal protection device of claim 1, wherein the at least one filter is configured to achieve an aerosolized particle contamination filtration efficiency of 95% or greater for particles having a size of about 0.3 μm, as measured in the inhalation zone at the nose level, wherein the aerosolized particle contamination filtration efficiency is calculated using an input from outside the inhalation zone and an output from within the inhalation zone.

8. The personal protection device of claim 1, wherein the at least one fan is an axial fan configured to generate the airflow having an airflow speed of about 50 feet per minute (fpm) to about 500 fpm, as measured in an inhalation zone at the nose level.

9. The personal protection device of claim 1, wherein the airflow is configured to be directed towards the face of the user in the inhalation zone by about 10 degrees or more with respect to a direction parallel to the height of the user when standing.

10. The personal protection device of claim 1, wherein the at least one fan is configured to generate a noise level of less than about 63 decibels (dBA), as measured within about 3 inches from an ear of the user.

11. The personal protection device of claim 1, wherein the frame comprises:

an attachment mechanism for attaching the personal protection device to an article of clothing, optionally wherein the article of clothing is a hat or a visor.

12. The personal protection device of claim 7, wherein the at least one filter comprises at least two aerosolized contamination filters, wherein each of the at least two aerosolized contamination filters comprises a filter configured to achieve an aerosolized particle contamination filtration efficiency of less than 95% for particles having a size of about 0.3 μm.

13. The personal protection device of claim 7, wherein the aerosolized particle contamination filter comprises at least one pleat, wherein the at least one pleat is oriented substantially perpendicular to a facing direction of the user when the personal protection device is adapted to be worn by the user.

14. The personal protection device of claim 12, wherein at least one of the at least two aerosolized particle contamination filters comprises pleated media selected from the group consisting of a high-efficiency particulate air (HEPA) filter, a minimum efficiency reporting value (MERV) filter with a rating of 13 or above, and combinations of two or more of the foregoing.

15. The personal protection device of claim 1, wherein the at least one filter is configured to achieve an aerosolized particle contamination filtration efficiency of 90% or greater for particles having a size of about 0.3 μm, as measured in the inhalation zone at the nose level, only when combined, wherein each aerosolized particle contamination filtration efficiency is calculated using an input from outside the inhalation zone and an output from within the inhalation zone, wherein the at least one filter comprises at least two aerosolized particle contamination filters, wherein each of the at least two aerosolized particle contamination filters comprises a filter configured to achieve an aerosolized particle contamination filtration efficiency of less than 90% for particles having a size of about 0.3 μm.

16. The personal protection device of claim 15, wherein at least one of the at least two aerosolized particle contamination filters comprises pleated media selected from the group consisting of a high-efficiency particulate air (HEPA)

filter, a minimum efficiency reporting value (MERV) filter with a rating of 13 or above, and combinations of two or more of the foregoing.

17. The personal protection device of claim 1, wherein the at least one filter comprises a filter media of a size of about 5 inches or greater.

18. The personal protection device of claim 1, further comprising:

a controller electrically connected to the at least one fan and a power source;

at least one sensor for detecting a current of the at least one fan;

and an indication, wherein the controller is electrically connected with the indication and the at least one sensor, wherein the indication is an array of light and/or audible indicators for displaying a light or generating a noise when the current threshold of the at least one fan satisfies a threshold value.

19. The personal protection device of claim 1, further comprising:

a controller electrically connected to the at least one fan and a power source;

at least one sensor for detecting a concentration of one or more aerosol and/or vapor agents; and wherein the controller is electrically connected with an indication and the at least one sensor, wherein the indication is an array of light and/or audible indicators for displaying a light or generating a noise when the concentration satisfies a threshold concentration of the one or more aerosol and/or vapor agents.

20. A personal protection device comprising:

a frame for accommodating a user of the personal protection device;

an air processing assembly comprising:

an inlet for receiving ambient air;

an outlet;

at least one filter, wherein when the at least one filter is stacked together with at least one fan and positioned between the inlet and the outlet in a stacking direction, wherein the at least one fan is configured to generate an airflow in an inhalation zone, wherein the inhalation zone is about a 10-inch radius around the nose and mouth of the user, wherein the air processing assembly is disposed upstream from the inhalation zone with respect to a direction of the airflow configured to be generated by the at least one fan in the inhalation zone, wherein the air processing assembly is in-line with the inhalation zone, wherein the at least one filter reduces contaminated air in the inhalation zone and comprises an aerosolized particle contamination filter configured to achieve an aerosolized particle contamination filtration efficiency of 75% or greater for particles having a size of about 1.0 μm, wherein the at least one fan is configured to generate the airflow having an airflow speed of about 50 feet per minute (fpm) to about 500 fpm, as measured in an inhalation zone at a nose level, wherein the airflow is configured to be directed towards the face of the user in the inhalation zone by about 10 degrees or more with respect to a direction parallel to the height of the user when standing;

wherein substantially all air released from the outlet in the inhalation zone has been filtered by the at least one filter, and wherein the air processing assembly is coupled to the frame and processes substantially all ambient air in a direction of the airflow before entering the inhalation zone.

21. The personal protection device of claim 20, wherein at least one filter comprises an aerosolized particle contamination filter configured to achieve an aerosolized particle contamination filtration efficiency of 75% or greater for particles having a size of about 1.0 μm, as measured in the inhalation zone at the nose level, wherein the aerosolized particle contamination filtration efficiency is calculated using an input from outside the inhalation zone and an output from within the inhalation zone.

22. The personal protection device of claim 20, wherein the at least one filter is configured to achieve an aerosolized particle contamination filtration efficiency of 95% or greater for particles having a size of about 1.0 μm.

23. The personal protection device of claim 20, wherein the frame comprises a crown adapted to surround a top portion of the head of the user.

24. The personal protection device of claim 22, wherein the at least one filter comprises at least two aerosolized contamination filters, wherein each of the at least two aerosolized contamination filters comprises a filter configured to achieve an aerosolized particle contamination filtration efficiency of less than 95% for particles having a size of about 1.0 μm.

25. The personal protection device of claim 24, wherein at least one filter comprises an aerosolized particle contamination filter configured to achieve an aerosolized particle contamination filtration efficiency of 95% or greater for particles having a size of about 1.0 μm, as measured in the inhalation zone at the nose level, wherein the aerosolized particle contamination filtration efficiency is calculated using an input from outside the inhalation zone and an output from within the inhalation zone.

26. A personal protection device comprising:

a frame for accommodating a user of the personal protection device;

an air processing assembly comprising:

an inlet for receiving ambient air;

an outlet;

at least one filter, wherein when the at least one filter is stacked together with at least one fan and positioned between the inlet and the outlet in a stacking direction, the at least one fan is configured to generate an airflow in an inhalation zone, wherein the inhalation zone is about a 10-inch radius around the nose and mouth of the user, wherein the air processing assembly is disposed upstream from the inhalation zone with respect to a direction of the airflow configured to be generated by the at least one fan in the inhalation zone, wherein the air processing assembly is in-line with the inhalation zone;

wherein the at least one filter reduces contaminated air in the inhalation zone and comprises an aerosolized particle contamination filter comprising pleated media selected from the group consisting of a high-efficiency particulate air (HEPA) filter, a minimum efficiency reporting value (MERV) filter with a rating of 13 or above, and combinations of two or more of the foregoing;

wherein the at least one fan is configured to generate the airflow having an airflow speed of about 50 feet per minute (fpm) to about 500 fpm, as measured in an inhalation zone at a nose level;

wherein substantially all air released from the outlet in the inhalation zone has been filtered by the at least one filter; and wherein the air processing assembly is coupled to the frame and processes substantially all ambient air in a direction of airflow by the at least one fan before entering the inhalation zone.

27. The personal protection device of claim 26, wherein the at least one filter comprises at least two aerosolized contamination filters, wherein each of the at least two aerosolized contamination filters comprises a filter comprising pleated media selected from the group consisting of a high-efficiency particulate air (HEPA) filter, a minimum efficiency reporting value (MERV) filter with a rating of 13 or above, and combinations of two or more of the foregoing.

28. The personal protection device of claim 27, wherein the at least one filter is configured to achieve an aerosolized particle contamination filtration efficiency of 95% or greater for particles having a size of about 1.0 μm.

29. A personal protection device comprising:

a frame for accommodating a user of the personal protection device;

an air processing assembly comprising:

an inlet for receiving ambient air;

an outlet;

at least one filter, wherein when the at least one filter is stacked together with at least one fan and positioned between the inlet and the outlet in a stacking direction, wherein the at least one fan is configured to generate an airflow in an inhalation zone, wherein the inhalation zone is about a 10-inch radius around the nose and mouth of the user, wherein the air processing assembly is disposed upstream from the inhalation zone with respect to a direction of the airflow configured to be generated by the at least one fan in the inhalation zone, wherein the air processing assembly is in-line with the inhalation zone;

wherein the at least one filter comprises a vapor contamination filter comprising activated carbon configured to achieve a vapor contamination filtration efficiency of 95% or greater one or more of Novichok nerve agent (A232), thickened venomous nerve agent (TVX), sulfur mustard agent (HD), thickened sulfur mustard agent (THD), soman nerve agent (GD), and sarin serve agent (GB), as measured in the inhalation zone at a nose level, wherein the aerosolized particle contamination filtration efficiency is calculated using an input from outside the inhalation zone and an output from within the inhalation zone;

wherein the at least one fan is configured to generate the airflow having an airflow speed of about 50 feet per minute (fpm) to about 500 fpm, as measured in an inhalation zone at the nose level;

wherein substantially all air released from the outlet in the inhalation zone has been filtered by the at least one filter;

wherein the air processing assembly is coupled to the frame and processes substantially all ambient air in the direction of the airflow before entering the inhalation zone.

30. The personal protection device of claim 29, wherein the activated carbon is impregnated with an impregnant selected from the group consisting of copper, silver, zinc, molybdenum, triethylenediamine (TEDA), zeolite, potassium iodine, and combinations of two or more of the foregoing.

* * * * *